(12) United States Patent  
Matsuo et al.

(10) Patent No.: US 8,564,888 B2  
(45) Date of Patent: Oct. 22, 2013

(54) VARIABLE POWER OPTICAL SYSTEM AND IMAGE PICKUP APPARATUS HAVING THE SAME

(75) Inventors: Keigo Matsuo, Akiruno (JP); Takayuki Mimura, Kawasaki (JP); Kanato Adachi, Kawasaki (JP); Hisashi Goto, Tokyo-to (JP)

(73) Assignee: Olympus Corporation, Tokyo (JP)

( * ) Notice: Subject to any disclaimer, the term of this patent is extended or adjusted under 35 U.S.C. 154(b) by 15 days.

(21) Appl. No.: 13/418,430

(22) Filed: Mar. 13, 2012

(65) Prior Publication Data

US 2012/0176529 A1 Jul. 12, 2012

Related U.S. Application Data

(63) Continuation of application No. PCT/JP2010/065751, filed on Sep. 13, 2010.

(30) Foreign Application Priority Data

Sep. 14, 2009 (JP) ................................ 2009-212134  
Sep. 14, 2009 (JP) ................................ 2009-212135  
Sep. 14, 2009 (JP) ................................ 2009-212136

(51) Int. Cl.
*G02B 15/14* (2006.01)  
*H04N 5/232* (2006.01)

(52) U.S. Cl.  
USPC .............................. 359/682; 348/345; 359/680

(58) Field of Classification Search  
CPC ............................. G02B 15/177; G02B 13/009  
USPC .............................. 348/345; 359/680, 682, 686  
See application file for complete search history.

(56) References Cited

U.S. PATENT DOCUMENTS

| 5,963,377 | A | 10/1999 | Okada et al. | |
| 8,164,674 | B2* | 4/2012 | Imamura et al. | 348/335 |
| 8,331,033 | B2* | 12/2012 | Matsuo | 359/683 |
| 2004/0130647 | A1 | 7/2004 | Kuba | |
| 2005/0030641 | A1 | 2/2005 | Kuba et al. | |
| 2005/0270400 | A1 | 12/2005 | Ito | |
| 2006/0127075 | A1 | 6/2006 | Minakata et al. | |
| 2008/0074762 | A1 | 3/2008 | Minakata et al. | |

(Continued)

FOREIGN PATENT DOCUMENTS

| JP | 11-109230 A | 4/1999 |
| JP | 2004-205796 A | 7/2004 |

(Continued)

*Primary Examiner* — David N Spector  
(74) *Attorney, Agent, or Firm* — Brosemer, Kolefas & Associates LLC

(57) ABSTRACT

A variable power optical system includes, in order from the object side, a first lens group having negative refractive power, a variable power group having positive refractive power, and a final lens group having positive refractive power. The variable power group is provided with, in order from the object side, a first lens element having positive refractive power, a second lens element, and a third lens element. The second lens element has a convex shape on the object side. The final lens group includes a positive lens. The variable power optical system satisfies the following conditions:

$10 \leq VdLg \leq 45$ $-1.0 < (R2a-R2b)/(R2a+R2b) < 1.0$ where $VdLg$ is the Abbe number of the positive lens of the final lens group with respect to the d line, $R2a$ is the curvature radius of the object-side surface of the second lens element, and $R2b$ is the curvature radius of the image-side surface of the third lens element.

13 Claims, 44 Drawing Sheets

(56) References Cited

U.S. PATENT DOCUMENTS

| | | |
|---|---|---|
| 2008/0106807 A1 | 5/2008 | Minakata et al. |
| 2008/0106808 A1 | 5/2008 | Minakata et al. |
| 2008/0117524 A1 | 5/2008 | Ichikawa et al. |
| 2008/0117525 A1 | 5/2008 | Ichikawa et al. |
| 2008/0117526 A1 | 5/2008 | Ichikawa et al. |
| 2008/0231968 A1 | 9/2008 | Souma |
| 2009/0059388 A1 | 3/2009 | Miyata et al. |

FOREIGN PATENT DOCUMENTS

| | | |
|---|---|---|
| JP | 2005-055496 A | 3/2005 |
| JP | 2005-156828 A | 6/2005 |
| JP | 2005-283648 A | 10/2005 |
| JP | 2005-283695 A | 10/2005 |
| JP | 2005-338598 A | 12/2005 |
| JP | 2006-208889 A | 8/2006 |
| JP | 2008-129456 A | 6/2008 |
| JP | 2008-129457 A | 6/2008 |
| JP | 2008-129459 A | 6/2008 |
| JP | 2008-191308 A | 8/2008 |
| JP | 2008-233164 A | 10/2008 |
| JP | 2008-233611 A | 10/2008 |
| JP | 2009-058872 A | 3/2009 |
| JP | 2009-058873 A | 3/2009 |
| JP | 2009-069794 A | 4/2009 |
| WO | 2006-115107 A1 | 2/2006 |
| WO | 2011-030894 A1 | 3/2011 |

* cited by examiner

FIG.2A SPHERICAL ABERRATION FNO. 3.200

FIG.2B ASTIGMATISM FIY 3.00

FIG.2C DISTORTION FIY 3.00

FIG.2D CHROMATIC ABERRATION OF MAGNIFICATION FIY 3.00

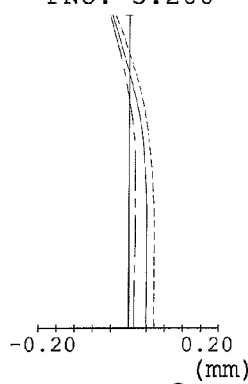
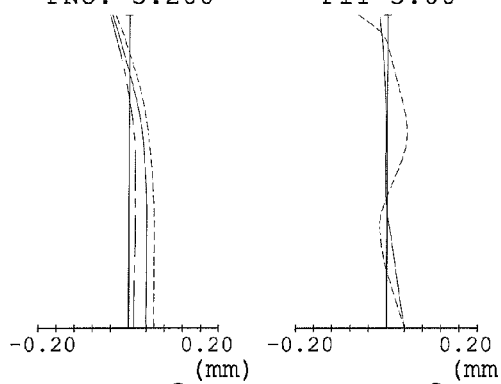
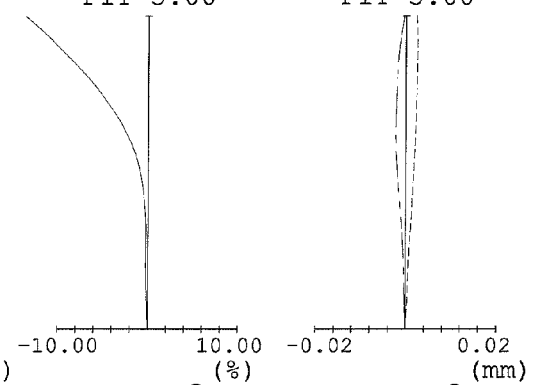
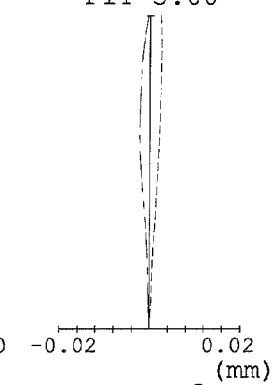

FIG.2E SPHERICAL ABERRATION FNO. 4.369

FIG.2F ASTIGMATISM FIY 3.00

FIG.2G DISTORTION FIY 3.00

FIG.2H CHROMATIC ABERRATION OF MAGNIFICATION FIY 3.00

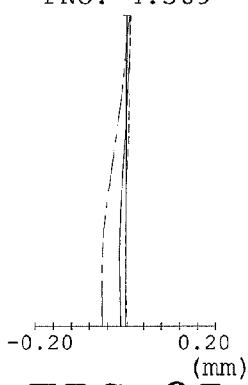
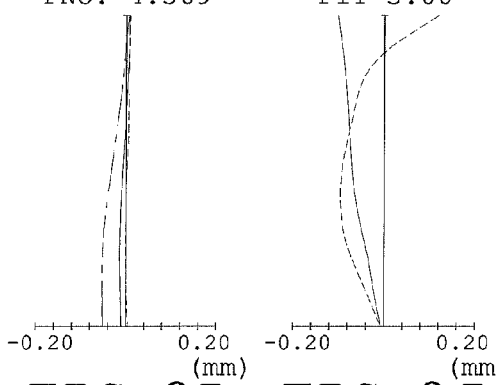
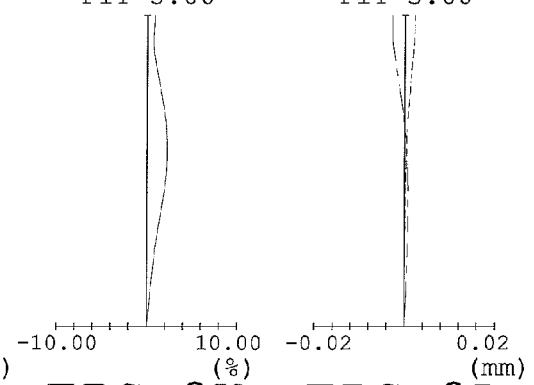
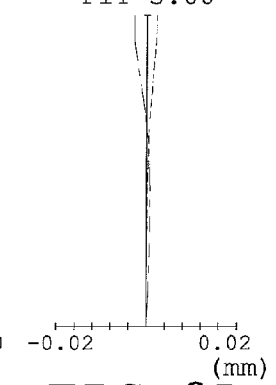

FIG.2I SPHERICAL ABERRATION FNO. 5.200

FIG.2J ASTIGMATISM FIY 3.00

FIG.2K DISTORTION FIY 3.00

FIG.2L CHROMATIC ABERRATION OF MAGNIFICATION FIY 3.00

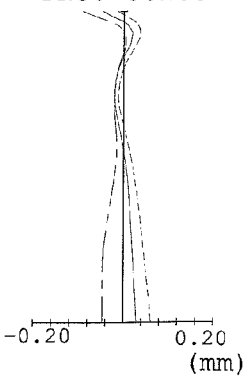
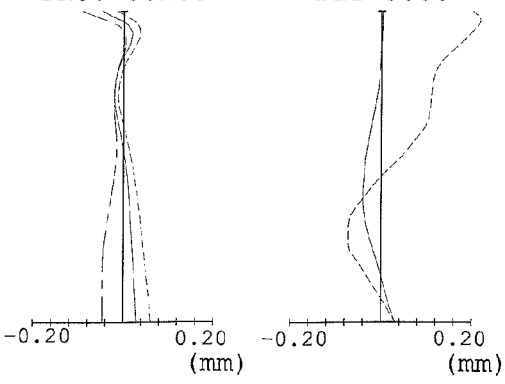
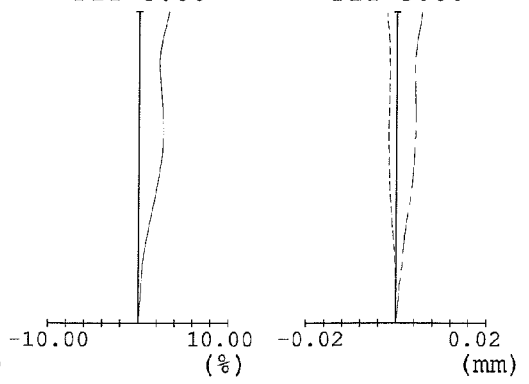
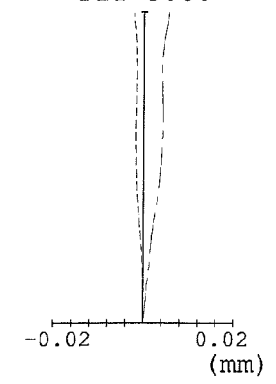

486.13 — · —   656.27 ---------   587.56 ———

SPHERICAL ABERRATION
FNO. 3.626

-0.20    0.20
(mm)

ASTIGMATISM
FIY 3.00

-0.20    0.20
(mm)

DISTORTION
FIY 3.00

-10.00   10.00
(%)

CHROMATIC ABERRATION OF MAGNIFICATION
FIY 3.00

-0.02    0.02
(mm)

SPHERICAL ABERRATION
FNO. 4.325

-0.20    0.20
(mm)

ASTIGMATISM
FIY 3.00

-0.20    0.20
(mm)

DISTORTION
FIY 3.00

-10.00   10.00
(%)

CHROMATIC ABERRATION OF MAGNIFICATION
FIY 3.00

-0.02    0.02
(mm)

SPHERICAL ABERRATION
FNO. 4.935

-0.20    0.20
(mm)

ASTIGMATISM
FIY 3.00

-0.20    0.20
(mm)

DISTORTION
FIY 3.00

-10.00   10.00
(%)

CHROMATIC ABERRATION OF MAGNIFICATION
FIY 3.00

-0.02    0.02
(mm)

486.13 ——— · —    656.27 - - - - - -    587.56 ———

COMA AT
WIDE ANGLE END

COMA AT
MIDDLE

COMA AT
TELEPHOTO END

COMA AT
WIDE ANGLE END

COMA AT
MIDDLE

COMA AT
TELEPHOTO END 486.13 ——  656.27 --------  587.56 ———

FIG.6A SPHERICAL ABERRATION FNO. 3.200
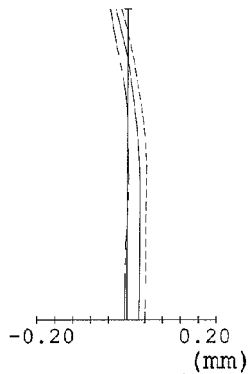

FIG.6B ASTIGMATISM FIY 3.00
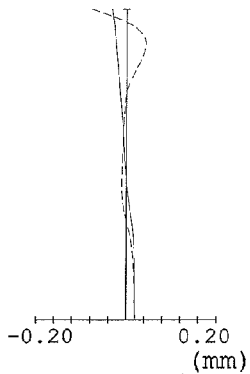

FIG.6C DISTORTION FIY 3.00
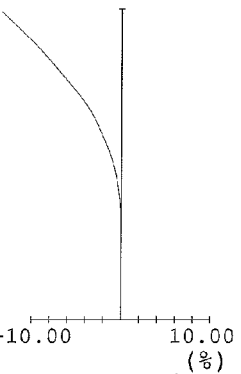

FIG.6D CHROMATIC ABERRATION OF MAGNIFICATION FIY 3.00
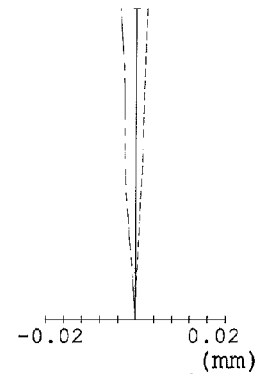

FIG.6E SPHERICAL ABERRATION FNO. 4.384
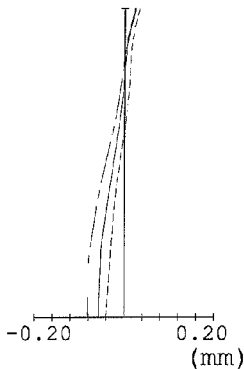

FIG.6F ASTIGMATISM FIY 3.00
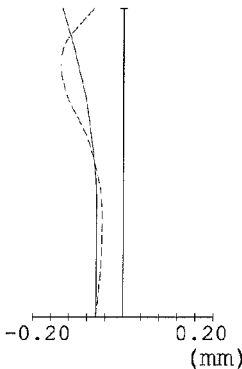

FIG.6G DISTORTION FIY 3.00
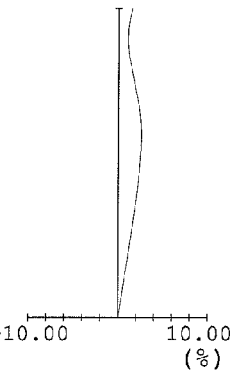

FIG.6H CHROMATIC ABERRATION OF MAGNIFICATION FIY 3.00
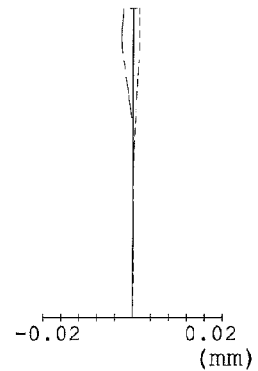

FIG.6I SPHERICAL ABERRATION FNO. 5.200
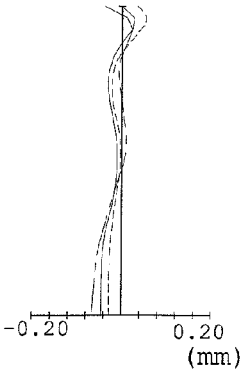

FIG.6J ASTIGMATISM FIY 3.00
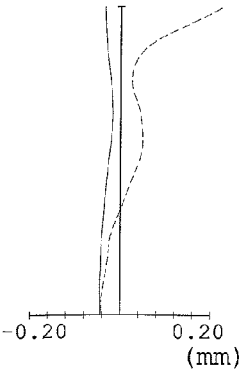

FIG.6K DISTORTION FIY 3.00
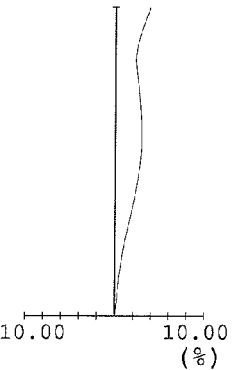

FIG.6L CHROMATIC ABERRATION OF MAGNIFICATION FIY 3.00
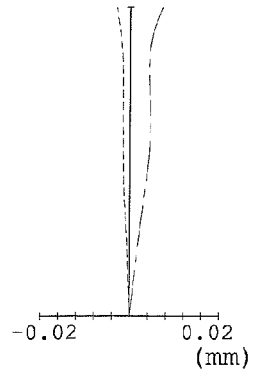

486.13 ——–—— 656.27 -------- 587.56 ———

SPHERICAL
ABERRATION
FNO. 3.298

-0.20  0.20
(mm)

ASTIGMATISM
FIY 3.00

-0.20  0.20
(mm)

DISTORTION
FIY 3.00

-10.00  10.00
(%)

CHROMATIC
ABERRATION OF
MAGNIFICATION
FIY 3.00

-0.02  0.02
(mm)

SPHERICAL
ABERRATION
FNO. 4.367

-0.20  0.20
(mm)

ASTIGMATISM
FIY 3.00

-0.20  0.20
(mm)

DISTORTION
FIY 3.00

-10.00  10.00
(%)

CHROMATIC
ABERRATION OF
MAGNIFICATION
FIY 3.00

-0.02  0.02
(mm)

SPHERICAL
ABERRATION
FNO. 5.136

-0.20  0.20
(mm)

ASTIGMATISM
FIY 3.00

-0.20  0.20
(mm)

DISTORTION
FIY 3.00

-10.00  10.00
(%)

CHROMATIC
ABERRATION OF
MAGNIFICATION
FIY 3.00

-0.02  0.02
(mm)

486.13 ——— 656.27 --------- 587.56 ———

COMA AT
WIDE ANGLE END

COMA AT
MIDDLE

COMA AT
TELEPHOTO END

COMA AT
WIDE ANGLE END

COMA AT
MIDDLE

COMA AT
TELEPHOTO END 486.13 ――― 656.27 -------- 587.56 ―――

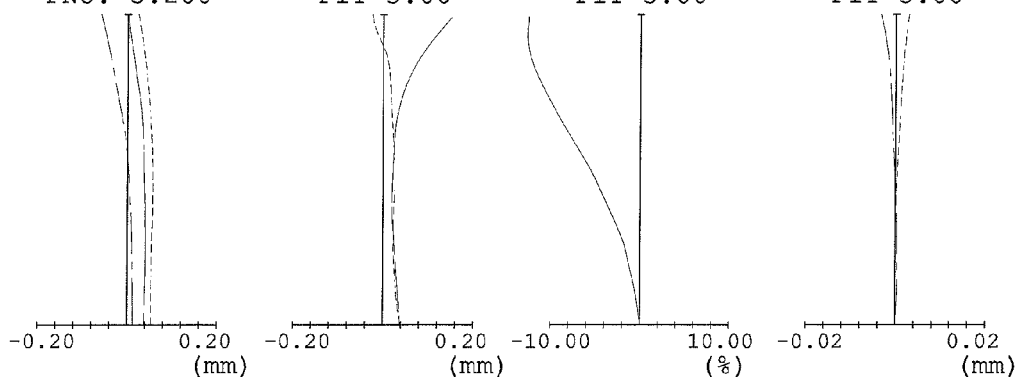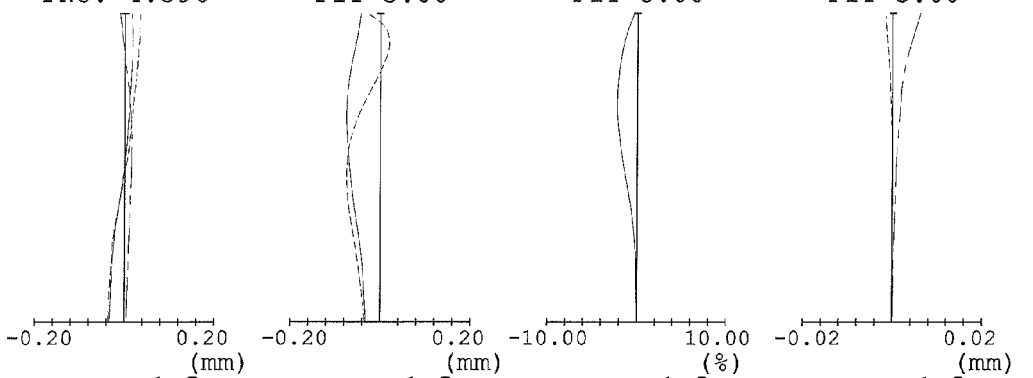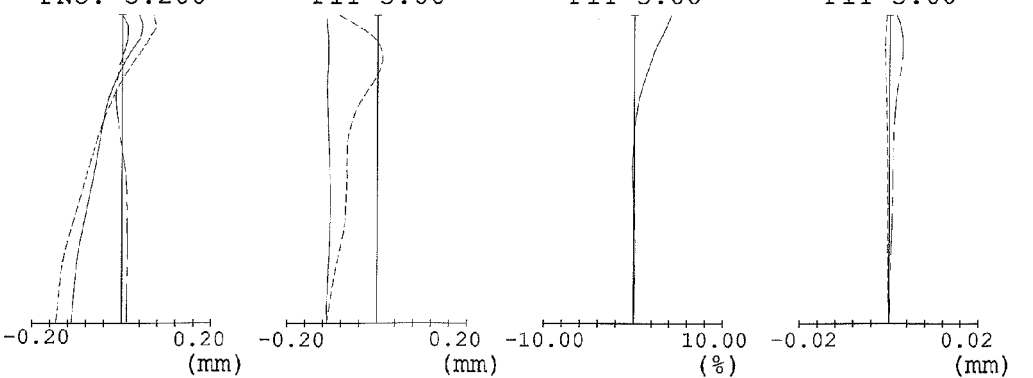

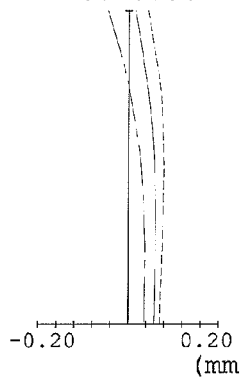 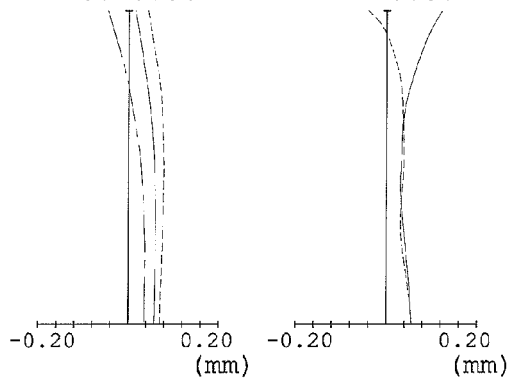 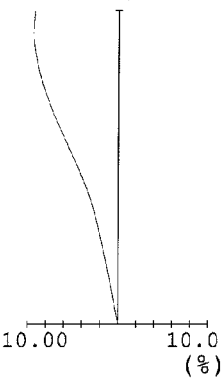 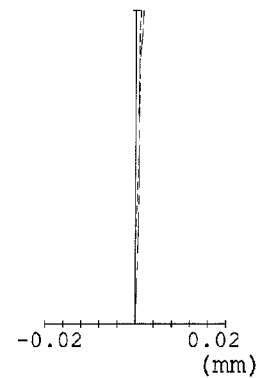
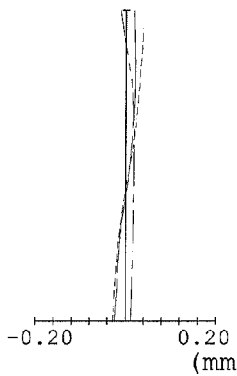 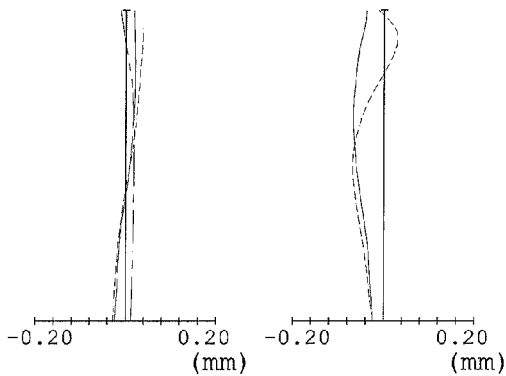 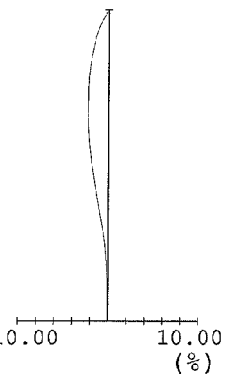 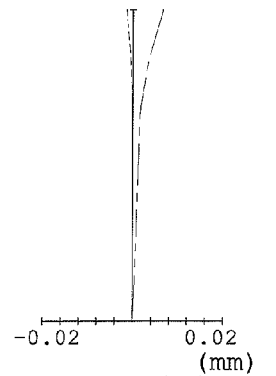
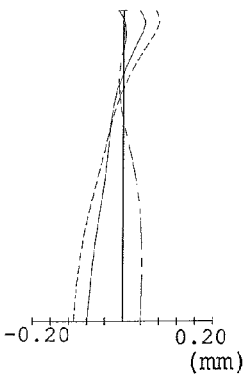 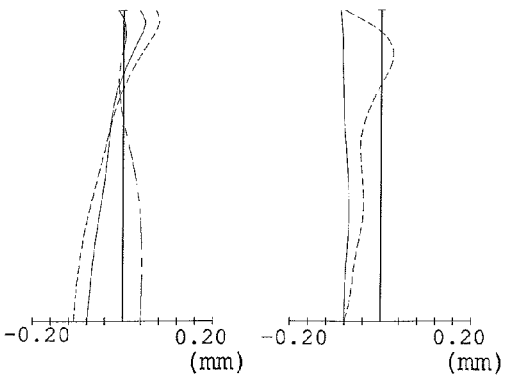 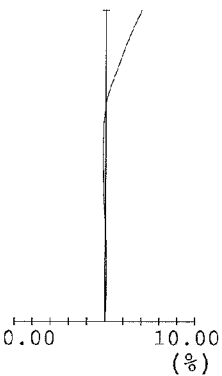 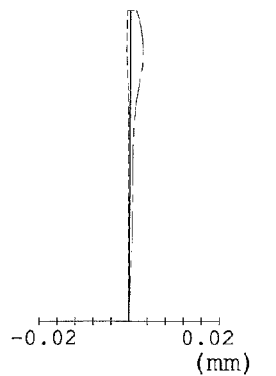

FIG.11A SPHERICAL ABERRATION FNO. 3.361
FIG.11B ASTIGMATISM FIY 3.00
FIG.11C DISTORTION FIY 3.00
FIG.11D CHROMATIC ABERRATION OF MAGNIFICATION FIY 3.00

FIG.11E SPHERICAL ABERRATION FNO. 4.408
FIG.11F ASTIGMATISM FIY 3.00
FIG.11G DISTORTION FIY 3.00
FIG.11H CHROMATIC ABERRATION OF MAGNIFICATION FIY 3.00

FIG.11I SPHERICAL ABERRATION FNO. 5.198
FIG.11J ASTIGMATISM FIY 3.00
FIG.11K DISTORTION FIY 3.00
FIG.11L CHROMATIC ABERRATION OF MAGNIFICATION FIY 3.00

486.13 — — 656.27 -------- 587.56 ———

COMA AT
WIDE ANGLE END

COMA AT
MIDDLE

COMA AT
TELEPHOTO END

COMA AT
WIDE ANGLE END

COMA AT
MIDDLE

COMA AT
TELEPHOTO END 486.13 —·—  656.27 --------  587.56 ———

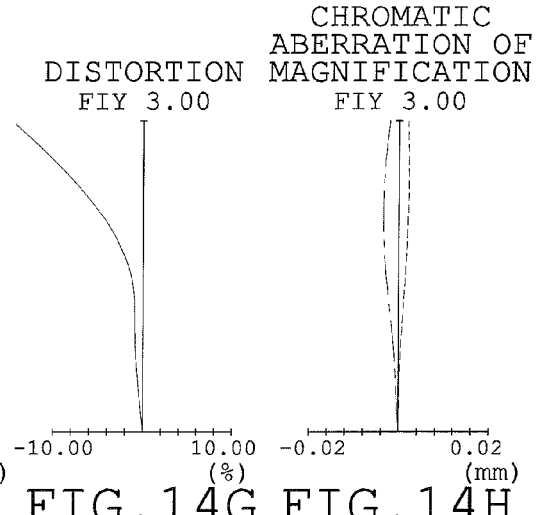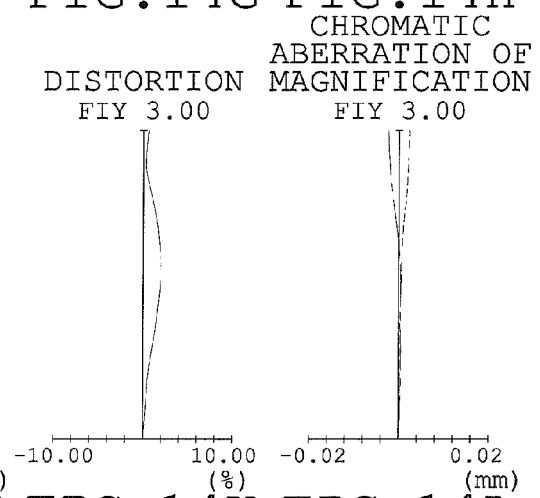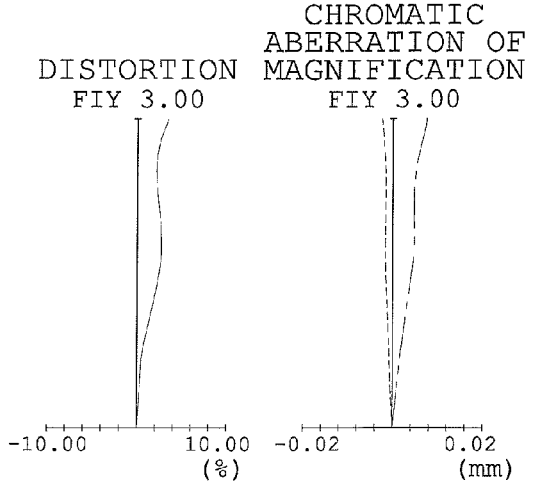

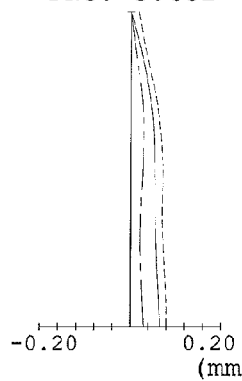
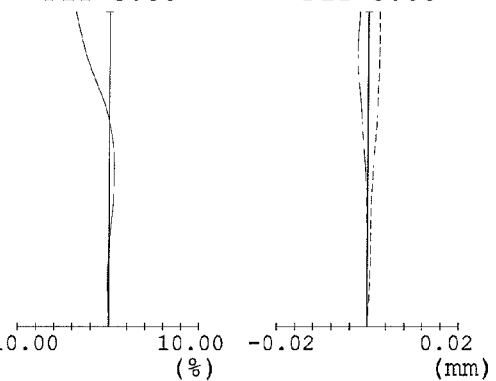
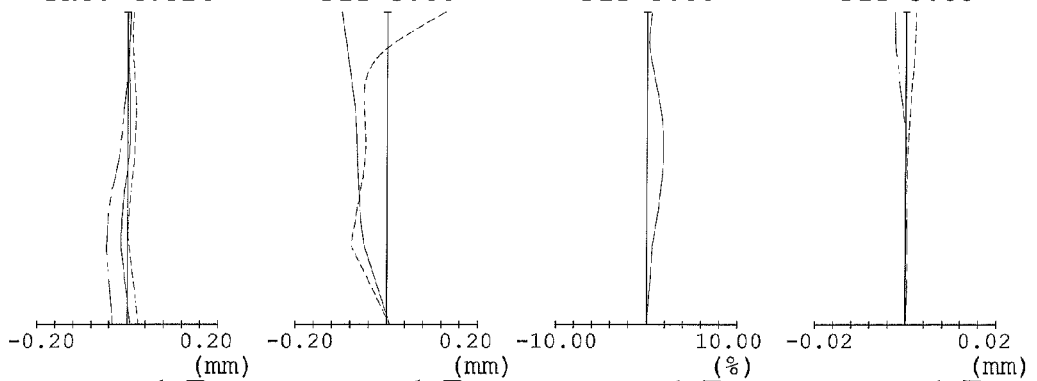
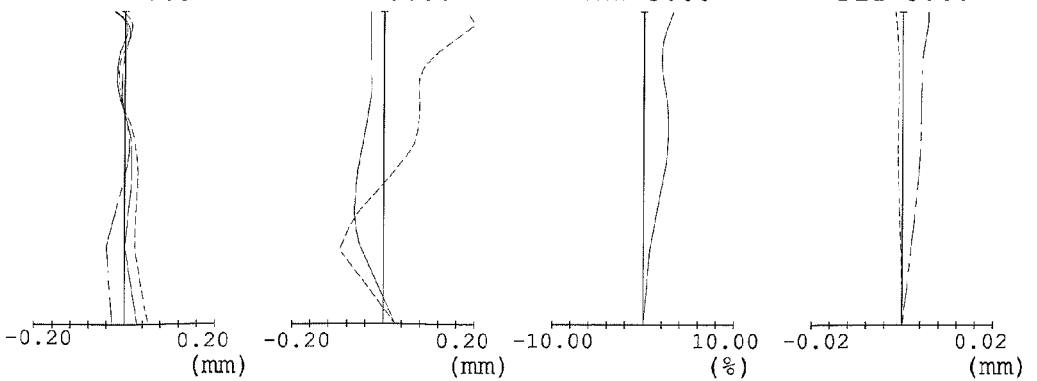

COMA AT
WIDE ANGLE END

COMA AT
MIDDLE

COMA AT
TELEPHOTO END

COMA AT
WIDE ANGLE END

COMA AT
MIDDLE

COMA AT
TELEPHOTO END 486.13 ——— 656.27 -------- 587.56 ———

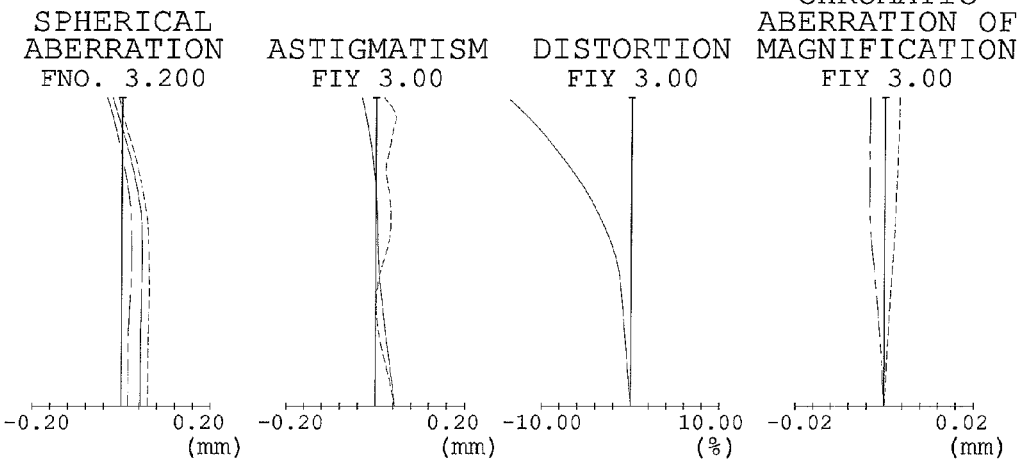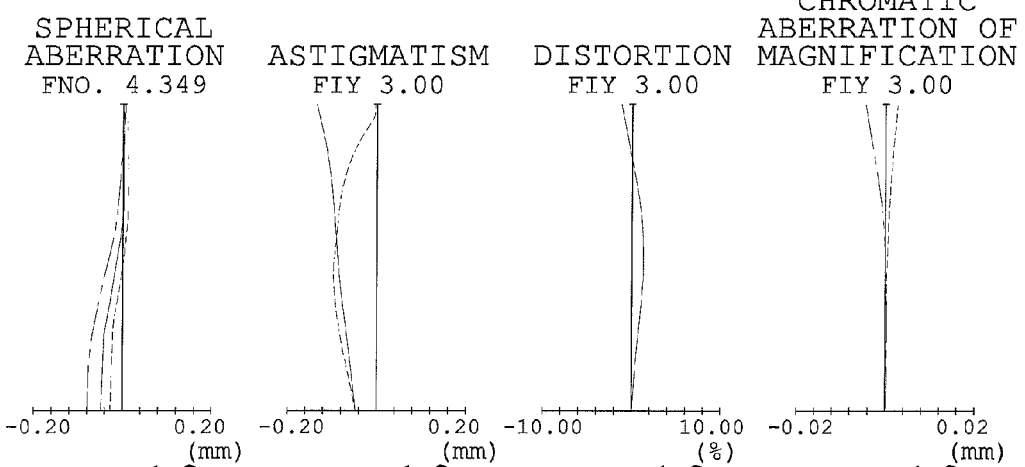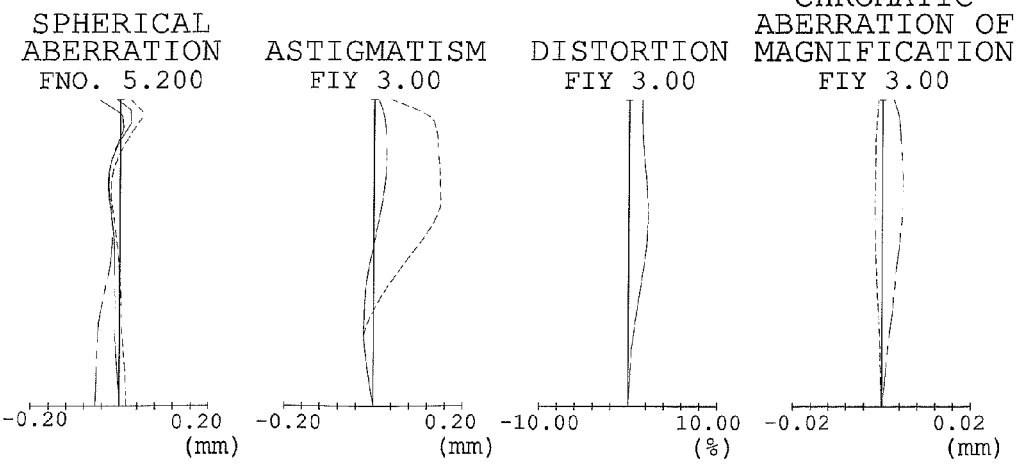

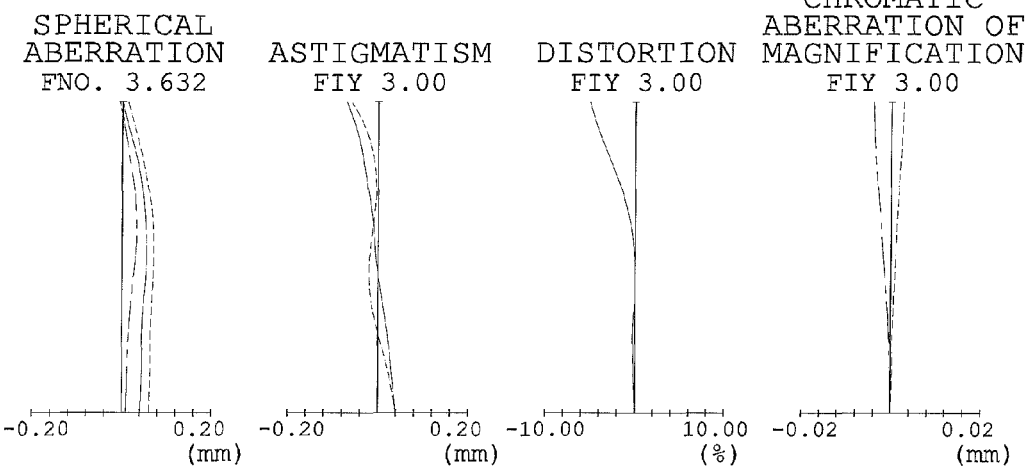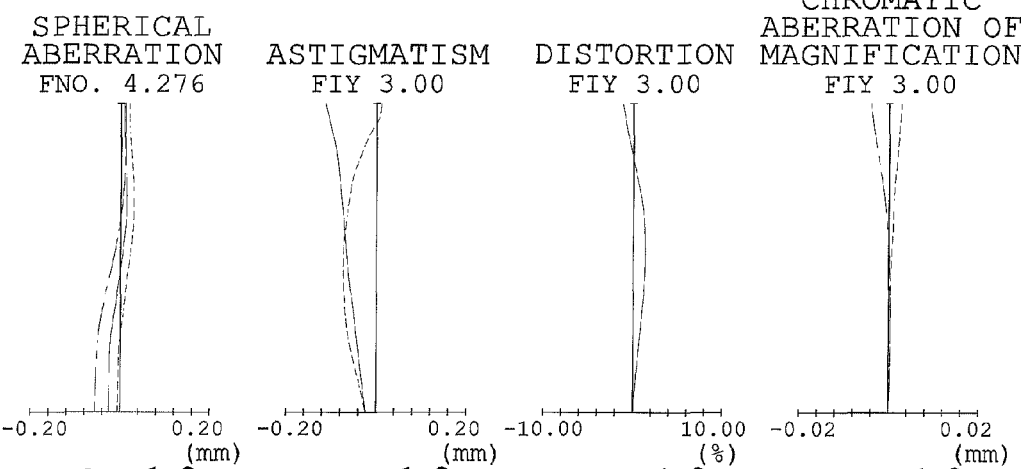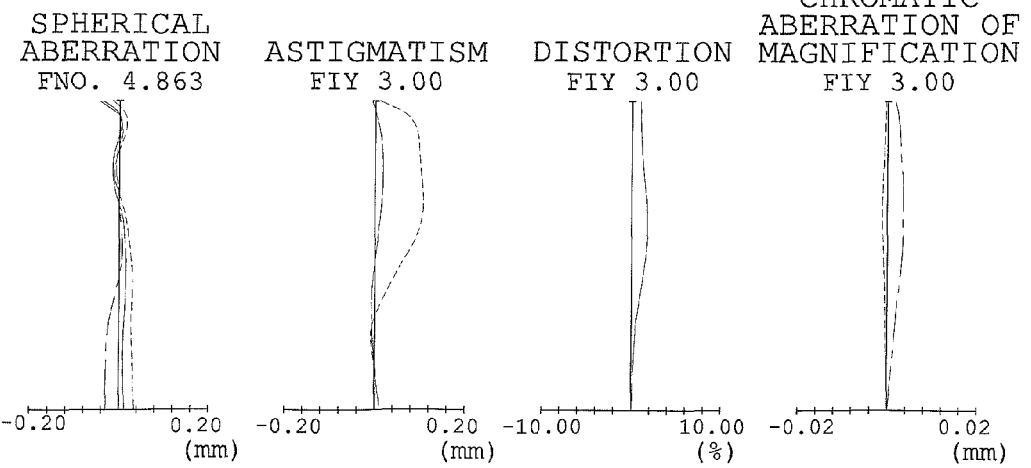

COMA AT
WIDE ANGLE END

COMA AT
MIDDLE

COMA AT
TELEPHOTO END

COMA AT
WIDE ANGLE END

COMA AT
MIDDLE

COMA AT
TELEPHOTO END 486.13 ——  656.27   587.56 ——

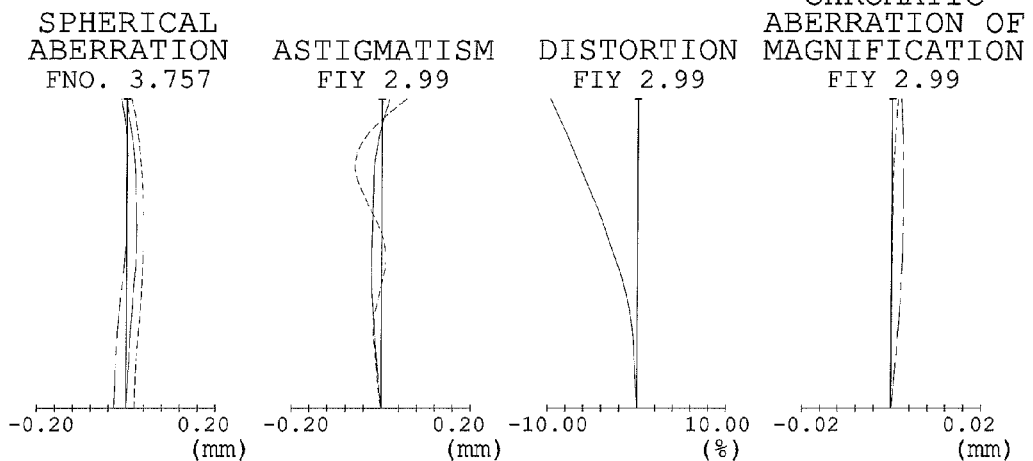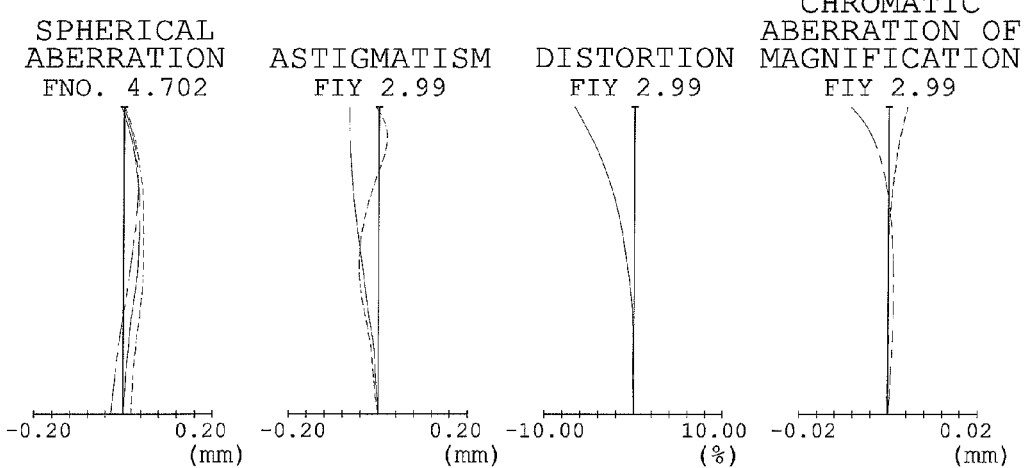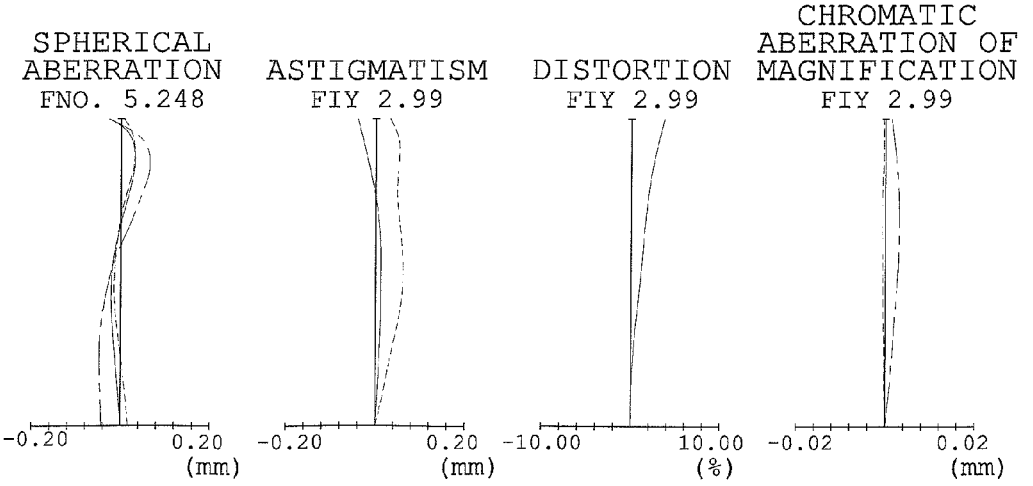

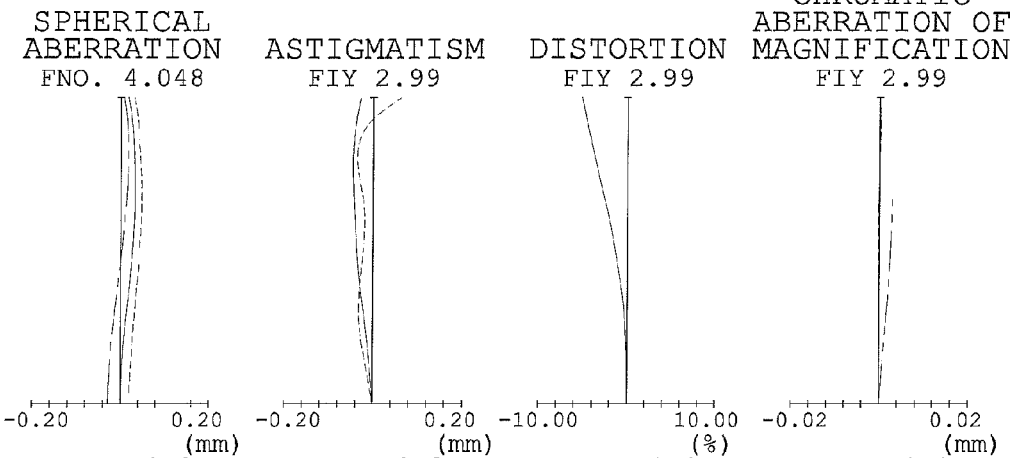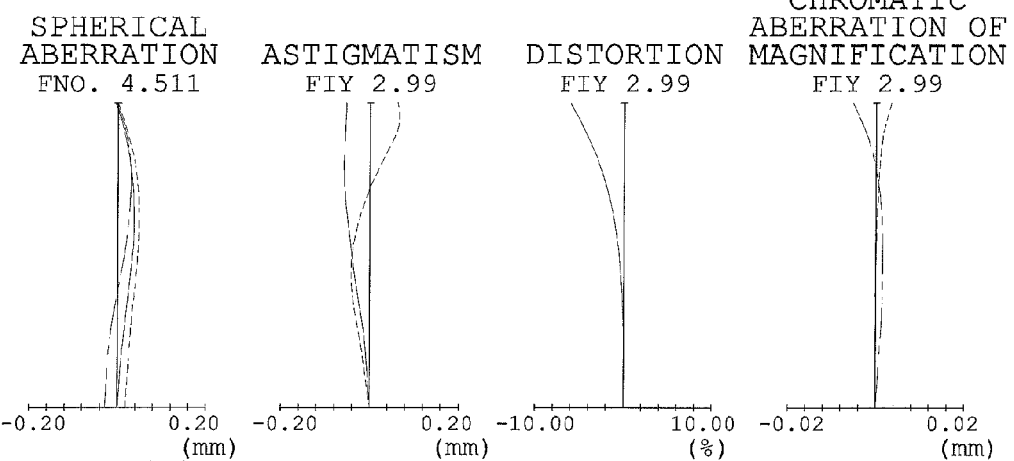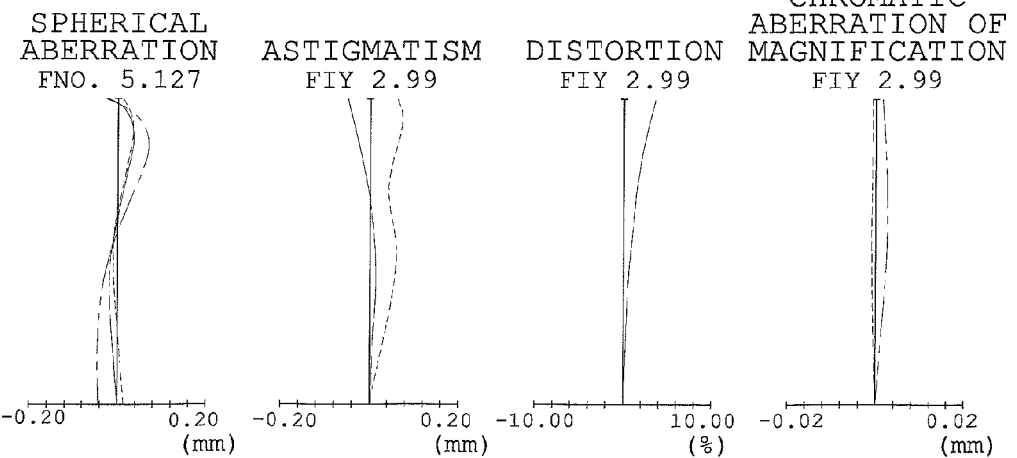

FIG.24A COMA AT WIDE ANGLE END
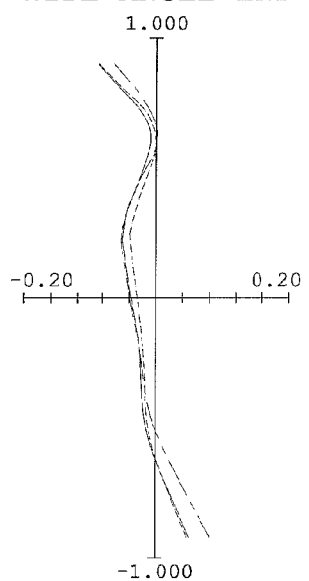
FIG.24B COMA AT MIDDLE
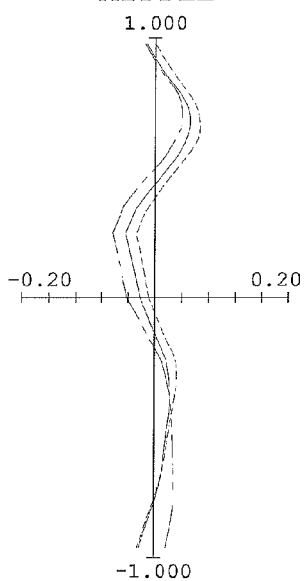
FIG.24C COMA AT TELEPHOTO END
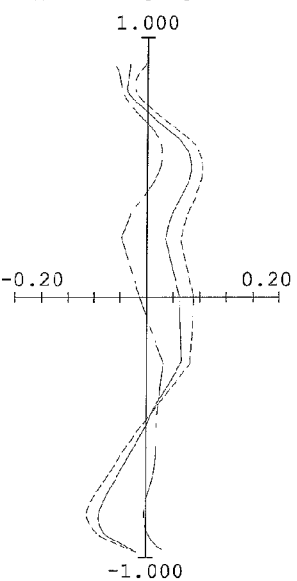
FIG.24D COMA AT WIDE ANGLE END
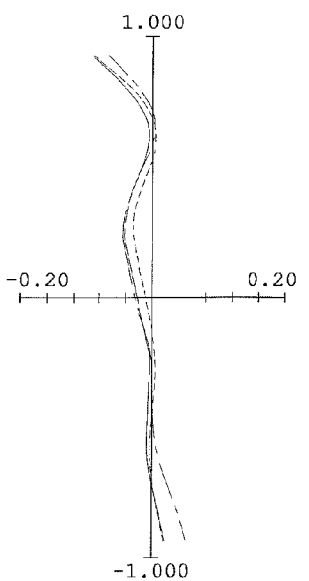
FIG.24E COMA AT MIDDLE
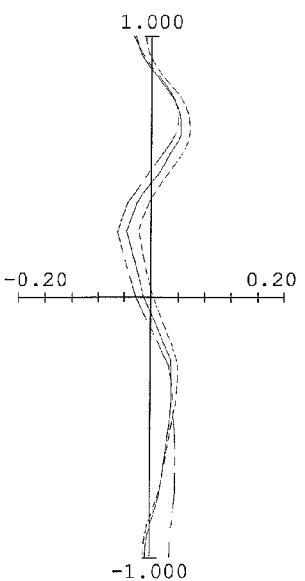
FIG.24F COMA AT TELEPHOTO END
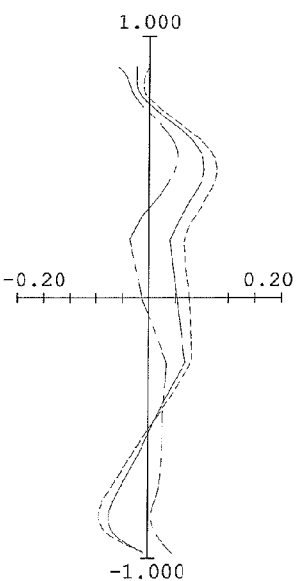
486.13 ——— 656.27 -------- 587.56 ———

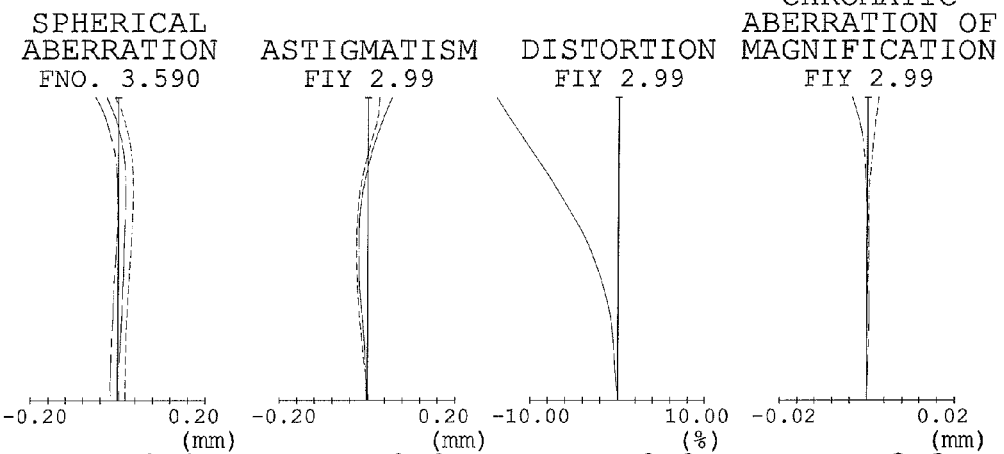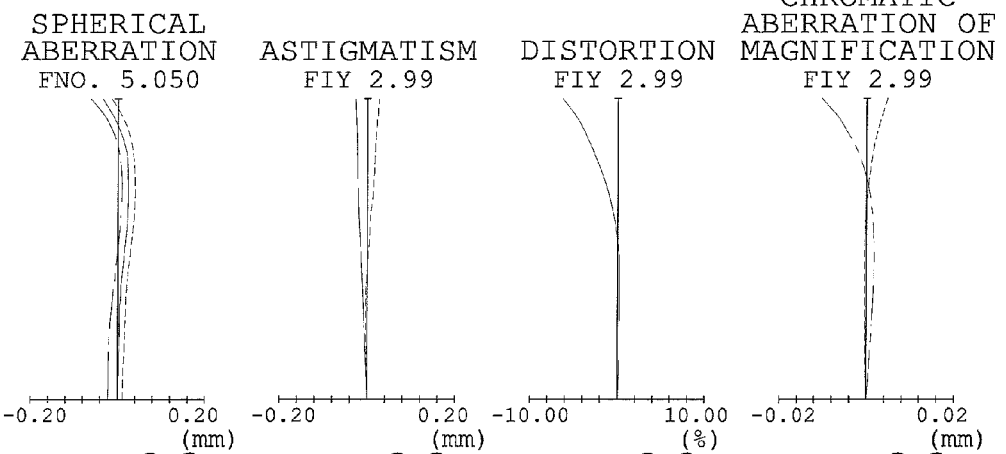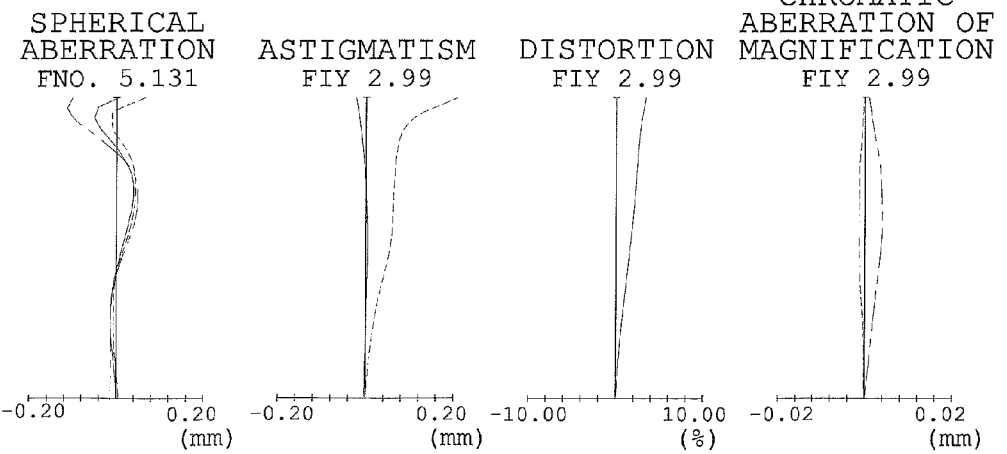

COMA AT
WIDE ANGLE END

COMA AT
MIDDLE

COMA AT
TELEPHOTO END 486.13 — - —
656.27 ---------
587.56 ———

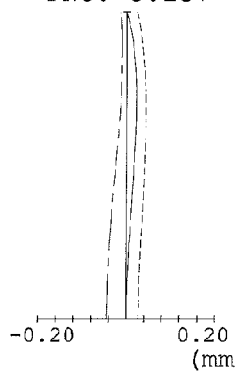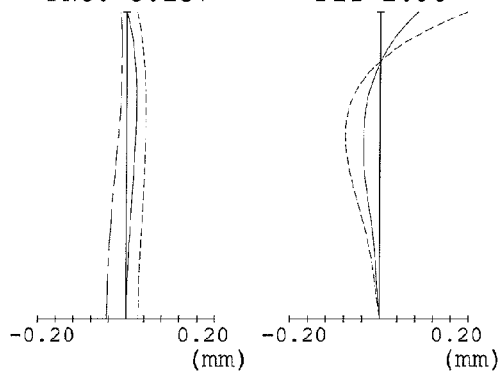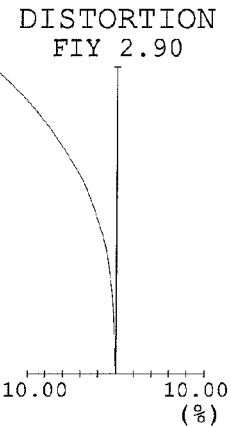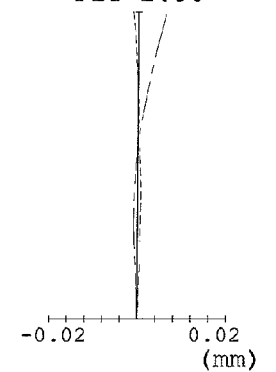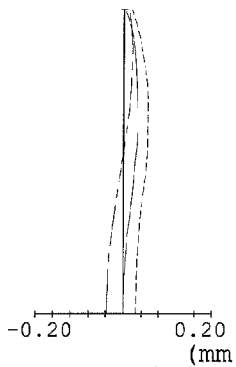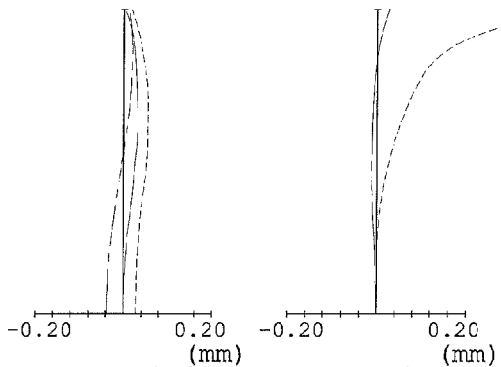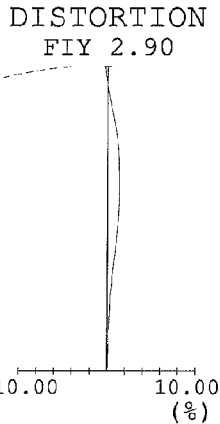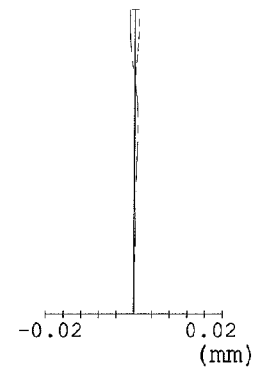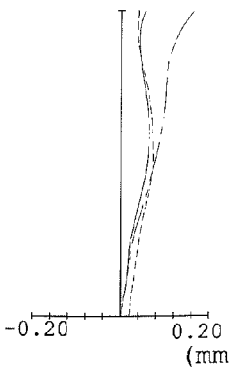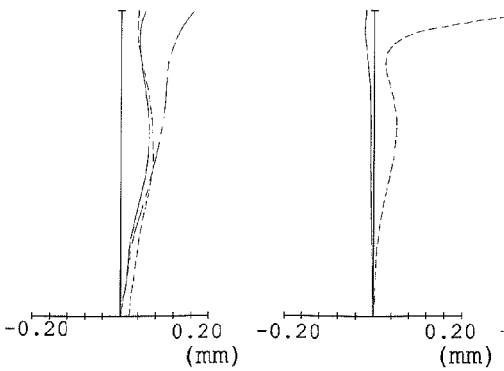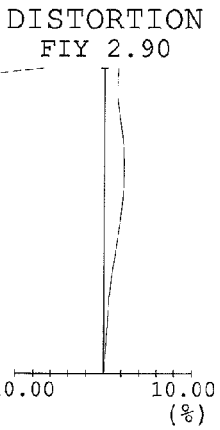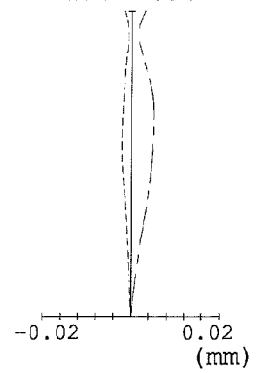

FIG.29A SPHERICAL ABERRATION FNO. 3.137
FIG.29B ASTIGMATISM FIY 2.90
FIG.29C DISTORTION FIY 2.90
FIG.29D CHROMATIC ABERRATION OF MAGNIFICATION FIY 2.90

FIG.29E SPHERICAL ABERRATION FNO. 4.383
FIG.29F ASTIGMATISM FIY 2.90
FIG.29G DISTORTION FIY 2.90
FIG.29H CHROMATIC ABERRATION OF MAGNIFICATION FIY 2.90

FIG.29I SPHERICAL ABERRATION FNO. 5.181
FIG.29J ASTIGMATISM FIY 2.90
FIG.29K DISTORTION FIY 2.90
FIG.29L CHROMATIC ABERRATION OF MAGNIFICATION FIY 2.90

486.13 — — 656.27 - - - - 587.56 ———

COMA AT
WIDE ANGLE END

COMA AT
MIDDLE

COMA AT
TELEPHOTO END 486.13 —·—
656.27 --------
587.56 ———

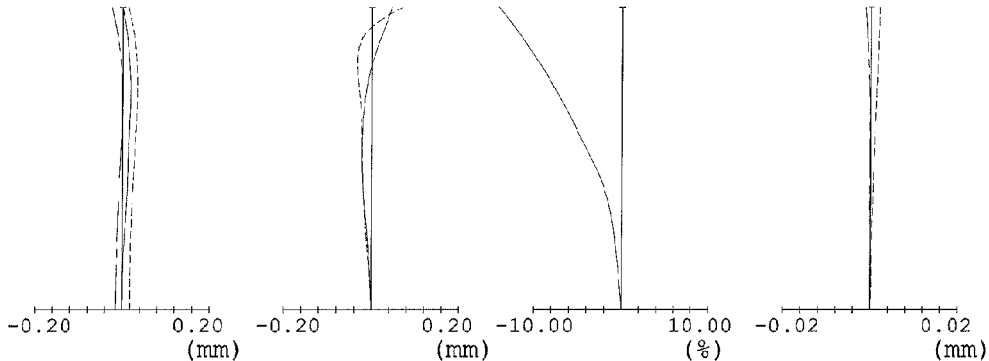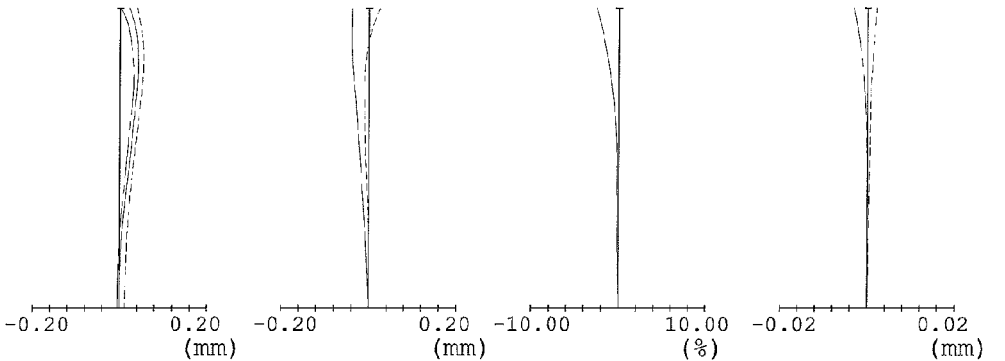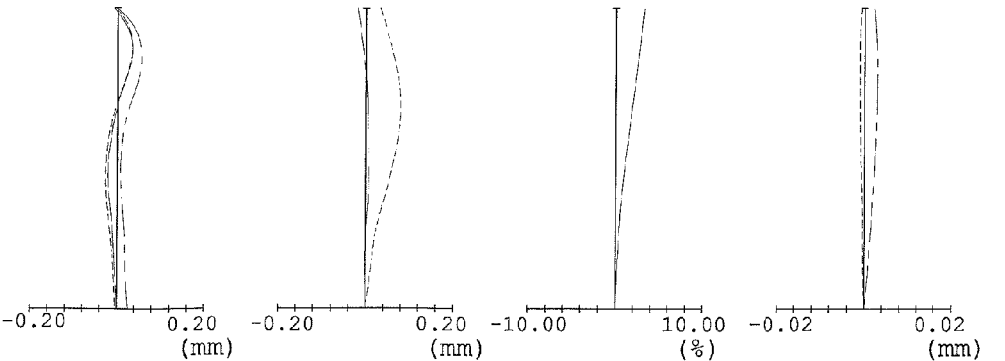

COMA AT
WIDE ANGLE END

COMA AT
MIDDLE

COMA AT
TELEPHOTO END 486.13 — · —
656.27 ---------
587.56 ————

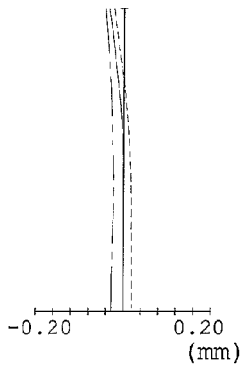
FIG.35A
SPHERICAL
ABERRATION
FNO. 3.500
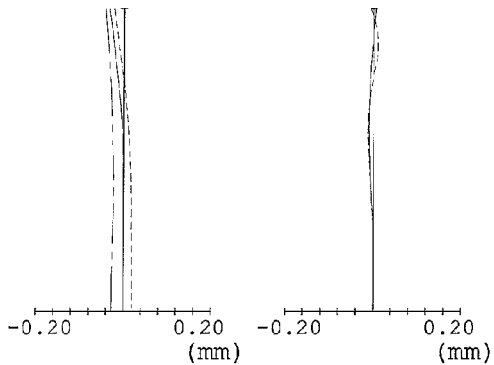
FIG.35B
ASTIGMATISM
FIY 2.25
FIG.35C
DISTORTION
FIY 2.25
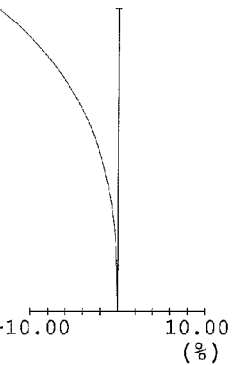
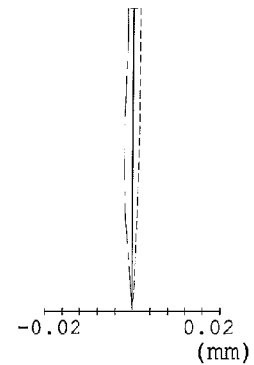
FIG.35D
CHROMATIC
ABERRATION OF
MAGNIFICATION
FIY 2.25
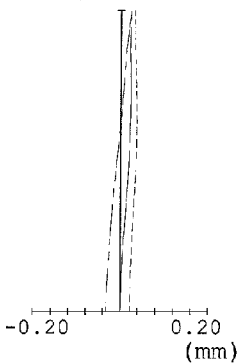
FIG.35E
SPHERICAL
ABERRATION
FNO. 4.729
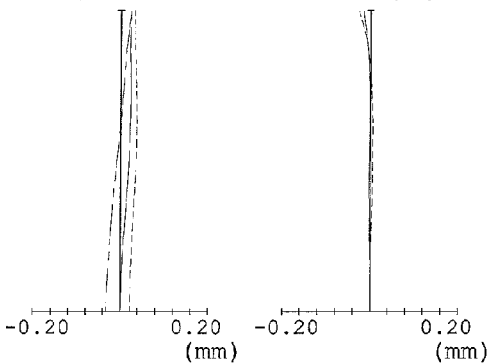
FIG.35F
ASTIGMATISM
FIY 2.25
FIG.35G
DISTORTION
FIY 2.25
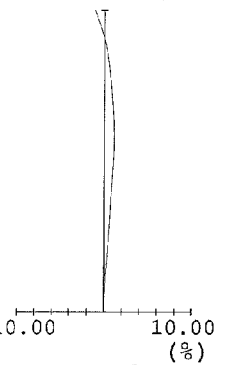
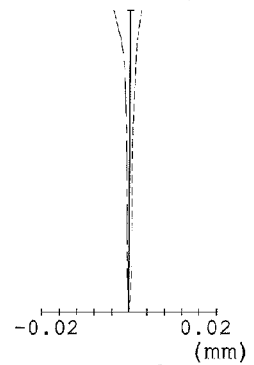
FIG.35H
CHROMATIC
ABERRATION OF
MAGNIFICATION
FIY 2.25
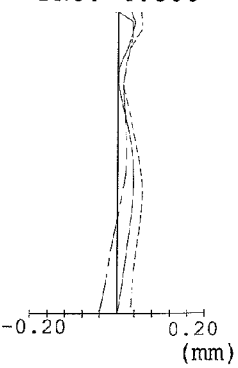
FIG.35I
SPHERICAL
ABERRATION
FNO. 4.800
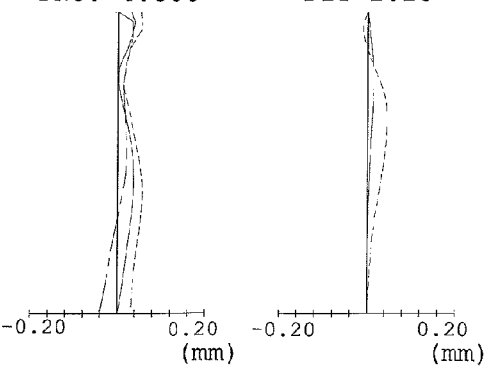
FIG.35J
ASTIGMATISM
FIY 2.25
FIG.35K
DISTORTION
FIY 2.25
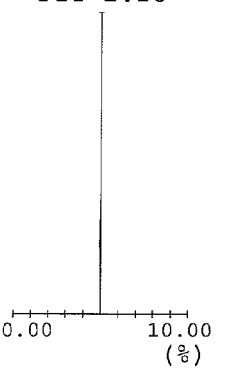
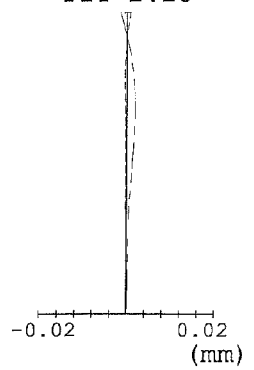
FIG.35L
CHROMATIC
ABERRATION OF
MAGNIFICATION
FIY 2.25
486.13 —·— 656.27 -------- 587.56 ———

COMA AT
WIDE ANGLE END

COMA AT
MIDDLE

COMA AT
TELEPHOTO END 486.13 — - —
656.27 ---------
587.56 ————

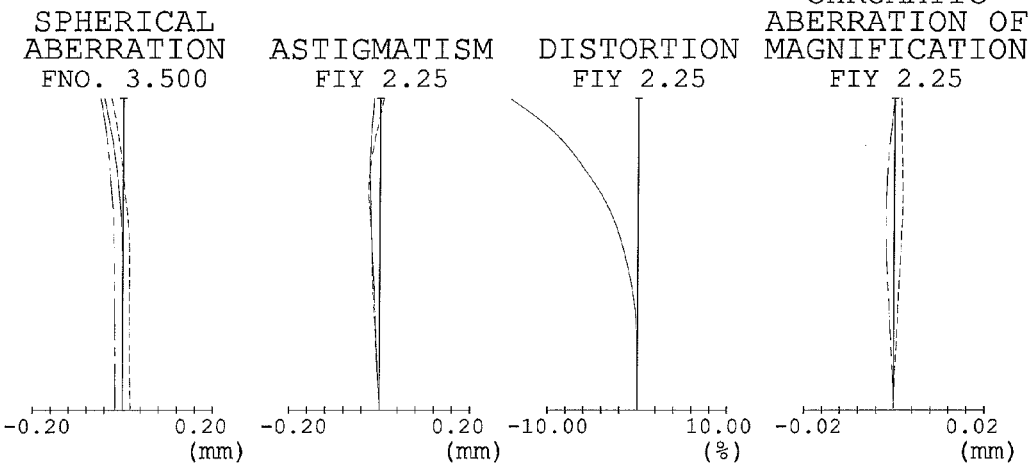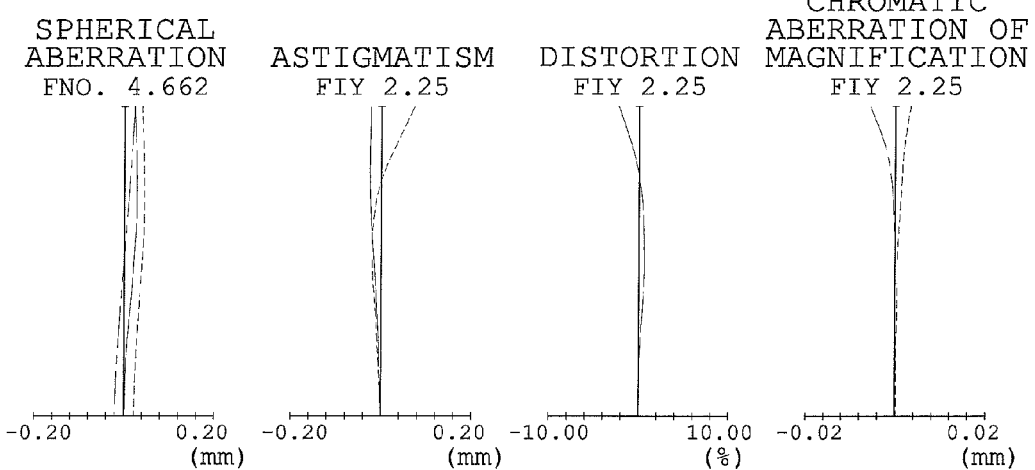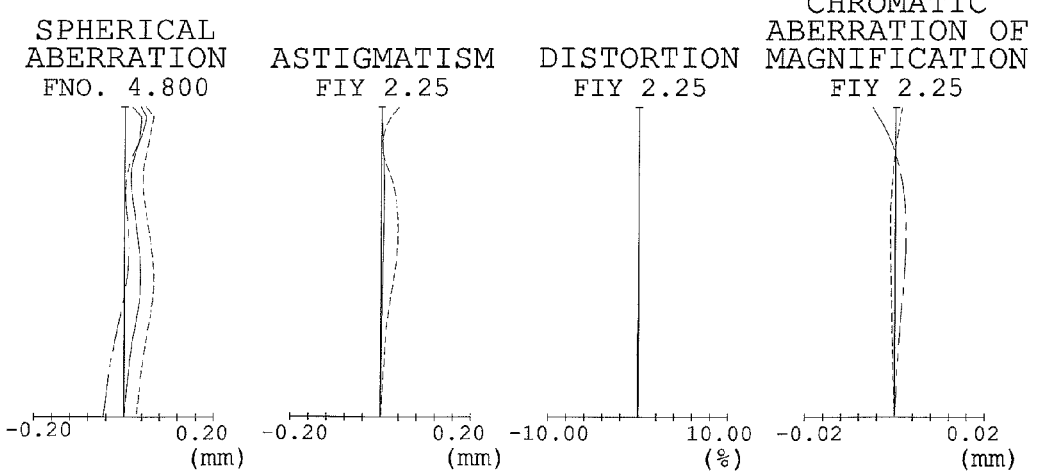

COMA AT
WIDE ANGLE END

COMA AT
MIDDLE

COMA AT
TELEPHOTO END 486.13 —— ——
656.27 ---------
587.56 ············

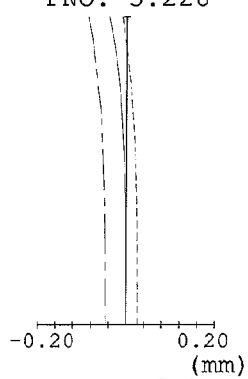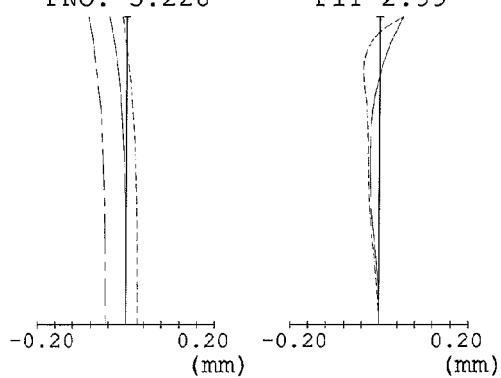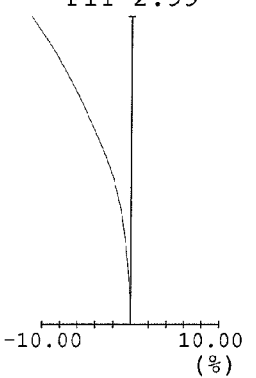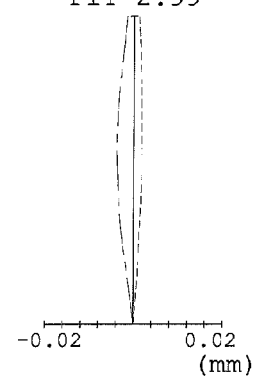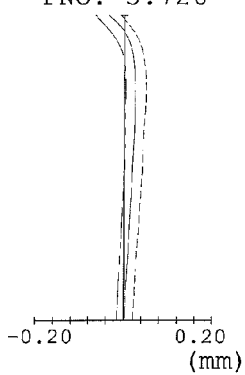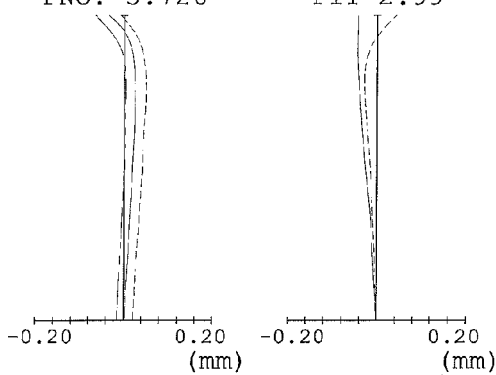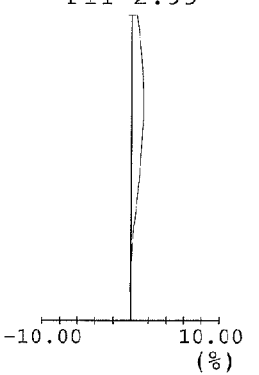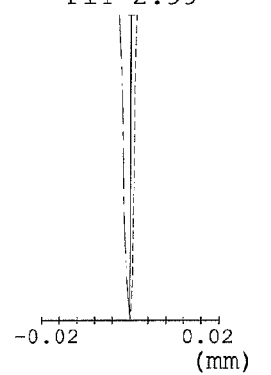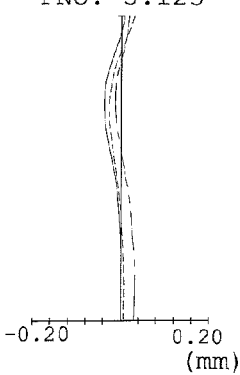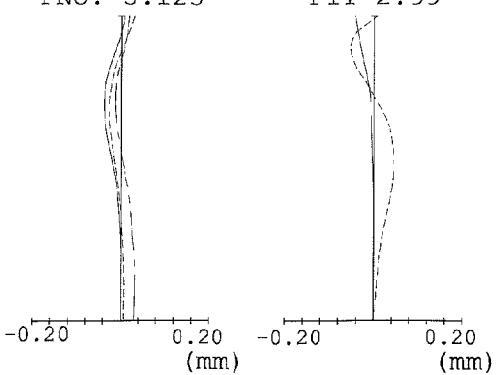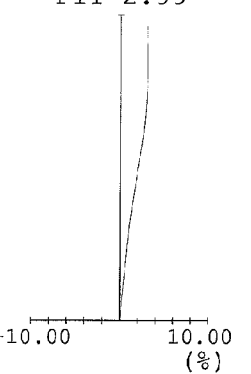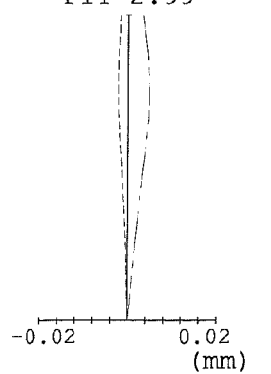

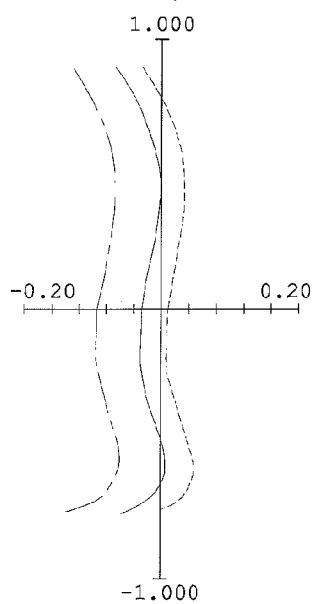
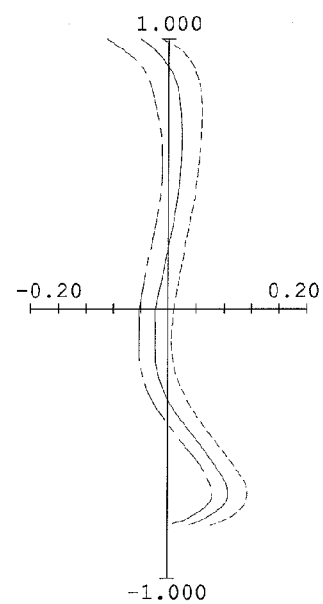
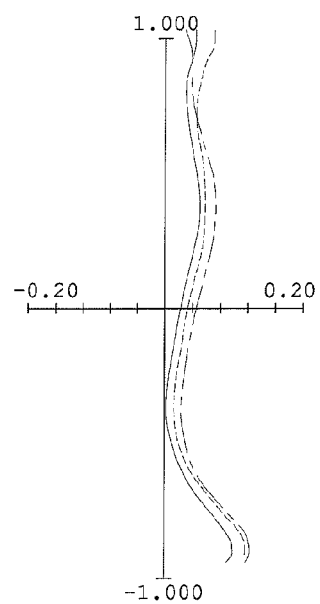
FIG.42A COMA AT WIDE ANGLE END
FIG.42B COMA AT MIDDLE
FIG.42C COMA AT TELEPHOTO END
486.13 — - —
656.27 ---------
587.56 ———

VARIABLE POWER OPTICAL SYSTEM AND IMAGE PICKUP APPARATUS HAVING THE SAME

This application claims benefits of Japanese Application No. 2009-212134 filed in Japan on Sep. 14, 2009, No. 2009-212135 filed in Japan on Sep. 14, 2009 and No. 2009-212136 filed in Japan on Sep. 14, 2009, the contents of which are hereby incorporated by reference.

BACKGROUND OF THE INVENTION

1. Field of Invention

This invention relates to a variable power optical system in which aberrations are corrected well while the value of the total length of the optical system relative to image height is being made to become small, and to an image pickup apparatus having the same.

2. Description of the Related Art

Digital cameras, which are provided with a solid-state imaging sensor like CCD (Charge Coupled Device) or CMOS (Complementary Metal-Oxide Semiconductor), have become mainstream instead of film-based cameras in recent years. These digital cameras include various kinds of digital cameras which range from high performance-type digital camera for business to compact popular-type digital camera.

And, in such digital cameras, compact popular-type digital cameras have improved in downsizing because of desires that users easily enjoy photography, so that digital cameras which can be put well in pockets of clothes or bags and are convenient to be carried have appeared. Accordingly, it has become necessary to downsize variable power optical systems for such digital cameras yet more. However, it has been required that variable power optical systems for such digital cameras have not only a small size but also high optical performance (aberrations are corrected well in such variable power optical systems).

Variable power optical systems which meet such requirements include variable power optical systems which are disclosed in International Publication WO 2006/115107 and Japanese Patent Kokai No. 2008-233611 respectively. International Publication WO 2006/115107 relates to a variable power optical system for correcting chromatic aberration of magnification. When an attempt to achieve a super-small-sized variable power optical system is made, the refractive power of a second lens group becomes strong, so that chromatic aberration of magnification at the telephoto end position becomes a problem. In International Publication WO 2006/115107, this problem is corrected by making the Abbe's number of a fourth lens group proper. Japanese Patent Kokai No. 2008-233611 relates to a variable power optical system which has high performances and is downsized and the first lens group of which consists of two lens.

SUMMARY OF THE INVENTION

A variable power optical system according to the present first invention is characterized in that: the variable power optical system at least includes, in order from the object side, a first lens group with negative refractive power, a magnification-changing group with positive refractive power, and a last lens group with positive refractive power; the magnification-changing group includes a first lens element with positive refractive power, a second lens element, and a third lens element in that order from the object side; the second lens element has a convex shape on the object side; the last lens group includes a positive lens; and the following conditions (1) and (2) are satisfied:

$$10 \leq VdLg \leq 45 \quad (1)$$

$$-1.0 < (R2a - R2b)/(R2a + R2b) < 1.0 \quad (2)$$

where VdLg denotes the Abbe' Number of the positive lens of the last lens group with respect to the d line, R2a denotes the radius of curvature of the object-side surface of the second lens element, and R2b denotes the radius of curvature of the image-side surface of the third lens element.

Also, in a variable power optical system according to the present first invention, it is preferred that: the variable power optical system consists of a first lens group with negative refractive power, a second lens group with positive refractive power, a third lens group with negative refractive power, and a fourth lens group with positive refractive power, in that order from the object side; and the magnification-changing group is the second lens group and the last lens group is the fourth lens group.

Also, in a variable power optical system according to the present first invention, it is preferred that the following condition (3) is satisfied:

$$0.45 \leq |f1|/(FLw \times FLt)^{1/2} \leq 1.60 \quad (3)$$

where f1 denotes the focal length of the first lens group, FLw denotes the focal length of the whole of the variable power optical system in the wide angle end position, and FLt denotes the focal length of the whole of the variable power optical system in the telephoto end position.

Also, in a variable power optical system according to the present first invention, it is preferred that the following condition (4) is satisfied:

$$0.30 \leq fv/(FLw \times FLt)^{1/2} \leq 1.10 \quad (4)$$

where fv denotes the focal length of the magnification-changing group, FLw denotes the focal length of the whole of the variable power optical system in the wide angle end position, and FLt denotes the focal length of the whole of the variable power optical system in the telephoto end position.

Also, in a variable power optical system according to the present first invention, it is preferred that: the positive lens in the last lens group has a concave shape on the object side; and the following condition (5) is satisfied:

$$0.1 \leq (RLa - RLb)/(RLa + RLb) < 1.0 \quad (5)$$

where RLa denotes the radius of curvature of the object-side surface of the positive lens in the last lens group, and RLb denotes the radius of curvature of the image-side surface of the positive lens in the last lens group.

Also, an image pickup apparatus according to the present first invention is characterized in that: the image pickup apparatus includes one of the above-described variable power optical systems according to the present first invention, and an imaging sensor; and the following condition (6) is satisfied:

$$1.0 \leq |f1|/IH \leq 2.8 \quad (6)$$

where f1 denotes the focal length of the first lens group, and IH denotes the image height of the imaging sensor.

Also, an image pickup apparatus according to the present first invention is characterized in that the image pickup apparatus includes one of the above described variable power optical systems according to the first present invention, and an imaging sensor; and the following condition (7) is satisfied:

$$0.2 \leq |fv|/IH \leq 1.8 \quad (7)$$

where fv denotes the focal length of the magnification-changing group, and IH denotes the image height of the imaging sensor.

Also, a variable power optical system according to the present second invention is characterized in that: the variable power optical system includes, in order from the object side, a first lens group with negative refractive power, a second lens group with positive refractive power, a third lens group with negative refractive power, and a fourth lens group with positive refractive power; the second lens group includes at least one positive lens and a negative lens; the fourth lens group includes a positive lens; and the following conditions (8), (9), and (10) are satisfied:

$$10 \leq Vd4g \leq 45 \tag{8}$$

$$2.2 \leq |\alpha/f1| + (\alpha/f2) - 0.026 \times Vd4g \leq 5.0 \tag{9}$$

$$10 \leq Vd\max - Vd\min \leq 80 \tag{10}$$

where $\alpha = (FLw \times FLt)^{1/2}$, FLw denotes the focal length of the whole of the variable power optical system in the wide angle end position, FLt denotes the focal length of the whole of the variable power optical system in the telephoto end position, f1 denotes the focal length of the first lens group, f2 denotes the focal length of the second lens group, Vd4g denotes the Abbe' Number of the positive lens of the fourth lens group with respect to the d line, Vdmax denotes the Abbe's Number of a glass material having the lowest dispersion characteristic of those of glass materials which are used for lenses of the second lens group, with respect to the d line, and Vdmin denotes the Abbe's Number of a glass material having the highest dispersion characteristic of those of glass materials which are used for lenses of the second lens group, with respect to the d line.

Also, in a variable power optical system according to the present second invention, it is preferred that the following condition (3) is satisfied:

$$0.45 \leq |f1|/(FLw \times FLt)^{1/2} \leq 1.60 \tag{3}$$

where f1 denotes the focal length of the first lens group, FLw denotes the focal length of the whole of the variable power optical system in the wide angle end position, and FLt denotes the focal length of the whole of the variable power optical system in the telephoto end position.

Also, in a variable power optical system according to the present second invention, it is preferred that the following condition (11) is satisfied:

$$0.30 \leq f2/(FLw \times FLt)^{1/2} \leq 1.10 \tag{11}$$

where f2 denotes the focal length of the second lens group, FLw denotes the focal length of the whole of the variable power optical system in the wide angle end position, and FLt denotes the focal length of the whole of the variable power optical system in the telephoto end position.

Also, in a variable power optical system according to the present second invention, it is preferred that: the second lens group consists of a first lens element with positive refractive power, a second lens element, and a third lens element in that order from the object side; the first lens element has a convex shape on the object side; and the following condition (2) is satisfied:

$$-1.0 < (R2a - R2b)/(R2a + R2b) < 1.0 \tag{2}$$

where R2a denotes the radius of curvature of the object-side surface of the second lens element, and R2b denotes the radius of curvature of the image-side surface of the third lens element.

Also, in a variable power optical system according to the present second invention, it is preferred that: the positive lens in the fourth lens group has a concave shape on the object side; and the following condition (12) is satisfied:

$$0 < (R4a - R4b)/(R4a + R4b) < 1.0 \tag{12}$$

where R4a denotes the radius of curvature of the object-side surface of the positive lens in the fourth lens group, and R4b denotes the radius of curvature of the image-side surface of the positive lens in the fourth lens group.

Also, an image pickup apparatus according to the present second invention is characterized in that: the image pickup apparatus includes one of the above-described variable power optical systems according to the second present invention, and an imaging sensor.

Also, in an image pickup apparatus according to the present second invention, it is preferred that: the image pickup apparatus includes a variable power optical system forming an optical image of an object, and an imaging sensor; the imaging sensor transforms the optical image formed by the variable power optical system into electrical image signals; the variable power optical system includes, in order from the object side, a first lens group with negative refractive power, a second lens group with positive refractive power, a third lens group with negative refractive power, and a fourth lens group with positive refractive power; the second lens group includes at least one positive lens and a negative lens; the fourth lens group includes a positive lens; and the following conditions (8), (13), and (10) are satisfied:

$$10 \leq Vd4g \leq 45 \tag{8}$$

$$-0.27 \leq |IH/f1| + (IH/f2) - 0.05 \times Vd4g \leq 3.0 \tag{13}$$

$$10 \leq Vd\max - Vd\min \leq 80 \tag{10}$$

where IH denotes the image height of the imaging sensor, f1 denotes the focal length of the first lens group, f2 denotes the focal length of the second lens group, Vd4g denotes the Abbe' Number of the positive lens of the fourth lens group with respect to the d line, Vdmax denotes the Abbe's Number of a glass material having the lowest dispersion characteristic of those of glass materials which are used for lenses of the second lens group, with respect to the d line, and Vdmin denotes the Abbe's Number of a glass material having the highest dispersion characteristic of those of glass materials which are used for lenses of the second lens group, with respect to the d line.

Also, in an image pickup apparatus according to the present second invention, it is preferred that the following condition (6) is satisfied:

$$1.0 \leq |f1|/IH \leq 2.8 \tag{6}$$

where f1 denotes the focal length of the first lens group, and IH denotes the image height of the imaging sensor.

Also, in an image pickup apparatus according to the present second invention, it is preferred that the following condition (14) is satisfied:

$$0.2 \leq |f2|/IH \leq 1.8 \tag{14}$$

where f2 denotes the focal length of the second lens group, and IH denotes the image height of the imaging sensor.

Also, in an image pickup apparatus according to the present second invention, it is preferred that: the second lens group consists of a first lens element with positive refractive power, a second lens element, and a third lens element in that order from the object side; the first lens element has a convex shape on the object side; and the following condition (2) is satisfied:

$$-1.0<(R2a-R2b)/(R2a+R2b)<1.0 \quad (2)$$

where R2a denotes the radius of curvature of the object-side surface of the second lens element, and R2b denotes the radius of curvature of the image-side surface of the third lens element.

Also, in an image pickup apparatus according to the present second invention, it is preferred that: the positive lens in the fourth lens group in the variable power optical system has a concave shape on the object side; and the following condition (12) is satisfied:

$$0<(R4a-R4b)/(R4a+R4b)<1.0 \quad (12)$$

where R4a denotes the radius of curvature of the object-side surface of the positive lens in the fourth lens group, and R4b denotes the radius of curvature of the image-side surface of the positive lens in the fourth lens group.

Also, a variable power optical system according to the present third invention is characterized in that: the variable power optical system includes, in order from the object side, a first lens group with negative refractive power, a second lens group with positive refractive power, a third lens group with negative refractive power, and a fourth lens group with positive refractive power; the first lens group includes one negative lens and one positive lens in that order from the object side, and an air distance is provided between the negative and positive lenses of the first lens group; and the following conditions (15), (16), and (17) are satisfied:

$$1.75 \leq Nd1g \leq 2.50 \quad (15)$$

$$15 \leq Vd1g \leq 43 \quad (16)$$

$$3 \leq VdN - VdP \leq 28 \quad (17)$$

where Nd1g denotes the refractive index of each of lenses constituting the first lens group, with respect to the d line, Vd1g denotes the Abbe's Number of each of lenses constituting the first lens group, with respect to the d lines, VdN denotes the Abbe's Number of the negative lens in the first lens group, with respect to the d lines, and VdP denotes the Abbe's Number of the positive lens in the first lens group, with respect to the d lines. Also, in a variable power optical system according to the present third invention, it is preferred that the following condition (18) is satisfied:

$$0.03 \leq D/(FLw \times FLt)^{1/2} \leq 0.26 \quad (18)$$

where D denotes the axial air distance between the negative and positive lenses of the first lens group, FLw denotes the focal length of the whole of the variable power optical system in the wide angle end position, and FLt denotes the focal length of the whole of the variable power optical system in the telephoto end position.

Also, in a variable power optical system according to the present third invention, it is preferred that: an air lens which has a convex shape on the object side is formed nearer to the image-plane side than the negative lens of the first lens group; and the following condition (19) is satisfied:

$$-0.25 \leq (r2-r3)/(r2+r3) \leq -0.07 \quad (19)$$

where r2 denotes the radius of curvature of the image-side surface of the negative lens of the first lens group, and r3 denotes the radius of curvature of the object-side surface of the positive lens of the first lens group.

Also, in a variable power optical system according to the present third invention, it is preferred that the following condition (3) is satisfied:

$$0.45 \leq |f1|/(FLw \times FLt)^{1/2} \leq 1.60 \quad (3)$$

where f1 denotes the focal length of the first lens group, FLw denotes the focal length of the whole of the variable power optical system in the wide angle end position, and FLt denotes the focal length of the whole of the variable power optical system in the telephoto end position.

Also, in a variable power optical system according to the present third invention, it is preferred that the following condition (20) is satisfied:

$$-0.5 \leq FLn/FLp \leq -0.3 \quad (20)$$

where FLn denotes the focal length of the negative lens of the first lens group, and FLp denotes the focal length of the positive lens of the first lens group.

Also, in a variable power optical system according to the present third invention, it is preferred that the following condition (11) is satisfied:

$$0.30 \leq f2/(FLw \times FLt)^{1/2} \leq 1.10 \quad (11)$$

where f2 denotes the focal length of the second lens group, FLw denotes the focal length of the whole of the variable power optical system in the wide angle end position, and FLt denotes the focal length of the whole of the variable power optical system in the telephoto end position.

Also, in a variable power optical system according to the present third invention, it is preferred that: the negative lens of the first lens group has a convex shape on the object side; and the following condition (21) is satisfied:

$$0.2 \leq (r1-r2)/(r1+r2) < 1.0 \quad (21)$$

where r1 denotes the radius of curvature of the object-side surface of the negative lens of the first lens group, and r2 denotes the radius of curvature of the image-side surface of the negative lens of the first lens group.

Also, in a variable power optical system according to the present third invention, it is preferred that: the fourth lens group consists of one lens with positive refractive power; and the following condition (22) is satisfied:

$$10 \leq Vd4g \leq 40 \quad (22)$$

where Vd4g denotes the Abbe's Number of the positive lens of the fourth lens group with respect to the d line.

Also, an image pickup apparatus according to the present third invention is characterized in that: the image pickup apparatus includes one of the above-described variable power optical systems according to the present third invention, and an imaging sensor; and the following condition (6) is satisfied:

$$1.0 \leq |f1|/IH \leq 2.8 \quad (6)$$

where f1 denotes the focal length of the first lens group, and IH denotes the image height of the imaging sensor.

Also, an image pickup apparatus according to the present third invention is characterized in that: the image pickup apparatus includes one of the above-described variable power optical systems according to the present third invention, and an imaging sensor; and the following condition (14) is satisfied:

$$0.2 \leq |f2|/IH \leq 1.8 \quad (14)$$

where f2 denotes the focal length of the second lens group, and IH denotes the image height of the imaging sensor.

The present invention can offer a variable power optical system in which aberrations are corrected well while the value of the total length of the variable power optical system relative to image height is being made to become small, and an image pickup apparatus having the same.

BRIEF DESCRIPTION OF THE DRAWINGS

FIG. 1 is a sectional view showing a variable power optical systems of an embodiment 1 according to the present invention, taken along the optical axis.

FIG. 2 are aberration diagrams in focusing at infinity in the embodiment 1, FIGS. 2A to 2D show a state in the wide angle end position, FIGS. 2E to 2H show a state in the middle position, and FIGS. 2I to 2L show a state in the telephoto end position.

FIG. 3 are aberration diagrams in focusing at close range in the embodiment 1.

FIG. 4 are aberration diagrams showing coma in the embodiment 1.

FIG. 5 is a sectional view showing a variable power optical system of an embodiment 2 according to the present invention, taken along the optical axis.

FIG. 6 are aberration diagrams in focusing at infinity in the embodiment 2, FIGS. 6A to 6D show a state in the wide angle end position, FIGS. 6E to 6H show a state in the middle position, and FIGS. 6I to 6L show a state in the telephoto end position.

FIG. 7 are aberration diagrams in focusing at close range in the embodiment 2.

FIG. 8 are aberration diagrams showing coma at 70 percent of image height in the embodiment 2.

FIG. 9 is a sectional view showing a variable power optical system of an embodiment 3 according to the present invention, taken along the optical axis.

FIG. 10 are aberration diagrams in focusing at infinity in the embodiment 3, FIGS. 10A to 10D show a state in the wide angle end position, FIGS. 10E to 10H show a state in the middle position, and FIGS. 10I to 10L show a state in the telephoto end position.

FIG. 11 are aberration diagrams in focusing at close range in the embodiment 3, FIGS. 11A to 11D show a state in the wide angle end position, FIGS. 11E to 11H show a state in the middle position, and FIGS. 11I to 11L show a state in the telephoto end position.

FIG. 12 are aberration diagrams showing coma at 70 percent of image height in the embodiment 3.

FIG. 13 is a sectional view showing a variable power optical system of an embodiment 4 according to the present invention, taken along the optical axis.

FIG. 14 are aberration diagrams in focusing at infinity in the embodiment 4, FIGS. 14A to 14D show a state in the wide angle end position, FIGS. 14E to 14H show a state in the middle position, and FIGS. 14I to 14L show a state in the telephoto end position.

FIG. 15 are aberration diagrams in focusing at close range in the embodiment 4, FIGS. 15A to 15D show a state in the wide angle end position, FIGS. 15E to 15H show a state in the middle position, and FIGS. 15I to 15L show a state in the telephoto end position.

FIG. 16 are aberration diagrams showing coma at 70 percent of image height in the embodiment 4.

FIG. 17 is a sectional view showing a variable power optical system of an embodiment 5 according to the present invention, taken along the optical axis.

FIG. 18 are aberration diagrams in focusing at infinity in the embodiment 5, FIGS. 18A to 18D show a state in the wide angle end position, FIGS. 18E to 18H show a state in the middle position, and FIGS. 18I to 18L show a state in the telephoto end position.

FIG. 19 are aberration diagrams in focusing at close range in the embodiment 5, FIGS. 19A to 19D show a state in the wide angle end position, FIGS. 19E to 19H show a state in the middle position, and FIGS. 19I to 19L show a state in the telephoto end position.

FIG. 20 are aberration diagrams showing coma at 70 percent of image height in the embodiment 5.

FIG. 21 is a sectional view showing a variable power optical system of an embodiment 6 according to the present invention, taken along the optical axis.

FIG. 22 are aberration diagrams in focusing at infinity in the embodiment 6, FIGS. 22A to 22D show a state in the wide angle end position, FIGS. 22E to 22H show a state in the middle position, and FIGS. 22I to 22L show a state in the telephoto end position.

FIG. 23 are aberration diagrams in focusing at close range in the embodiment 6, FIGS. 23A to 23D show a state in the wide angle end position, FIGS. 23E to 23H show a state in the middle position, and FIGS. 23I to 23L show a state in the telephoto end position.

FIG. 24 are aberration diagrams showing coma at 70 percent of image height in the embodiment 6, FIG. 24A shows a state in focusing at infinity in the wide angle end position, FIG. 24B shows a state in focusing at infinity in the middle position, FIG. 24C shows a state in focusing at infinity in the telephoto end position, FIG. 24D shows a state in focusing at close range in the wide angle end position, FIG. 24E shows a state in focusing at close range in the middle position, and FIG. 24F shows a state in focusing at close range in the telephoto end position.

FIG. 25 is a sectional view showing a variable power optical system of an embodiment 7 according to the present invention, taken along the optical axis.

FIG. 26 are aberration diagrams in focusing at infinity in the embodiment 7, FIGS. 26A to 26D show a state in the wide angle end position, FIGS. 26E to 26H show a state in the middle position, and FIGS. 26I to 26L show a state in the telephoto end position.

FIG. 27 are aberration diagrams showing coma at 70 percent of image height in the embodiment 7.

FIG. 28 is a sectional view showing a variable power optical system of an embodiment 8 according to the present invention, taken along the optical axis.

FIG. 29 are aberration diagrams in focusing at infinity in the embodiment 8, FIGS. 29A to 29D show a state in the wide angle end position, FIGS. 29E to 29H show a state in the middle position, and FIGS. 29I to 29L show a state in the telephoto end position.

FIG. 30 are aberration diagrams showing coma at 70 percent of image height in the embodiment 8.

FIG. 31 is a sectional view showing a variable power optical system of an embodiment 9 according to the present invention, taken along the optical axis.

FIG. 32 are aberration diagrams in focusing at infinity in the embodiment 9, FIGS. 32A to 32D show a state in the wide angle end position, FIGS. 32E to 32H show a state in the middle position, and FIGS. 32I to 32L shows a state in the telephoto end position.

FIG. 33 are aberration diagrams showing coma at 70 percent of image height in the embodiment 9.

FIG. 34 is a sectional view showing a variable power optical system of an embodiment 10 according to the present invention, taken along the optical axis.

FIG. 35 are aberration diagrams in focusing at infinity in the embodiment 10, FIGS. 35A to 35D show a state in the wide angle end position, FIGS. 35E to 35H show a state in the middle position, and FIGS. 35I to 35L show a state in the telephoto end position.

FIG. 36 are aberration diagrams showing coma at 70 percent of image height in the embodiment 10.

FIG. 37 is a sectional view showing a variable power optical system of an embodiment 11 according to the present invention, taken along the optical axis.

FIG. 38 are aberration diagrams in focusing at infinity in the embodiment 11, FIGS. 38A to 38D show a state in the wide angle end position, FIGS. 38E to 38H show a state in the middle position, and FIGS. 38I to 38L show a state in the telephoto end position.

FIG. 39 are aberration diagrams showing coma at 70 percent of image height in the embodiment 11.

FIG. 40 is a sectional view showing a variable power optical system of an embodiment 12 according to the present invention, taken along the optical axis.

FIG. 41 are aberration diagrams in focusing at infinity in the embodiment 12, FIGS. 41A to 41D show a state in the wide angle end position, FIGS. 41E to 41H show a state in the middle position, and FIGS. 41I to 41L show a state in the telephoto end position.

FIG. 42 are aberration diagrams showing coma at 70 percent of image height in the embodiment 12, FIG. 42A shows a state in focusing at infinity in the wide angle end position, FIG. 42B shows a state in focusing at infinity in the middle position, and FIG. 42C shows a state in focusing at infinity in the telephoto end position.

DETAILED DESCRIPTION OF THE PREFERRED EMBODIMENT

Figure 1A:
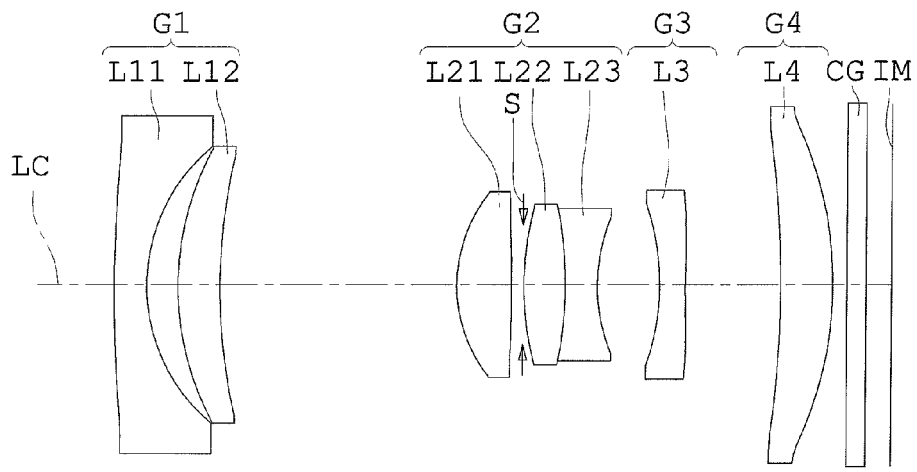
FIG. 1A shows the configuration of lenses in the wide angle end position.

Prior to the description of the embodiments, operation and its effect in variable power optical systems according to the present invention and in image pickup apparatuses having the same will be explained.

A variable power optical system of the first embodiment is characterized in that: the variable power optical system at least includes, in order from the object side, a first lens group with negative refractive power, a magnification-changing group with positive refractive power, and a last lens group with positive refractive power; the magnification-changing group includes a first lens element with positive refractive power, a second lens element, and a third lens element in that order from the object side; the second lens element has a convex shape on the object side; the last lens group includes a positive lens; and the following conditions (1) and (2) are satisfied:

$$10 \leq VdLg \leq 45 \tag{1}$$

$$-1.0 < (R2a-R2b)/(R2a+R2b) < 1.0 \tag{2}$$

where VdLg denotes the Abbe' Number of the positive lens of the last lens group with respect to the d line, R2a denotes the radius of curvature of the object-side surface of the second lens element, and R2b denotes the radius of curvature of the image-side surface of the third lens element.

The condition (1) shows the Abbe's Number of the positive lens of the last lens group. The condition (2) shows the shape factor for the second lens element and the third lens element. When the position of the principal point of a positive group that is the magnification-changing group is moved near the object side in retrofocus-type optical systems in general, it is possible to shorten the total lengths of the retrofocus-type optical systems while the positive group is not physically intercepting with the negative group. Also, the magnification-changing group has a meniscus shape which becomes convex on the object side, by making the optical systems satisfy the condition (2). In this case, the principal point of the magnification-changing group can be moved near the object side. As a result, it is possible to control the variations in various aberrations.

If VdLg is below the lower limit of the condition (1), there is no actual glass material for the positive lens, so that it is impossible to achieve desired optical systems. On the other hand, if VdLg is beyond the upper limit of the condition (1), it becomes difficult to correct chromatic aberration of magnification well in the telephoto end position.

If (R2a-R2b)/(R2a+R2b) is below the lower limit of the condition (2), it is impossible to control the variations in spherical aberration and coma in changing magnification. On the other hand, if (R2a-R2b)/(R2a+R2b) is beyond the upper limit of the condition (2), it is impossible to move near the object side the principal point of the magnification-changing group. In addition, it is impossible to control the variations in spherical aberration and coma in changing magnification.

When the conditions (1) and (2) are satisfied at the same time as described above, it is possible to achieve a variable power optical system in which the value of the total length of the variable power optical system relative to image height is made to become small and in which various aberrations are corrected well. Specifically, it is possible to achieve a variable power optical system in which chromatic aberration of magnification in the telephoto end position and the variations in spherical aberration and coma in changing magnification are particularly corrected well (in particular, the variations in spherical aberration and coma are controlled better).

Also, it is preferred that the variable power optical system of the first embodiment satisfies the following conditions (1-1) and (2-1) instead of the conditions (1) and (2):

$$15 \leq VdLg \leq 40 \tag{1-1}$$

$$-0.8 < (R2a-R2b)/(R2a+R2b) < 0.88 \tag{2-1}$$

When the conditions (1-1) and (2-1) are satisfied, it is possible to achieve a variable power optical system in which the value of the total length of the variable power optical system relative to image height is small and in which various aberrations are corrected better. Specifically, it is possible to achieve a variable power optical system in which chromatic aberration of magnification in the telephoto end position and the variations in spherical aberration and coma in changing magnification are particularly corrected better.

Also, in a variable power optical system of the first embodiment, it is preferred that the second lens element in the magnification-changing group has positive refractive power and the third lens element in the magnification-changing group has negative refractive power.

Also, in a variable power optical system of the first embodiment, it is preferred that: the variable power optical system consists of a first lens group with negative refractive power, a second lens group with positive refractive power, a third lens group with negative refractive power, and a fourth lens group with positive refractive power, in that order from the object side; and the magnification-changing group is the second lens group and the last lens group is the fourth lens group.

Also, in a variable power optical system of the first embodiment, it is preferred that the first lens group is made to keep still in changing magnification from the wide angle end position to the telephoto end position or in performing shooting by switching from shooting at infinity to shooting in close range. Because the total length is fixed in changing magnification, it is possible to easily secure the strength of a lens frame. In addition, because the structure of the lens frame can be simplified, it is possible to downsize the optical system.

Also, in a variable power optical system of the first embodiment, it is preferred that the fourth lens group is made to keep still in changing magnification from the wide angle end position to the telephoto end position or in performing shooting by switching from shooting at infinity to shooting in close range.

It is possible to make the movable components with two lens groups the number of which is the minimum number, by fixing the fourth lens group. As a result, the structure of the lens frame can be simplified, so that it is possible to downsize the optical system. In addition, it is possible to control the variations in aberrations, by arranging fixed groups on the object side and the image plane side of the two movable groups.

Also, in a variable power optical system according to the first embodiment, it is preferred that the following condition (3) is satisfied:

$$0.45 \leq |f1|/(FLw \times FLt)^{1/2} \leq 1.60 \quad (3)$$

where f1 denotes the focal length of the first lens group, FLw denotes the focal length of the whole of the variable power optical system in the wide angle end position, and FLt denotes the focal length of the whole of the variable power optical system in the telephoto end position.

Because the refractive power of the first lens group is strong, it is possible to move near the image plane side the point at which a virtual image is formed by the first lens group. As a result, it is possible to shorten the total length of the optical system. However, when the refractive power becomes large, it generally becomes difficult to correct aberrations. When the condition (3) is satisfied, it is possible to achieve a variable power optical system in which the value of the total length of the optical system relative to image height is small and in which various aberrations are corrected well. Specifically, it is possible to achieve a variable power optical system in which the variations in spherical aberration and coma in changing magnification are particularly corrected (controlled) well.

If $|f1|/(FLw \times FLt)^{1/2}$ is below the lower limit of the condition (3), it is impossible to control the variations in spherical aberration and coma in changing magnification. On the other hand, if $|f1|/(FLw \times FLt)^{1/2}$ is beyond the upper limit of the condition (3), it becomes difficult to move near the image plane side the point at which the virtual image is formed by the first lens group, which is undesirable.

Also, in a variable power optical system according to the first embodiment, it is preferred that the following condition (3-1) is satisfied instead of the condition (3):

$$0.50 \leq |f1|/(FLw \times FLt)^{1/2} \leq 1.04 \quad (3-1)$$

When the condition (3-1) is satisfied, it is possible to achieve a variable power optical system in which the value of the total length of the optical system relative to image height is small and in which various aberrations are corrected better. Specifically, it is possible to achieve a variable power optical system in which the variations in spherical aberration and coma in changing magnification are particularly corrected (controlled) better.

Also, in a variable power optical system according to the first embodiment, it is preferred that the first lens group consists of two or less lens elements.

Also, in a variable power optical system according to the first embodiment, it is preferred that the following condition (4) is satisfied:

$$0.30 \leq fv/(FLw \times FLt)^{1/2} \leq 1.10 \quad (4)$$

where fv denotes the focal length of the magnification-changing group, FLw denotes the focal length of the whole of the variable power optical system in the wide angle end position, and FLt denotes the focal length of the whole of the variable power optical system in the telephoto end position.

The condition (4) shows the focal length of the magnification-changing group. It generally becomes possible to reduce an amount of movement of the magnification-changing group in changing magnification by making the magnification-changing group have sufficiently strong refractive power. As a result, it is possible to shorten the total length of the optical system. However, when the refractive power becomes large, it generally becomes difficult to correct aberrations. When the condition (4) is satisfied, it is possible to achieve a variable power optical system in which the value of the total length of the variable power optical system relative to image height is small and in which various aberrations are corrected well. Specifically, it is possible to achieve a variable power optical system in which spherical aberration is particularly corrected well.

If $fv/(FLw \times FLt)^{1/2}$ is below the lower limit of the condition (4), spherical aberration inevitably becomes worse, which is undesirable. On the other hand, if $fv/(FLw \times FLt)^{1/2}$ is beyond the upper limit of the condition (4), an amount of movement of the magnification-changing group inevitably increases in changing magnification, which is undesirable.

Also, in a variable power optical system according to the first embodiment, it is preferred that the following condition (4-1) is satisfied instead of the condition (4):

$$0.35 \leq fv/(FLw \times FLt)^{1/2} \leq 0.62 \quad (4-1)$$

When the condition (4-1) is satisfied, it is possible to achieve a variable power optical system in which the value of the total length of the optical system relative to image height is small and in which various aberrations are corrected better. Specifically, it is possible to achieve a variable power optical system in which spherical aberration is particularly corrected better.

Also, in a variable power optical system according to the present first invention, it is preferred that the last lens group consists of one lens element having positive refractive power.

Also, in a variable power optical system according to the first embodiment, it is preferred that: the positive lens in the last lens group has a concave shape on the object side; and the following condition (5) is satisfied:

$$0.1 \leq (RLa - RLb)/(RLa + RLb) \leq 1.0 \quad (5)$$

where RLa denotes the radius of curvature of the object-side surface of the positive lens in the last lens group, and RLb denotes the radius of curvature of the image-side surface of the positive lens in the last lens group.

The condition (5) shows the shape factor of the positive lens of the last lens group. When the condition (5) is satisfied, the shape of the positive lens becomes a meniscus shape which becomes convex on the object side. As a result, it is possible to achieve a variable power optical system in which various aberrations are corrected well. Specifically, it is possible to achieve a variable power optical system in which the variation in field curvature in changing magnification is particularly corrected (controlled) well. On the other hand, if the condition (5) is not satisfied, it is impossible to control the variation in field curvature in changing magnification.

Also, in a variable power optical system according to the first embodiment, it is preferred that the following condition (5-1) is satisfied instead of the condition (5):

$$0.1 \leq (RLa - RLb)/(RLa + RLb) < 0.9 \quad (5-1)$$

When the condition (5-1) is satisfied, it is possible to achieve a variable power optical system in which the value of the total length of the optical system relative to image height is small and in which various aberrations are corrected better. Specifically, it is possible to achieve a variable power optical system in which the variation in field curvature in changing magnification is particularly corrected (controlled) better.

Also, an image pickup apparatus of a first embodiment according to the present invention is characterized in that: the image pickup apparatus includes one of the above-described variable power optical systems according to the first embodiment, and an imaging sensor; and the following condition (6) is satisfied:

$$1.0 \leq |f1|/IH \leq 2.8 \quad (6)$$

where f1 denotes the focal length of the first lens group, and IH denotes the image height of the imaging sensor.

Because the refractive power of the first lens group is strong, it is possible to move near the image plane side the point at which a virtual image is formed by the first lens group. As a result, it is possible to shorten the total length of the optical system. However, when the refractive power becomes large, it generally becomes difficult to correct aberrations. When the condition (6) is satisfied, it is possible to achieve a variable power optical system in which the value of the total length of the variable power optical system relative to image height is small and in which various aberrations are corrected well. Specifically, it is possible to achieve a variable power optical system in which the variations in spherical aberration and coma in changing magnification are particularly corrected (controlled) well.

In this case, IH denotes the image height of the imaging sensor. In a more detailed explanation, IH is half as long as the diagonal length of the image plane of the imaging sensor. Besides, the height of an image formed on the imaging sensor may be used as IH (where the height of an image formed on the imaging sensor is the distance between the optical axis and the maximum image height).

If |f1|/IH is below the lower limit of the condition (6), it is impossible to control the variations in spherical aberration and coma in changing magnification. On the other hand, if|f1|/IH is beyond the upper limit of the condition (6), it is becomes difficult to move near the image plane side the point at which a virtual image is formed by the first lens group, which is undesirable.

Also, in an image pickup apparatus according to the first embodiment, it is preferred that the following condition (6-1) is satisfied instead of the condition (6):

$$1.8 \leq |f1|/IH \leq 2.6 \quad (6-1)$$

When the condition (6-1) is satisfied, it is possible to achieve a variable power optical system in which the value of the total length of the optical system relative to image height is small and in which various aberrations are corrected better. Specifically, it is possible to achieve a variable power optical system in which the variations in spherical aberration and coma in changing magnification are particularly corrected (controlled) better.

Also, an image pickup apparatus according to the first embodiment is characterized in that the image pickup apparatus includes one of the above described variable power optical systems according to the first embodiment, and an imaging sensor; and the following condition (7) is satisfied:

$$0.2 \leq |fv|/IH \leq 1.8 \quad (7)$$

where fv denotes the focal length of the magnification-changing group, and IH denotes the image height of the imaging sensor.

It is generally possible to reduce an amount of movement of the magnification-changing group in changing magnification by making the magnification-changing group have sufficiently strong refractive power. As a result, it is possible to shorten the total length of the optical system. However, when the refractive power becomes large, it generally becomes difficult to correct aberrations. When the condition (7) is satisfied, it is possible to achieve a variable power optical system in which the value of the total length of the variable power optical system relative to image height is small and in which various aberrations are corrected well. Specifically, it is possible to achieve a variable power optical system in which spherical aberration is particularly corrected better. Besides, IH (image height) is as described above.

If |fv|/IH is below the lower limit of the condition (7), spherical aberration inevitably becomes worse, which is undesirable. On the other hand, if |fv|/IH is beyond the upper limit of the condition (7), an amount of movement of the magnification-changing group inevitably increases in changing magnification, which is undesirable.

Also, in an image pickup apparatus according to the first embodiment, it is preferred that the following condition (7-1) is satisfied instead of the condition (7):

$$1.0 \leq |fv|/IH \leq 1.5 \quad (7-1)$$

When the condition (7-1) is satisfied, it is possible to achieve a variable power optical system in which the value of the total length of the optical system relative to image height is small and in which various aberrations are corrected better. Specifically, it is possible to achieve a variable power optical system in which spherical aberration is particularly corrected better.

Also, a variable power optical system according to the second embodiment is characterized in that: the variable power optical system includes, in order from the object side, a first lens group with negative refractive power, a second lens group with positive refractive power, a third lens group with negative refractive power, and a fourth lens group with positive refractive power; the second lens group includes at least one positive lens and a negative lens; the fourth lens group includes a positive lens; and the following conditions (8), (9), and (10) are satisfied:

$$10 \leq Vd4g \leq 45 \quad (8)$$

$$2.2 \leq |\alpha/f1| + (\alpha/f2) - 0.026 \times Vd4g \leq 5.0 \quad (9)$$

$$10 \leq Vdmax - Vdmin \leq 80 \quad (10)$$

where $\alpha = (FLw \times FLt)^{1/2}$, FLw denotes the focal length of the whole of the variable power optical system in the wide angle end position, FLt denotes the focal length of the whole of the variable power optical system in the telephoto end position, f1 denotes the focal length of the first lens group, f2 denotes the focal length of the second lens group, Vd4g denotes the Abbe' Number of the positive lens of the fourth lens group with respect to the d line, Vdmax denotes the Abbe's Number of a glass material having the lowest dispersion characteristic of those of glass materials which are used for lenses of the second lens group, with respect to the d line, and Vdmin denotes the Abbe's Number of a glass material having the highest dispersion characteristic of those of glass materials which are used for lenses of the second lens group, with respect to the d line.

In order to achieve an optical system in which the value of the total length of the variable power optical system relative to image height is small and in which various aberrations are corrected well, various aberrations have to be corrected in each of the lens groups while the power of each of the lens groups is being strengthened. For example, in the case where the fourth lens groups is composed of one positive lens, the positive lens should be made of a low dispersion material in order to control the occurrence of chromatic aberration by a single lens. However, if the value of the total length of the variable power optical system relative to image height is made to become smaller, the required power of each of the first and second lens groups increases, so that it becomes impossible to balance the power with the corrections of various aberrations (monochromatic aberration/chromatic aberration) in each of the lens groups.

Specifically, required power in the first lens group increases, so that the variations in monochromatic aberrations (spherical aberration/coma) become large in changing magnification. Accordingly, in order to correct the monochromatic aberrations, the variations in monochromatic aberrations (spherical aberration/coma) are mainly controlled in the first lens group. However, the occurrence of chromatic aberration in the first lens group becomes frequent with the control of the variations in monochromatic aberrations. In addition, required power in the second lens group increases and chromatic aberration frequently occurs.

Accordingly, in the variable power optical system of the second embodiment, the fourth lens group is made to satisfy the condition (8) in order to correct these aberrations well. The condition (8) shows the Abbe's Number of the positive lens in the fourth lens group. The condition (9) shows the relation between the Abbe's Number of the positive lens in the fourth lens group and the powers of the first and second lens groups. The condition (10) shows the difference between a glass material having the lowest dispersion characteristic of those of grass materials for the second lens group and a glass material having the highest dispersion characteristic of those of the grass materials for the second lens group.

When both of the conditions (8) and (9) are satisfied, it is possible to achieve a variable power optical system in which the value of the total length of the variable power optical system relative to image height is small and in which various aberrations are corrected well. In addition, when the condition (10) is also satisfied, it is possible to achieve a variable power optical system in which various aberrations are corrected better.

If Vd4g is below the lower limit of the condition (8), there is no grass material, so that it is impossible to achieve a desired optical system. On the other hand, if Vd4g is beyond the upper limit of the condition (8), it becomes difficult to correct chromatic aberration of magnification well in the telephoto end position.

If $|\alpha/f1|+(\alpha/f2)-0.026\times Vd4g$ is below the lower limit of the condition (9), the powers of the first and second lens group are inadequate, so that it is impossible to shorten the total length of the optical system. On the other hand, if $|\alpha/f1|+(\alpha/f2)-0.026\times Vd4g$ is beyond the upper limit of the condition (9), the powers of the first and second lens groups become too strong, so that it is impossible to control the variations in spherical aberration and coma in changing magnification.

If Vdmax−Vdmin is below the lower limit of the condition (10), the correction of chromatic aberration in the second lens group mainly becomes inadequate. On the other hand, if Vdmax−Vdmin is beyond the upper limit of the condition (10), the correction of chromatic aberration in the second lens group mainly becomes surplus.

As described above, when the conditions (8), (9), and (10) are satisfied at the same time, it is possible to achieve a variable power optical system in which the value of the total length of the variable power optical system relative to image height is small and in which various aberrations are corrected well. Specifically, it is possible to achieve a variable power optical system in which the variations in spherical aberration and coma in changing magnification and chromatic aberration are corrected particularly well.

Also, in a variable power optical system according to the second embodiment, it is preferred that the following conditions (8-1), (9-1), and (10-1) are satisfied instead of the conditions (8), (9), and (10):

$$15 \leq Vd4g \leq 40 \quad (8\text{-}1)$$

$$2.25 \leq |\alpha/f1|+(\alpha/f2)-0.026\times Vd4g \leq 4.5 \quad (9\text{-}1)$$

$$15 \leq Vd\max - Vd\min \leq 70 \quad (10\text{-}1)$$

When the conditions (8-1), (9-1), and (10-1) are satisfied, it is possible to achieve a variable power optical system in which the value of the total length of the optical system relative to image height is small and in which various aberrations are corrected better. Specifically, it is possible to achieve a variable power optical system in which the variations in spherical aberration and coma in changing magnification and chromatic aberration are particularly corrected better.

Also, in a variable power optical system according to the second embodiment, it is preferred that the first lens group is made to keep still in changing magnification from the wide angle end position to the telephoto end position or in performing shooting by changing shooting at infinity to shooting in close range.

Because the total length of the variable power optical system is fixed in changing magnification, it is possible to easily secure the strength of a lens frame. In addition, because the structure of the lens frame can be simplified, it is possible to downsize the optical system.

Also, in a variable power optical system according to the second embodiment, it is preferred that the fourth lens group is made to keep still in changing magnification from the wide angle end position to the telephoto end position or in performing shooting by changing shooting at infinity to shooting in close range.

Because the fourth lens group is fixed in changing magnification, a minimum of two lens groups can be used as movable components. As a result, the structure of the lens frame can be simplified, so that it is possible to downsize the optical system. In addition, when fixed lens groups are arranged on the object and image-plane sides of the two movable lens groups, it is possible to control the variations in aberrations.

Also, in a variable power optical system according to the present second embodiment, it is preferred that the following condition (3) is satisfied:

$$0.45 \leq |f1|/(FLw \times FLt)^{1/2} \leq 1.60 \quad (3)$$

where f1 denotes the focal length of the first lens group, FLw denotes the focal length of the whole of the variable power optical system in the wide angle end position, and FLt denotes the focal length of the whole of the variable power optical system in the telephoto end position.

Because the refractive power of the first lens group is strong, it is possible to move near the image plane side the point at which a virtual image is formed by the first lens group. As a result, it is possible to shorten the total length of the optical system. However, when the refractive power becomes large, it generally becomes difficult to correct aberrations. When the condition (3) is satisfied, it is possible to achieve a variable power optical system in which the value of the total length of the optical system relative to image height is small and in which various aberrations are corrected well. Specifically, it is possible to achieve a variable power optical system in which the variations in spherical aberration and coma in changing magnification are particularly corrected (controlled) well.

If $|f1|/(FLw \times FLt)^{1/2}$ is below the lower limit of the condition (3), it is impossible to control the variations in spherical aberration and coma in changing magnification. On the other hand, if $|f1|/(FLw \times FLt)^{1/2}$ is beyond the upper limit of the condition (3), it becomes difficult to move near the image plane side the point at which the virtual image is formed by the first lens group, which is undesirable.

Also, in a variable power optical system according to the second embodiment, it is preferred that the following condition (3-1) is satisfied instead of the condition (3):

$$0.50 \le |f1|/(FLw \times FLt)^{1/2} \le 1.04 \qquad (3\text{-}1)$$

When the condition (3-1) is satisfied, it is possible to achieve a variable power optical system in which the value of the total length of the optical system relative to image height is small and in which various aberrations are corrected better. Specifically, it is possible to achieve a variable power optical system in which the variations in spherical aberration and coma in changing magnification are particularly corrected (controlled) better.

Also, in a variable power optical system according to the second embodiment, it is preferred that the first lens group consists of two or less lens elements.

Also, in a variable power optical system according to the second embodiment, it is preferred that the following condition (11) is satisfied:

$$0.30 \le f2/(FLw \times FLt)^{1/2} \le 1.10 \qquad (11)$$

where f2 denotes the focal length of the second lens group, FLw denotes the focal length of the whole of the variable power optical system in the wide angle end position, and FLt denotes the focal length of the whole of the variable power optical system in the telephoto end position.

When the refractive power of the second lens group is strong, it is generally possible to reduce an amount of movement of the lens group in changing magnification. As a result, it is possible to shorten the total length of the optical system. However, when the refractive power becomes large, it generally becomes difficult to correct aberrations. When the condition (11) is satisfied, it is possible to achieve a variable power optical system in which the value of the total length of the optical system relative to image height is small and in which various aberrations are corrected well. Specifically, it is possible to achieve a variable power optical system in which spherical aberration is particularly corrected well.

If $f2/(FLw \times FLt)^{1/2}$ is below the lower limit of the condition (11), spherical aberration inevitably becomes worse, which is undesirable. On the other hand, if $f2/(FLw \times FLt)^{1/2}$ is beyond the upper limit of the condition (11), an amount of movement of the lens group inevitably increases in changing magnification, which is undesirable.

Also, in a variable power optical system according to the second embodiment, it is preferred that the following condition (11-1) is satisfied instead of the condition (11):

$$0.35 \le f2/(FLw \times FLt)^{1/2} \le 0.62 \qquad (11\text{-}1)$$

When the condition (11-1) is satisfied, it is possible to achieve a variable power optical system in which the value of the total length of the optical system relative to image height is small and in which various aberrations are corrected better. Specifically, it is possible to achieve a variable power optical system in which spherical aberration is particularly corrected better.

Also, in a variable power optical system according to the second embodiment, it is preferred that: the second lens group consists of a first lens element (L21) with positive refractive power, a second lens element (L22), and a third lens element (L23) in that order from the object side; the first lens element (L21) has a convex shape on the object side; and the following condition (2) is satisfied:

$$-1.0 < (R2a - R2b)/(R2a + R2b) < 1.0 \qquad (2)$$

where R2a denotes the radius of curvature of the object-side surface of the second lens element (L22), and R2b denotes the radius of curvature of the image-side surface of the third lens element (L23).

The condition (2) shows the shape factor for the second lens element (L22) and the third lens element (L23). When the position of the principal point of a positive group that is the main magnification-changing group is moved near the object side in retrofocus-type optical systems in general, it is possible to shorten the total lengths of the retrofocus-type optical systems while the positive group is not physically intercepting with the negative group.

When the condition (2) is satisfied, the magnification-changing group has a meniscus shape which becomes convex on the object side, so that the principal point of the second lens group can be moved near the object side. As a result, it is possible to achieve a variable power optical system in which various aberrations are corrected well. Specifically, it is possible to achieve a variable power optical system in which the variations in spherical aberration and coma in changing magnification are particularly corrected well.

If $(R2a - R2b)/(R2a + R2b)$ is below the lower limit of the condition (2), it is impossible to control the variations in spherical aberration and coma in changing magnification. On the other hand, if $(R2a - R2b)/(R2a + R2b)$ is beyond the upper limit of the condition (2), it is impossible to move near the object side the position of the principal point of the second lens group. In addition, it is impossible to control the variations in spherical aberration and coma in changing magnification.

Also, it is preferred that the variable power optical system of the second embodiment satisfies the following condition (2-1) instead of the condition (2):

$$-0.8 < (R2a - R2b)/(R2a + R2b) < 0.72 \qquad (2\text{-}1)$$

When the condition (2-1) are satisfied, it is possible to achieve a variable power optical system in which the value of the total length of the variable power optical system relative to image height is small and in which various aberrations are corrected better. Specifically, it is possible to achieve a variable power optical system in which the variations in spherical aberration and coma in changing magnification are particularly corrected better.

Also, in a variable power optical system of the second embodiment, it is preferred that the second lens element (L22) has positive refractive power, and the third lens element (L23) has negative refractive power.

Also, in a variable power optical system of the second embodiment, it is preferred that the fourth lens group consists of one lens element with positive refractive power.

Also, in a variable power optical system according to the second embodiment, it is preferred that: the positive lens in the fourth lens group has a concave shape on the object side; and the following condition (12) is satisfied:

$$0 < (R4a - R4b)/(R4a + R4b) < 1.0 \qquad (12)$$

where R4a denotes the radius of curvature of the object-side surface of the positive lens in the fourth lens group, and R4b denotes the radius of curvature of the image-side surface of the positive lens in the fourth lens group.

The condition (12) shows the shape factor for the positive lens of the fourth lens group. When the condition (12) is satisfied, the shape of the positive lens becomes a meniscus shape which becomes concave on the object side. As a result, it is possible to achieve a variable power optical system in which various aberrations are corrected well. Specifically, it is possible to achieve a variable power optical system in which the variation in field curvature in changing magnification is particularly corrected (controlled) well. On the other hand, if the condition (12) is not satisfied, it is impossible to control the variation in field curvature in changing magnification.

Also, it is preferred that the variable power optical system of the second embodiment satisfies the following condition (12-1) instead of the condition (12):

$$0.1 \leq (R4a-R4b)/(R4a+R4b) < 0.9 \tag{12-1}$$

When the condition (12-1) are satisfied, it is possible to achieve a variable power optical system in which the value of the total length of the variable power optical system relative to image height is small and in which various aberrations are corrected better. Specifically, it is possible to achieve a variable power optical system in which the variation in field curvature in changing magnification is particularly corrected (controlled) better.

Also, an image pickup apparatus according to the second embodiment includes one of the above-described variable power optical systems according to the second embodiment, and an imaging sensor.

Also, in an image pickup apparatus according to the second embodiment, it is preferred that: the image pickup apparatus includes a variable power optical system forming an optical image of an object, and an imaging sensor; the imaging sensor transforms the optical image formed by the variable power optical system into electrical image signals; the variable power optical system includes, in order from the object side, a first lens group with negative refractive power, a second lens group with positive refractive power, a third lens group with negative refractive power, and a fourth lens group with positive refractive power; the second lens group includes at least one positive lens and a negative lens; the fourth lens group includes a positive lens; and the following conditions (8), (13), and (10) are satisfied:

$$10 \leq Vd4g \leq 45 \tag{8}$$

$$-0.27 \leq |IH/f1|+(IH/f2)-0.05 \times Vd4g \leq 3.0 \tag{13}$$

$$10 \leq Vd\text{max}-Vd\text{min} \leq 80 \tag{10}$$

where IH denotes the image height of the imaging sensor, f1 denotes the focal length of the first lens group, f2 denotes the focal length of the second lens group, Vd4g denotes the Abbe' Number of the positive lens of the fourth lens group with respect to the d line, Vdmax denotes the Abbe's Number of a glass material having the lowest dispersion characteristic of those of glass materials which are used for lenses of the second lens group, with respect to the d line, and Vdmin denotes the Abbe's Number of a glass material having the highest dispersion characteristic of those of glass materials which are used for lenses of the second lens group, with respect to the d line.

When both of the conditions (8) and (13) are satisfied, it is possible to achieve a variable power optical system in which the value of the total length of the variable power optical system relative to image height is small and in which various aberrations are corrected well. In addition, when the condition (10) is also satisfied, it is possible to achieve a variable power optical system in which various aberrations are also corrected better. In this case, IH denotes the image height of the imaging sensor. In a more detailed explanation, IH is half as long as the diagonal length of the image plane of the imaging sensor. Besides, the height of an image formed on the imaging sensor may be used as IH (where the height of an image formed on the imaging sensor is the distance between the optical axis and the maximum image height).

The conditions (8) and (10) have been already explained. Also, the condition (13) has the same technical significance and the same operation effects as the condition (9) does.

As described above, when the conditions (8), (13), and (10) are satisfied at the same time, it is possible to achieve a variable power optical system in which the value of the total length of the variable power optical system relative to image height is small and in which various aberrations are corrected well. Specifically, it is possible to achieve a variable power optical system in which the variations in spherical aberration and coma in changing magnification and chromatic aberration are particularly corrected well.

Also, in an image pickup apparatus according to the second embodiment, it is preferred that the following conditions (8-1), (13-1), and (10-1) are satisfied instead of the conditions (8), (13), and (10):

$$15 \leq Vd4g \leq 40 \tag{8-1}$$

$$-0.25 \leq |\alpha/f1|+(\alpha/f2)-0.026 \times Vd4g \leq 2.5 \tag{13-1}$$

$$15 \leq Vd\text{max}-Vd\text{min} \leq 70 \tag{10-1}$$

When the conditions (8-1), (13-1), and (10-1) are satisfied, it is possible to achieve a variable power optical system in which the value of the total length of the optical system relative to image height is small and in which various aberrations are corrected better. Specifically, it is possible to achieve a variable power optical system in which the variations in spherical aberration and coma in changing magnification and chromatic aberration are particularly corrected better.

Also, in an image pickup apparatus according to the second embodiment, it is preferred that the image pickup apparatus includes a variable power optical system in which the first lens group is made to keep still in changing magnification from the wide angle end position to the telephoto end position or in performing shooting by changing shooting at infinity to shooting in close range. Also, in an image pickup apparatus according to the present embodiment, it is preferred that the image pickup apparatus includes a variable power optical system in which the fourth lens group is made to keep still in changing magnification from the wide angle end position to the telephoto end position or in performing shooting by changing shooting at infinity to shooting in close range. The matter of the constitution in which the first and fourth lens groups are fixed has been already explained.

Also, in an image pickup apparatus according to the second embodiment, it is preferred that the following condition (6) is satisfied:

$$1.0 \leq |f1|/IH \leq 2.8 \tag{6}$$

where f1 denotes the focal length of the first lens group, and IH denotes the image height of the imaging sensor.

The condition (6) has the same technical significance and the same operation effects as the condition (3) does. Besides, the explanation about the image height has been described above.

Also, in an image pickup apparatus according to the second embodiment, it is preferred that the following condition (6-1) is satisfied instead of the condition (6):

$$1.8 \leq |f1|/IH \leq 2.6 \tag{6-1}$$

Also, in an image pickup apparatus according to the second embodiment, it is preferred that the first lens group in the variable power optical system consists of two or less lens elements.

Also, in an image pickup apparatus according to the second embodiment, it is preferred that the following condition (14) is satisfied:

$$0.2 \leq |f2|/IH \leq 1.8 \tag{14}$$

where f2 denotes the focal length of the second lens group, and IH denotes the image height of the imaging sensor.

The condition (14) has the same technical significance and the same operation effects as the condition (11) does. Besides, the explanation about IH has been described above.

Also, in an image pickup apparatus according to the second embodiment, it is preferred that the following condition (14-1) is satisfied instead of the condition (14):

$$1.0 \leq |f2|/IH \leq 1.5 \tag{14-1}$$

Also, in an image pickup apparatus according to the second embodiment, it is preferred that: the second lens group in the variable power optical system consists of a first lens element with positive refractive power, a second lens element, and a third lens element in that order from the object side; the first lens element has a convex shape on the object side; and the following condition (2) is satisfied:

$$-1.0 < (R2a-R2b)/(R2a+R2b) < 1.0 \tag{2}$$

where R2a denotes the radius of curvature of the object-side surface of the second lens element, and R2b denotes the radius of curvature of the image-side surface of the third lens element.

The technical significance and the operation effects of the condition (2) have been already explained.

Also, in an image pickup apparatus according to the second embodiment, it is preferred that the following condition (2-1) is satisfied instead of the condition (2):

$$-0.8 < (R2a-R2b)/(R2a+R2b) < 0.72 \tag{2-1}$$

Also, in an image pickup apparatus according to the second embodiment, it is preferred that the second lens element in the variable power optical system has positive refractive power and the third lens element in the variable power optical system has negative refractive power, respectively.

Also, in an image pickup apparatus according to the second embodiment, it is preferred that the fourth lens group in the variable power optical system consists of one lens element with positive refractive power.

Also, in an image pickup apparatus according to the second embodiment, it is preferred that: the positive lens in the fourth lens group in the variable power optical system has a concave shape on the object side; and the following condition (12) is satisfied:

$$0 < (R4a-R4b)/(R4a+R4b) < 1.0 \tag{12}$$

where R4a denotes the radius of curvature of the object-side surface of the positive lens in the fourth lens group, and R4b denotes the radius of curvature of the image-side surface of the positive lens in the fourth lens group.

The technical significance and the operation effects of the condition (12) have been already explained.

Also, in an image pickup apparatus according to the second embodiment, it is preferred that the following condition (12-1) is satisfied instead of the condition (12):

$$0.1 \leq (R4a-R4b)/(R4a+R4b) < 0.9 \tag{12-1}$$

Also, a variable power optical system according to the third embodiment is characterized in that: the variable power optical system includes, in order from the object side, a first lens group with negative refractive power, a second lens group with positive refractive power, a third lens group with negative refractive power, and a fourth lens group with positive refractive power; the first lens group includes one negative lens and one positive lens in that order from the object side, and an air distance is provided between the negative and positive lenses of the first lens group; and the following conditions (15), (16), and (17) are satisfied:

$$1.75 \leq Nd1g \leq 2.50 \tag{15}$$

$$15 \leq Vd1g \leq 43 \tag{16}$$

$$3 \leq VdN - VdP \leq 28 \tag{17}$$

where Nd1g denotes the refractive index of each of lenses constituting the first lens group, with respect to the d line, Vd1g denotes the Abbe's Number of each of lenses constituting the first lens group, with respect to the d lines, VdN denotes the Abbe's Numbers of the negative lens in the first lens group, with respect to the d lines, and VdP denotes the Abbe's Numbers of the positive lens in the first lens group, with respect to the d lines.

The variable power optical system according to the third embodiment is characterized in that both of the negative and positive lenses constituting the first lens group have high refractive index and high dispersion characteristic. The condition (15) shows the refractive index of each of the lenses constituting the first lens group. The condition (16) shows the Abbe's Number of each of the lenses constituting the first lens group. The condition (17) shows the difference between the Abbe's Numbers of the negative and positive lenses constituting the first lens group.

When the condition (15) is satisfied, it is possible to strengthen the refractive power while the radius of curvature of each of the lenses constituting the first lens group is being made to become large. Small radius of curvature generally makes the variations in various aberrations large. That is to say, it is possible to control the variations in various aberrations and it is possible to achieve desired refractive power, by making the radius of curvature large. In addition, when both of the conditions (16) and (17) are satisfied, it is possible to correct various aberrations in the first lens group well while desired refractive power is being achieved in the first lens group.

If Nd1g is below the lower limit of the condition (15), it is impossible to achieve desired refractive power with the variations in various aberrations in each of the lenses being controlled. On the other hand, if Nd1g is beyond the upper limit of the condition (15), there is no glass material for the lenses constituting first lens group, so that it is impossible to achieve a desired optical system.

If Vd1g is below the lower limit of the condition (16), there is no glass material for the lenses constituting the first lens group, so that it is impossible to achieve a desired optical system. On the other hand, if Vd1g is beyond the upper limit of the condition (16), actual glass materials cause a decline in the refractive power, so that it is impossible to achieve a desired refractive index of the first lens group.

If VdN−VdP is below the lower limit of the condition (17), the correction of chromatic aberration inevitably becomes inadequate. On the other hand, if VdN−VdP is beyond the upper limit of the condition (17), the correction of chromatic aberration inevitably becomes surplus.

As described above, when the conditions (15), (16), and (17) are satisfied at the same time, it is possible to achieve a variable power optical system in which the value of the total length of the variable power optical system relative to image height is small and in which various aberrations are corrected well. Specifically, it is possible to achieve a variable power optical system in which chromatic aberration is particularly corrected well.

Also, in a variable power optical system according to the third embodiment, it is preferred that the following conditions (15-1), (16-1), and (17-1) are satisfied instead of the conditions (15), (16), and (17):

$$1.82 \leq nd1g \leq 2.40 \quad (15\text{-}1)$$

$$16 \leq vd1g \leq 38.7 \quad (16\text{-}1)$$

$$9 \leq vdN - vdP \leq 22.7 \quad (17\text{-}1)$$

When the conditions (15-1), (16-1), and (17-1) are satisfied, it is possible to achieve a variable power optical system in which the value of the total length of the optical system relative to image height is small and in which various aberrations are corrected better. Specifically, it is possible to achieve a variable power optical system in which chromatic aberration is particularly corrected better.

In a variable power optical system according to the third embodiment, it is preferred that the following condition (18) is satisfied:

$$0.03 \leq D/(FLw \times FLt)^{1/2} \leq 0.26 \quad (18)$$

where D denotes the axial air distance between the negative and positive lenses of the first lens group, FLw denotes the focal length of the whole of the variable power optical system in the wide angle end position, and FLt denotes the focal length of the whole of the variable power optical system in the telephoto end position.

When the condition (18) is satisfied, it is possible to achieve a variable power optical system in which various aberrations are corrected well while the thickness of the first lens group is being thinned. Specifically, it is possible to achieve a variable power optical system in which the variations in spherical aberration and coma in changing magnification are particularly corrected (controlled) well.

If $D/(FLw \times FLt)^{1/2}$ is below the lower limit of the condition (18), it is impossible to control the variations in spherical aberration and coma in changing magnification. On the other hand, if $D/(FLw \times FLt)^{1/2}$ is beyond the upper limit of the condition (18), the thickness of the first lens group increases, so that it is impossible to achieve a desired optical system.

Also, in a variable power optical system according to the third embodiment, it is preferred that the following condition (18-1) is satisfied instead of the condition (18):

$$0.05 \leq D/(FLw \times FLt)^{1/2} \leq 0.20 \quad (18\text{-}1)$$

When the condition (18-1) is satisfied, it is possible to achieve a variable power optical system in which various aberrations are corrected better while the thickness of the first lens group is being thinned. Specifically, it is possible to achieve a variable power optical system in which the variations in spherical aberration and coma in changing magnification are particularly corrected (controlled) better.

Also, in a variable power optical system according to the third embodiment, it is preferred that: an air lens which has a convex shape on the object side is formed nearer to the image-plane side than the negative lens of the first lens group; and the following condition (19) is satisfied:

$$-0.25 \leq (r2-r3)/(r2+r3) \leq -0.07 \quad (19)$$

where r2 denotes the radius of curvature of the image-side surface of the negative lens of the first lens group, and r3 denotes the radius of curvature of the object-side surface of the positive lens of the first lens group.

The condition (19) shows the shape factor of the air lens of the first lens group. When the condition (19) is satisfied, it is shown that the air lens becomes a meniscus lens having a convex shape on the object side and having positive refractive power. As a result, it is possible to achieve a variable power optical system in which the variations in spherical aberration and coma in changing magnification are corrected (controlled) well.

If (r2−r3)/(r2+r3) is below the lower limit of the condition (19), the refractive power of the air lens is reduced, so that it is impossible to control the variations in spherical aberration and coma in changing magnification. On the other hand, if (r2−r3)/(r2+r3) is beyond the upper limit of the condition (19), the refractive index of the air lens becomes high. That is to say, the radius of curvature of the object-side surface of the positive lens in the first lens group becomes large, so that it is impossible to correct various aberrations well while desired refractive power of the first lens group is being achieved.

Also, in a variable power optical system according to the third embodiment, it is preferred that the following condition (19-1) is satisfied instead of the condition (19):

$$-0.20 \leq (r2-r3)/(r2+r3) \leq -0.10 \quad (19\text{-}1)$$

When the condition (19-1) is satisfied, it is possible to achieve a variable power optical system in which the value of the total length of the optical system relative to image height is small and in which various aberrations are corrected better. Specifically, it is possible to achieve a variable power optical system in which the variations in spherical aberration and coma in changing magnification are particularly corrected (controlled) better.

Also, in a variable power optical system of the third embodiment, it is preferred that the first lens group is made to keep still in changing magnification from the wide angle end position to the telephoto end position or in performing shooting by switching from shooting at infinity to shooting in close range.

Because the total length is fixed in changing magnification, it is possible to easily secure the strength of a lens frame. In addition, because the structure of the lens frame can be simplified, it is possible to downsize the optical system.

Also, in a variable power optical system of the third embodiment, it is preferred that the fourth lens group is made to keep still in changing magnification from the wide angle end position to the telephoto end position or in performing shooting by switching from shooting at infinity to shooting in close range.

It is possible to use a minimum of two lens groups as movable components by fixing the fourth lens group. As a result, the structure of the lens frame can be simplified, so that it is possible to downsize the optical system. In addition, it is possible to control the variations in aberrations, by arranging fixed groups on the object side and the image-plane side of the two movable groups.

Also, in a variable power optical system according to the present third embodiment, it is preferred that the following condition (3) is satisfied:

$$0.45 \leq |f1|/(FLw \times FLt)^{1/2} \leq 1.60 \quad (3)$$

where f1 denotes the focal length of the first lens group, FLw denotes the focal length of the whole of the variable power optical system in the wide angle end position, and FLt denotes the focal length of the whole of the variable power optical system in the telephoto end position.

The first lens group has high refractive power, so that it is possible to move near the image plane side a point at which a virtual image is formed by the first lens group. As a result, it is possible to shorten the total length of the optical system. However, when refractive power becomes high, it generally becomes difficult to correct aberrations. When the condition (3) is satisfied, it is possible to achieve a variable power optical system in which the value of the total length of the optical system relative to image height is small and in which various aberrations are corrected well. Specifically, it is possible to achieve an optical system in which variations in spherical aberration and coma in changing magnification are particularly corrected (controlled) well.

If $|f1|/(FLw \times FLt)^{1/2}$ is below the lower limit value of the condition (3), it becomes impossible to control variations in spherical aberration and coma in changing magnification. On the other hand, if $|f1|/(FLw \times FLt)^{1/2}$ is beyond the upper limit value of the condition (3), it becomes difficult to move near the image-plane side a point at which a virtual image is formed by the first lens group, which is undesirable.

Also, in a variable power optical system according to the present third invention, it is preferred that the following condition (3-2) is satisfied instead of the condition (3):

$$0.70 \leq |f1|/(FLw \times FLt)^{1/2} \leq 1.20 \quad (3\text{-}2)$$

When the condition (3-2) is satisfied, it is possible to achieve a variable power optical system in which the value of the total length of the optical system relative to image height is small and in which various aberrations are corrected better. Specifically, it is possible to achieve an optical system in which the variations in spherical aberration and coma in changing magnification are particularly corrected (controlled) better.

Also, in a variable power optical system according to the present third embodiment, it is preferred that the following condition (20) is satisfied:

$$-0.5 \leq FLn/FLp \leq -0.3 \quad (20)$$

where FLn denotes the focal length of the negative lens of the first lens group and FLp denotes the focal length of the positive lens of the first lens group.

The condition (20) shows the ratio of power of the negative lens to power of the positive lens in the first lens group. When the condition (20) is satisfied, it is possible to achieve a variable power optical system in which the value of the total length of the optical system relative to image height is small and in which various aberrations are corrected well. Specifically, it is possible to achieve a variable power optical system in which chromatic aberration is particularly corrected well.

If FLn/FLp is below the lower limit value of the condition (20), a correction of chromatic aberration inevitably becomes surplus one. On the other hand, if FLn/FLp is beyond the upper limit value of the condition (20), a correction of chromatic aberration inevitably becomes insufficient one.

Also, in a variable power optical system according to the third embodiment, it is preferred that the following condition (11) is satisfied:

$$0.30 \leq f2/(FLw \times FLt)^{1/2} \leq 1.10 \quad (11)$$

where f2 denotes the focal length of the second lens group, FLw denotes the focal length of the whole of the variable power optical system in the wide angle end position, and FLt denotes the focal length of the whole of the variable power optical system in the telephoto end position.

When the refractive power of the second lens group is sufficiently strong, it is generally possible to reduce an amount of movement of the lens group in changing magnification. As a result, it is possible to shorten the total length of the optical system. However, when the refractive power becomes high, it generally becomes difficult to correct aberrations. When the condition (11) is satisfied, it is possible to achieve a variable power optical system in which the value of the total length of the optical system relative to image height is small and in which various aberrations are corrected well. Specifically, it is possible to achieve a variable power optical system in which spherical aberration is particularly corrected well.

If $f2/(FLw \times FLt)^{1/2}$ is below the lower limit value of the condition (11), spherical aberration inevitably becomes worse, which is undesirable. On the other hand, if $f2/(FLw \times FLt)^{1/2}$ is beyond the upper limit value of the condition (11), an amount of movement of the lens group inevitably increases in changing magnification, which is undesirable.

Also, in a variable power optical system according to the third embodiment, it is preferred that the following condition (11-2) is satisfied instead of the condition (11):

$$0.45 \leq f2/(FLw \times FLt)^{1/2} \leq 0.70 \quad (11\text{-}2)$$

When the condition (11-2) is satisfied, it is possible to achieve a variable power optical system in which the value of the total length of the optical system relative to image height is small and in which various aberrations are corrected better. Specifically, it is possible to achieve a variable power optical system in which spherical aberration is particularly corrected better.

Also, in a variable power optical system according to the third embodiment, it is preferred that: the negative lens in the first lens group has a convex shape on the object side; and the following condition (21) is satisfied:

$$0.2 \leq (r1-r2)/(r1+r2) \leq 1.0 \quad (21)$$

where r1 denotes the radius of curvature of the object-side surface of the negative lens of the first lens group and r2 denotes the radius of curvature of the image-side surface of the negative lens of the first lens group.

The condition (21) shows the shape factor of the negative lens of the first lens group. When the condition (21) is satisfied, it is possible to achieve a variable power optical system in which the value of the total length of the optical system relative to image height is small and in which various aberrations are corrected well. Specifically, it is possible to achieve a variable power optical system in which the variations in spherical aberration and coma in changing magnification are particularly corrected (controlled) well.

If $(r1-r2)/(r1+r2)$ is below the lower limit of the condition (21), the power of the negative lens of the first lens group is reduced. In this case, it becomes difficult to move near the image-plane side the point at which a virtual image is formed by the first lens group, which is undesirable. On the other hand, if $(r1-r2)/(r1+r2)$ is beyond the upper limit of the condition (21), the negative lens of the first lens group inevitably has a biconcave shape, so that it is impossible to control the variations in spherical aberration and coma in changing magnification.

Also, in a variable power optical system according to the third embodiment, it is preferred that: the fourth lens group consists of one lens with positive refractive power; and the following condition (22) is satisfied:

$$10 \leq Vd4g \leq 40 \quad (22)$$

where Vd4g denotes Abbe's Number of the positive lens of the fourth lens group with respect to the d line.

The condition (22) shows the Abbe's Number of the positive lens of the fourth lens group. The achievement of the condition (22) makes it possible to achieve a variable power optical system in which the value of the total length of the optical system relative to image height is small and in which various aberrations are corrected well. Specifically, it is possible to achieve a variable power optical system in which chromatic aberration of magnification is particularly corrected well in the telephoto end position.

If Vd4g is below the lower limit of the condition (22), there is no actual glass material, so that it is impossible to achieve a desired optical system. On the other hand, if Vd4g is beyond the upper limit of the condition (22), it becomes difficult to correct chromatic aberration of magnification well in the telephoto end position.

Also, in an image pickup apparatus according to the third embodiment, it is preferred that: the image pickup apparatus includes one of the above-described variable power optical systems according to the third embodiment, and an imaging sensor; and the following condition (6) is satisfied:

$$1.0 \leq |f1|/IH \leq 2.8 \tag{6}$$

where f1 denotes the focal length of the first lens group, and IH denotes the image height of the imaging sensor.

The condition (6) has the same technical significance and the same operation effect as the condition (3) does. In this case, IH denotes the image height of the imaging sensor. In a more detailed explanation, IH is half as long as the diagonal length of the image plane of the imaging sensor. Besides, the height of an image formed on the imaging sensor (the distance between the optical axis and the maximum image height) may be used as IH.

Also, in an image pickup apparatus according to the third embodiment, it is preferred that the following condition (6-1) is satisfied instead of the condition (6):

$$1.8 \leq |f1|/IH \leq 2.6 \tag{6-1}$$

Also, in an image pickup apparatus according to the third embodiment, it is preferred that: the image pickup apparatus includes one of the above-described variable power optical systems according to the third embodiment, and an imaging sensor; and the following condition (14) is satisfied:

$$0.2 \leq |f2|/IH \leq 1.8 \tag{14}$$

where f2 denotes the focal length of the second lens group, and IH denotes the image height of the imaging sensor.

The condition (14) has the same technical significance and the same operation effects as the condition (11) does. Besides, the explanation about IH has been described above.

Also, in an image pickup apparatus according to the third embodiment, it is preferred that the following condition (14-1) is satisfied instead of the condition (14):

$$1.0 \leq |f2|/IH \leq 1.5 \tag{14-1}$$

EMBODIMENT

Embodiments for variable power optical systems according to the present invention and image pickup apparatuses having the same are explained using the drawings, below.

First, the embodiments 1 to 12 for variable power optical systems according to the present invention will be explained.

Figure 1B:
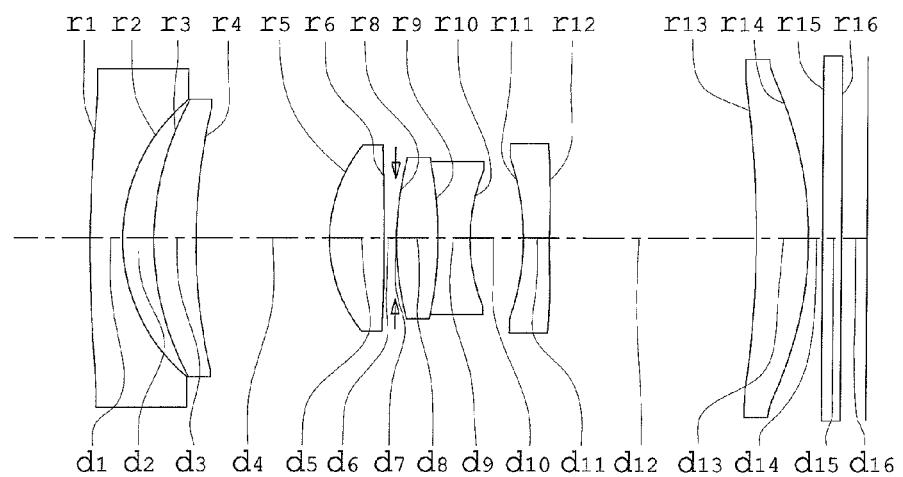
FIG. 1B shows the configuration of lenses in the middle position.
Figure 1C:
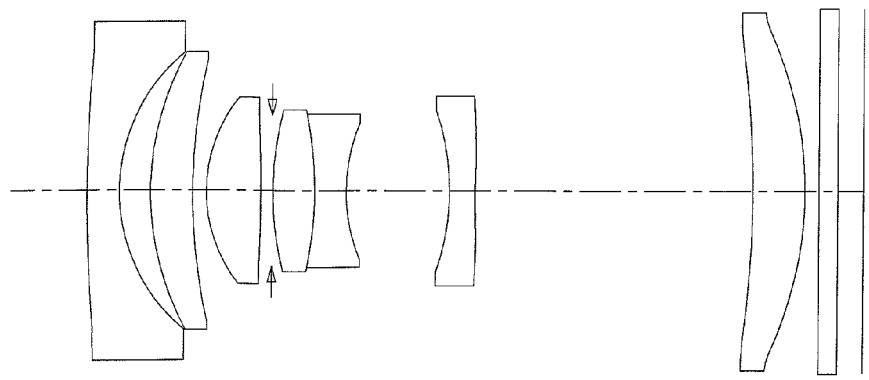
FIG. 1C shows the configuration of lenses in the telephoto end position.
Figure 3A:
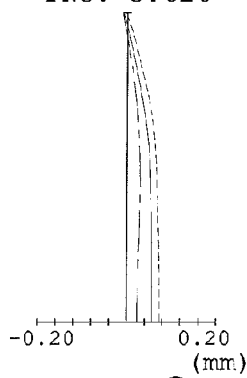
FIGS. 3A to 3D show a state in the wide angle end position.
Figure 3B:
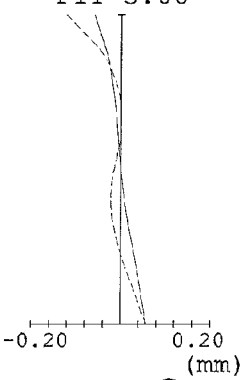
Figure 3C:
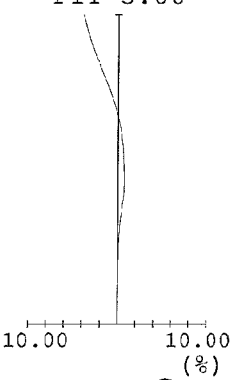
Figure 3D:
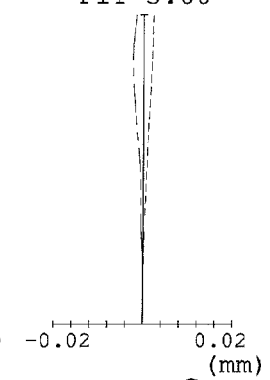
Figure 3E:
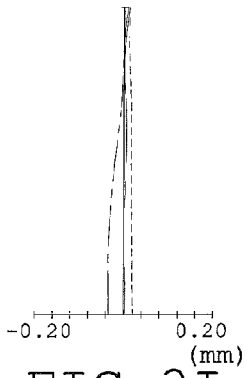
FIGS. 3E to 3H show a state in the middle position.
Figure 3F:
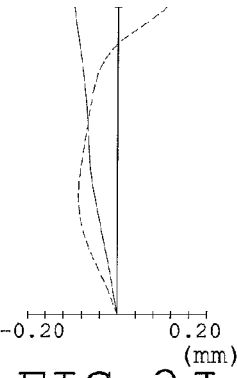
Figure 3G:
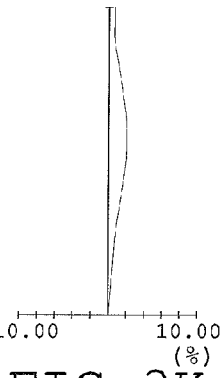
Figure 3H:
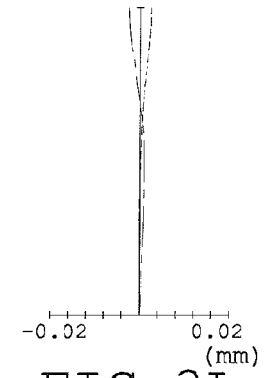
Figure 3I:
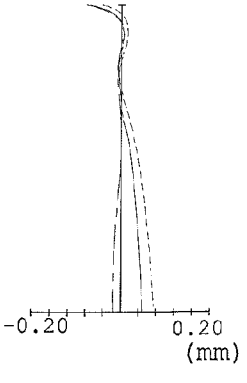
FIGS. 3I to 3L show a state in the telephoto end position.
Figure 3J:
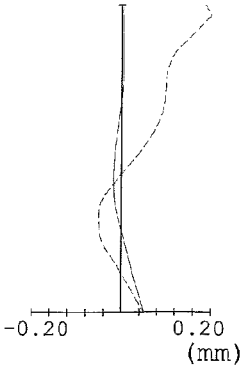
Figure 3K:
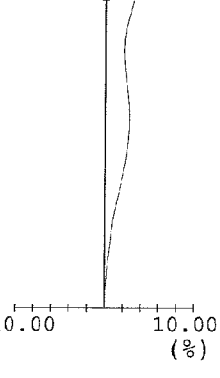
Figure 3L:
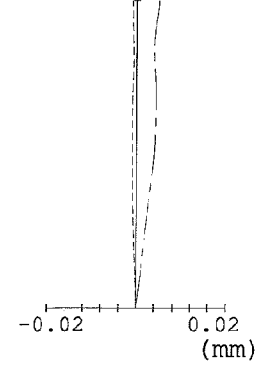
Figure 4A:
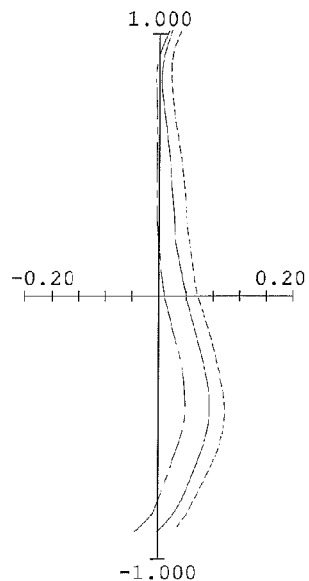
FIG. 4A shows a state in focusing at infinity in the wide angle end position.
Figure 4B:
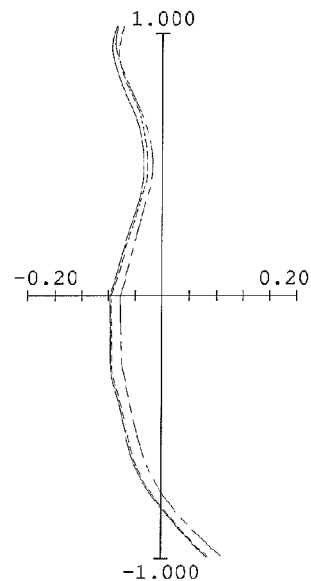
FIG. 4B shows a state in focusing at infinity in the middle position.
Figure 4C:
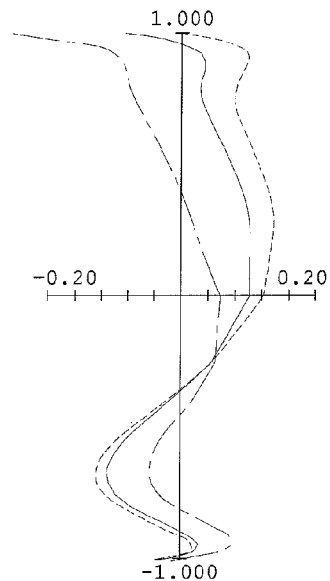
FIG. 4C shows a state in focusing at infinity in the telephoto end position.
Figure 4D:
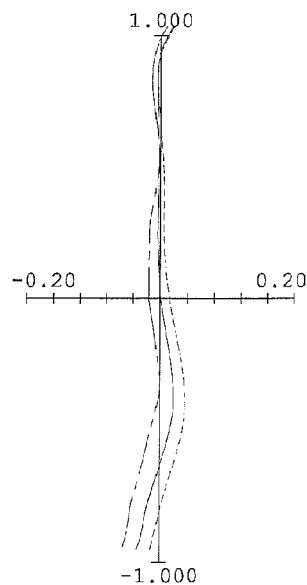
FIG. 4D shows a state in focusing at close range in the wide angle end position.
Figure 4E:
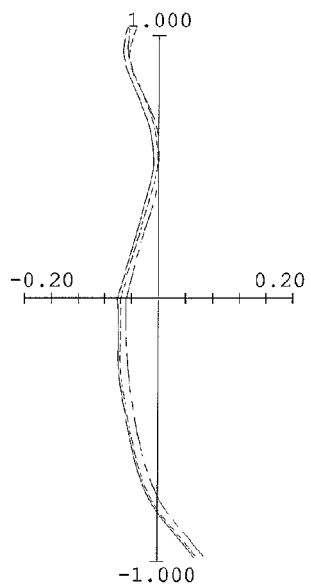
FIG. 4E shows a state in focusing at close range in the middle position.
Figure 4F:
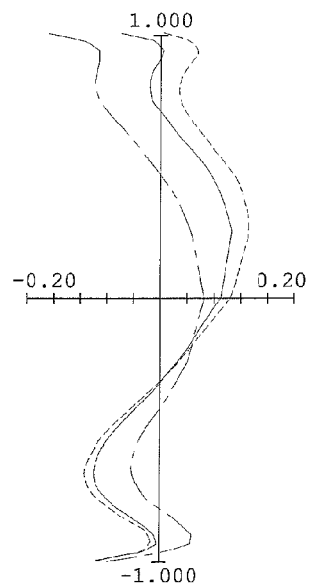
FIG. 4F shows a state in focusing at close range in the telephoto end position.
Figure 5A:
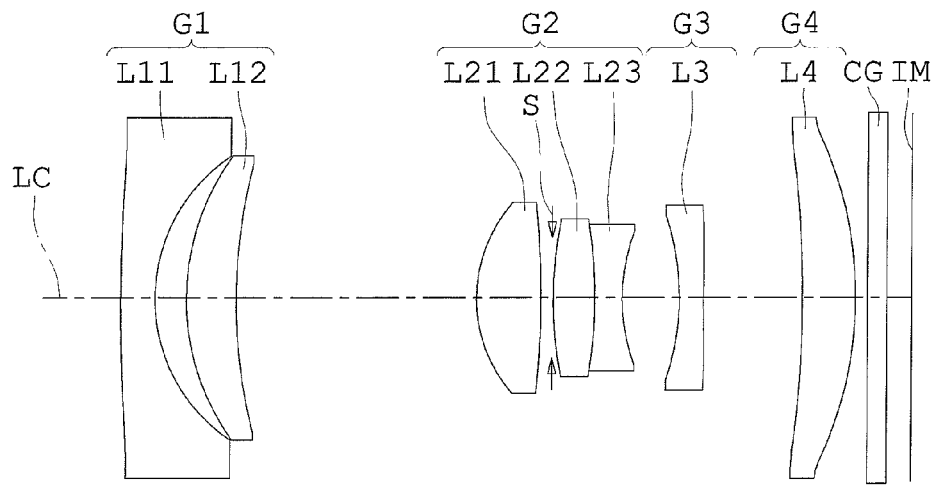
FIG. 5A shows the configuration of lenses in the wide angle end position.
Figure 5B:
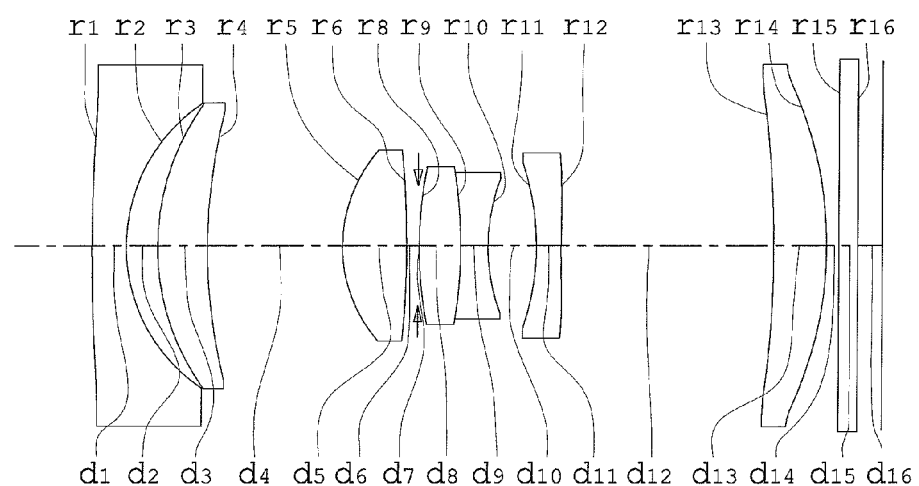
FIG. 5B shows the configuration of lenses in the middle position.
Figure 5C:
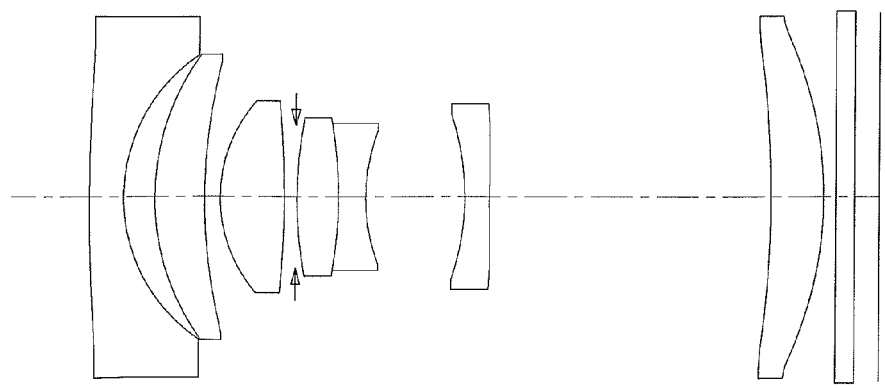
FIG. 5C shows the configuration of lenses in the telephoto end position.
Figure 7A:
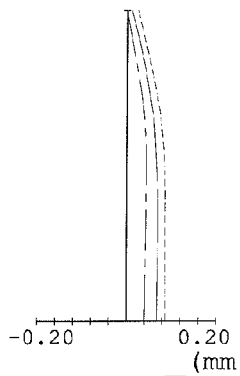
FIGS. 7A to 7D show a state in the wide angle end position.
Figure 7B:
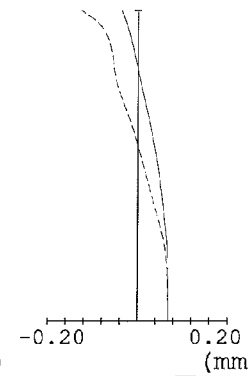
Figure 7C:
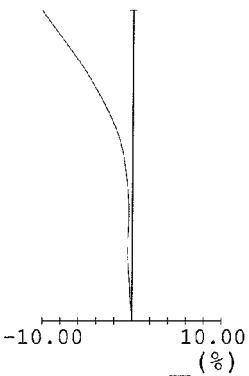
Figure 7D:
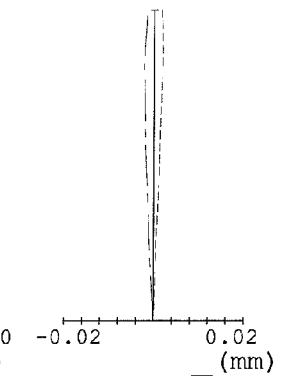
Figure 7E:
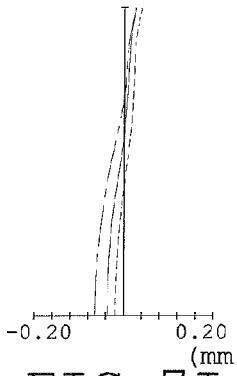
FIGS. 7E to 7H show a state in the middle position.
Figure 7F:
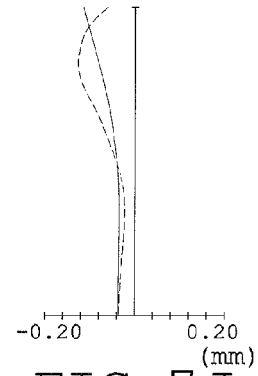
Figure 7G:
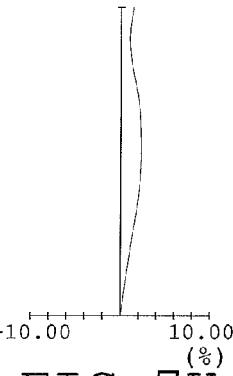
Figure 7H:
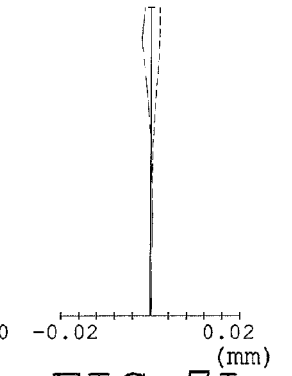
Figure 7I:
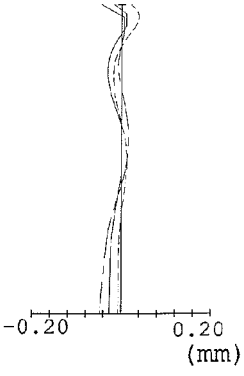
FIGS. 7I to 7L show a state in the telephoto end position.
Figure 7J:
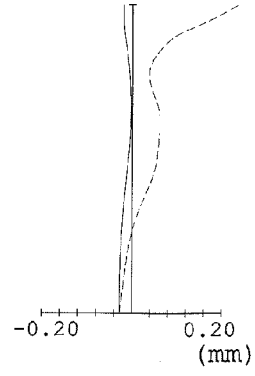
Figure 7K:
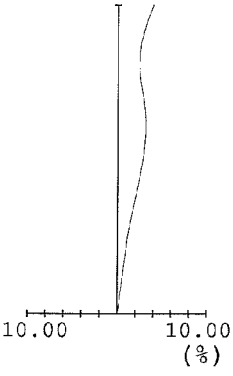
Figure 7L:
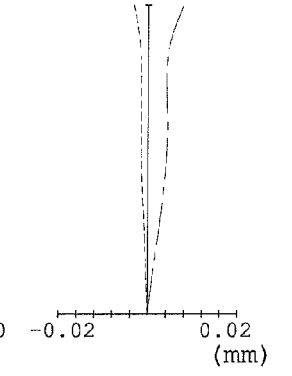
Figure 8A:
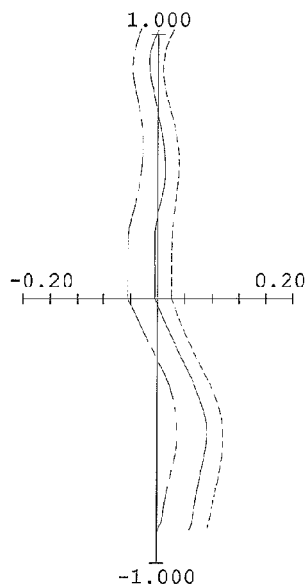
FIG. 8A shows a state in focusing at infinity in the wide angle end position.
Figure 8B:
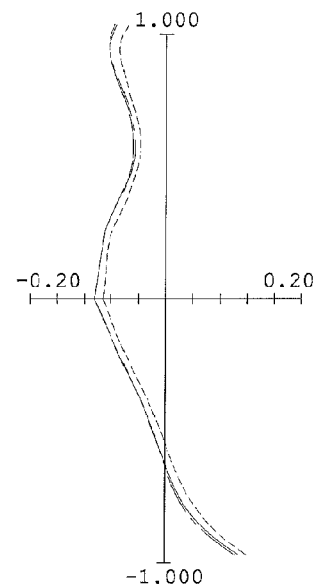
FIG. 8B shows a state in focusing at infinity in the middle position.
Figure 8C:
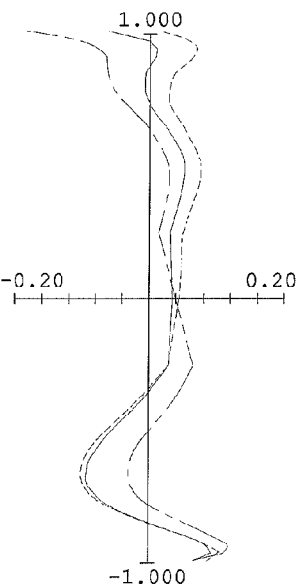
FIG. 8C shows a state in focusing at infinity in the telephoto end position.
Figure 8D:
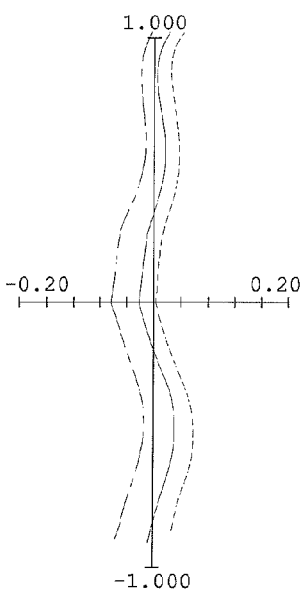
FIG. 8D shows a state in focusing at close range in the wide angle end position.
Figure 8E:
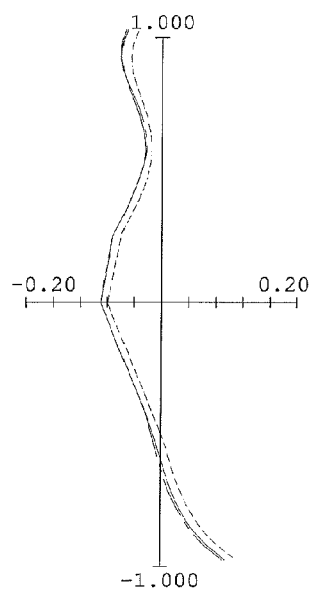
FIG. 8E shows a state in focusing at close range in the middle position.
Figure 8F:
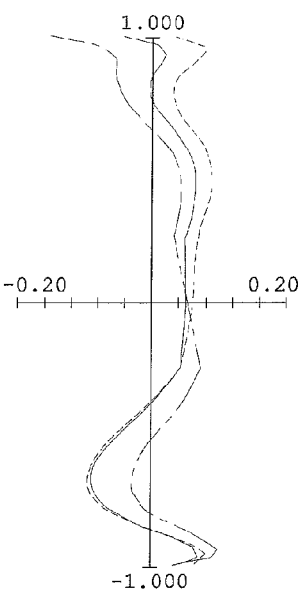
FIG. 8F shows a state in focusing at close range in the telephoto end position.
Figure 9A:
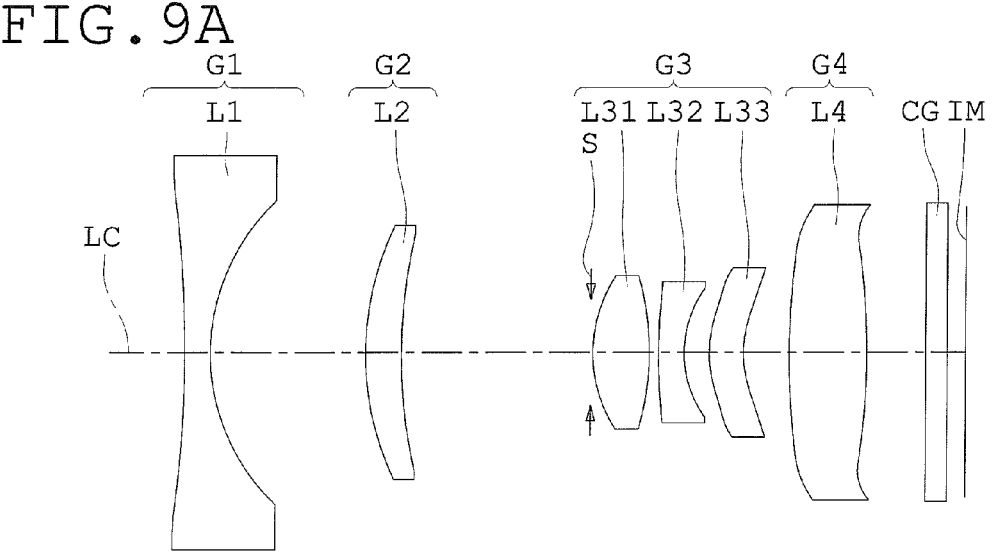
FIG. 9A shows the configuration of lenses in the wide angle end position.
Figure 9B:
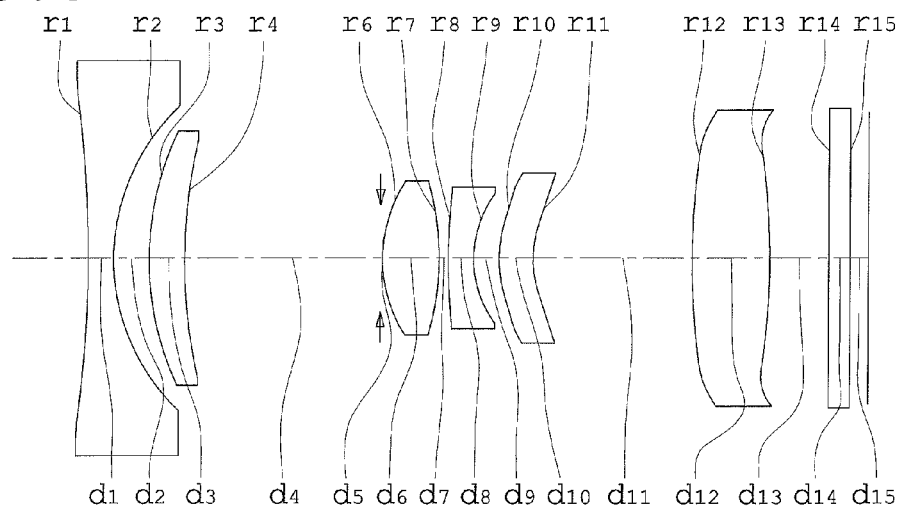
FIG. 9B shows the configuration of lenses in the middle position.
Figure 9C:
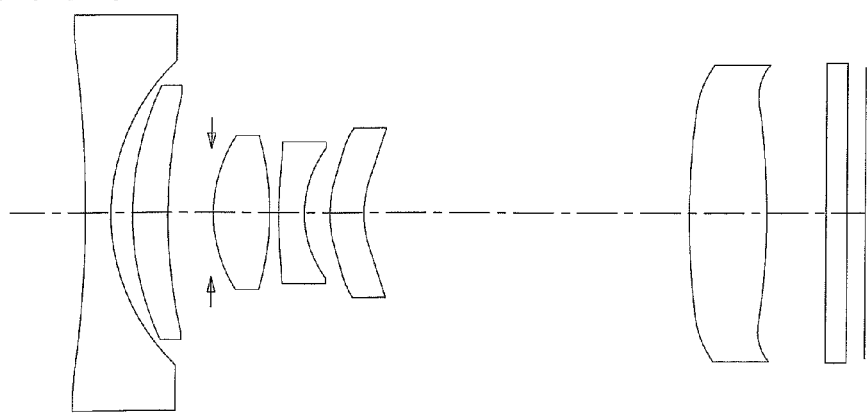
FIG. 9C shows the configuration of lenses in the telephoto end position.
Figure 12A:
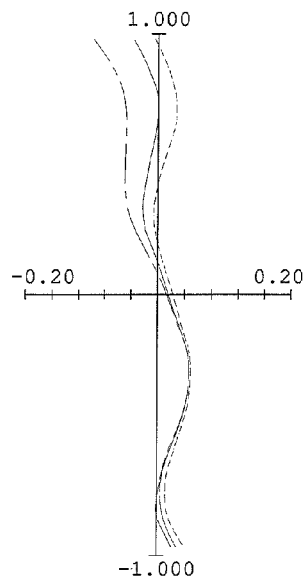
FIG. 12A shows a state in focusing at infinity in the wide angle end position.
Figure 12B:
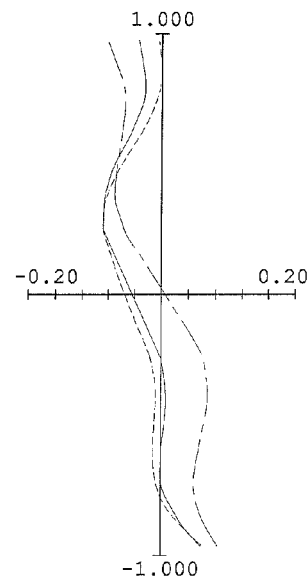
FIG. 12B shows a state in focusing at infinity in the middle position.
Figure 12C:
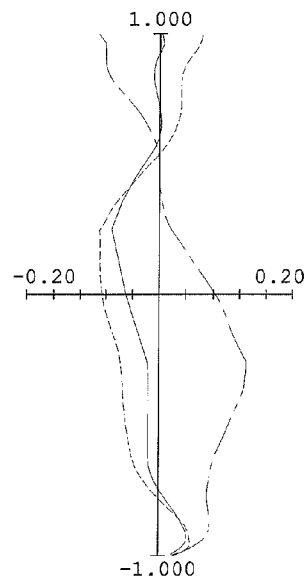
FIG. 12C shows a state in focusing at infinity in the telephoto end position.
Figure 12D:
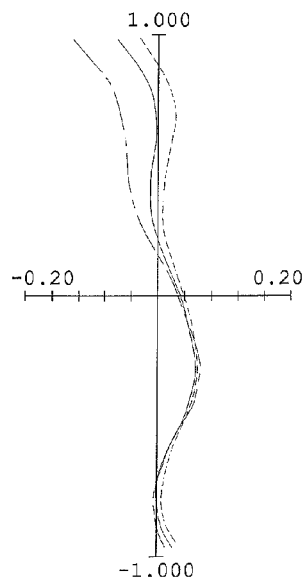
FIG. 12D shows a state in focusing at close range in the wide angle end position.
Figure 12E:
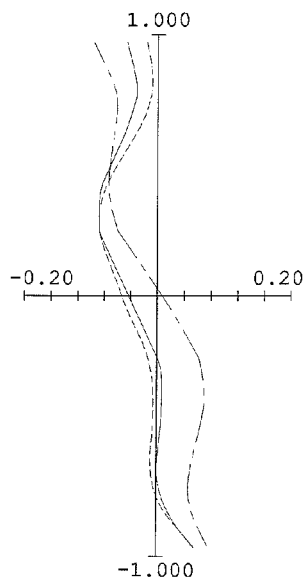
FIG. 12E shows a state in focusing at close range in the middle position.
Figure 12F:
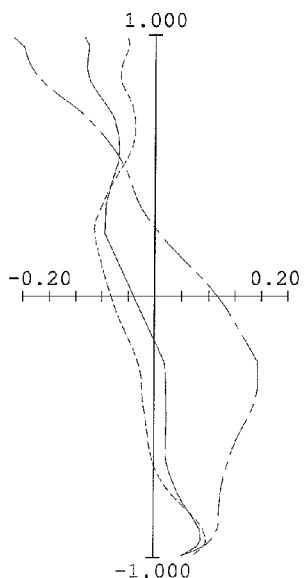
FIG. 12F shows a state in focusing at close range in the telephoto end position.
Figure 13A:
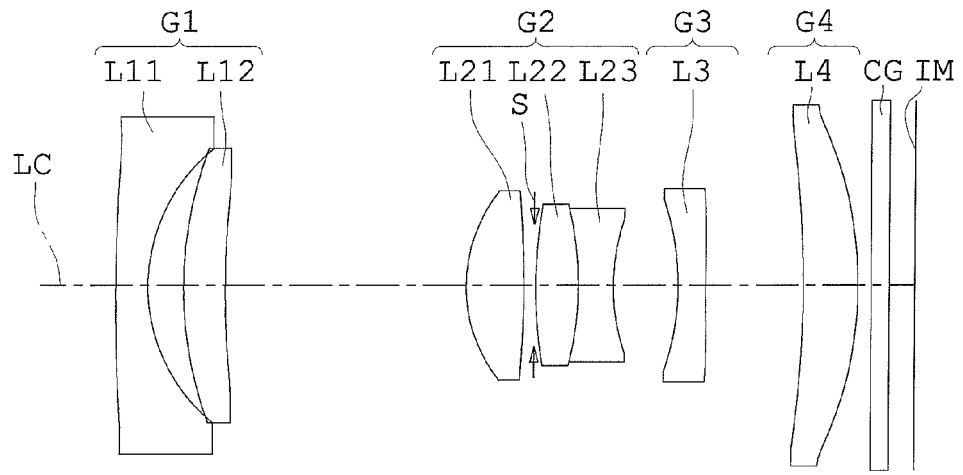
FIG. 13A shows the configuration of lenses in the wide angle end position.
Figure 13B:
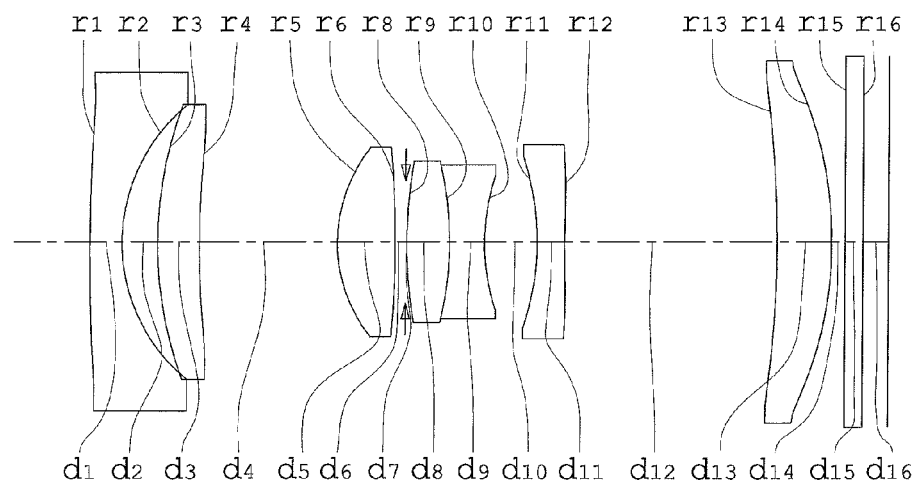
FIG. 13B shows the configuration of lenses in the middle position.
Figure 13C:
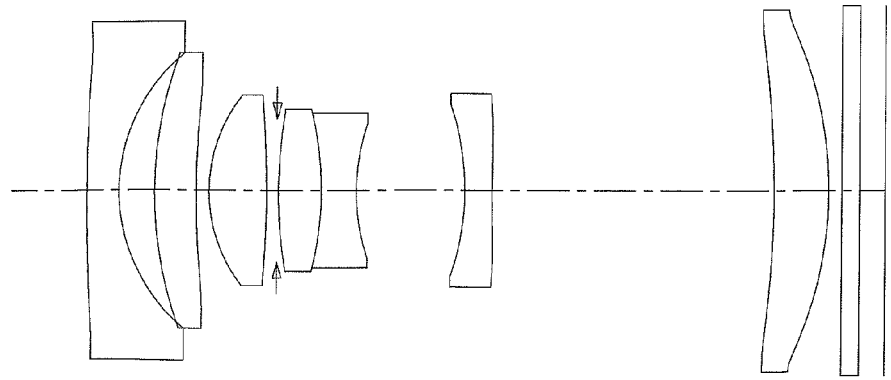
FIG. 13C shows the configuration of lenses in the telephoto end position.
Figure 16A:
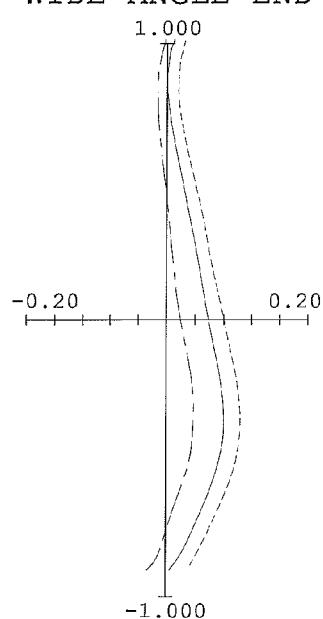
FIG. 16A shows a state in focusing at infinity in the wide angle end position.
Figure 16B:
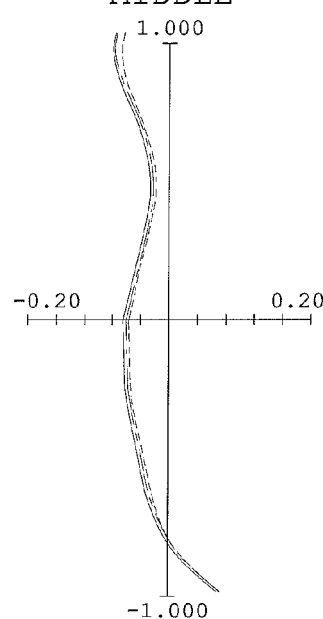
FIG. 16B shows a state in focusing at infinity in the middle position.
Figure 16C:
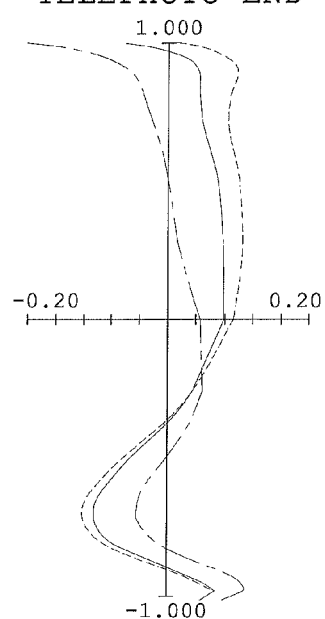
FIG. 16C shows a state in focusing at infinity in the telephoto end position.
Figure 16D:
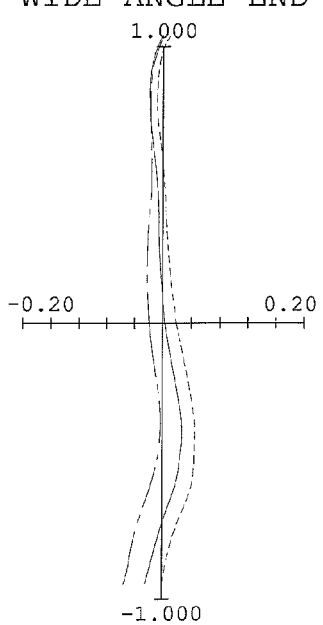
FIG. 16D shows a state in focusing at close range in the wide angle end position.
Figure 16E:
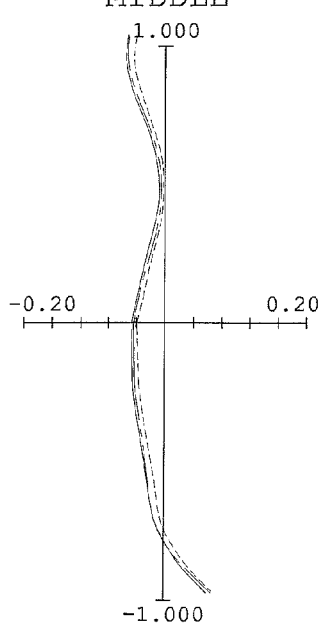
FIG. 16E shows a state in focusing at close range in the middle position.
Figure 16F:
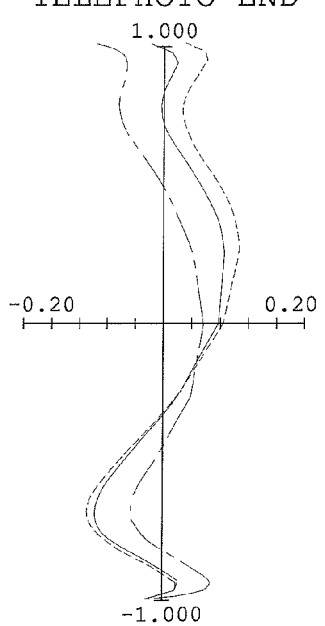
FIG. 16F shows a state in focusing at close range in the telephoto end position.
Figure 17A:
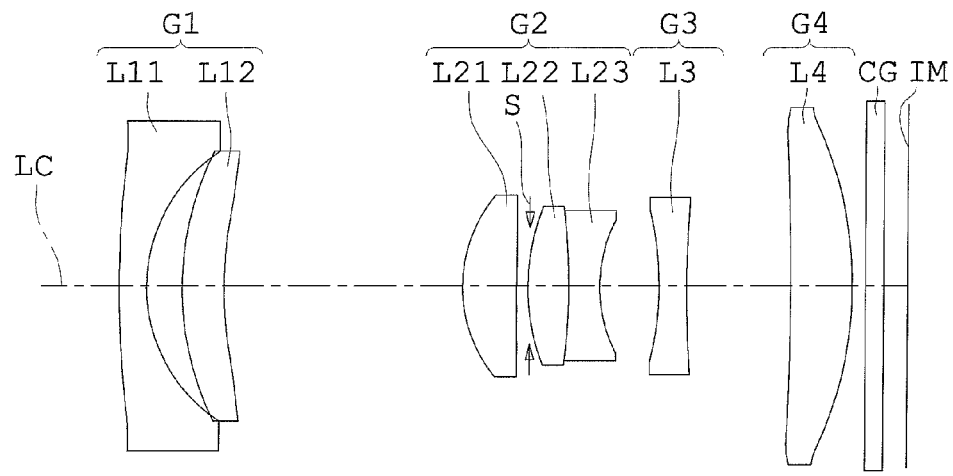
FIG. 17A shows the configuration of lenses in the wide angle end position.
Figure 17B:
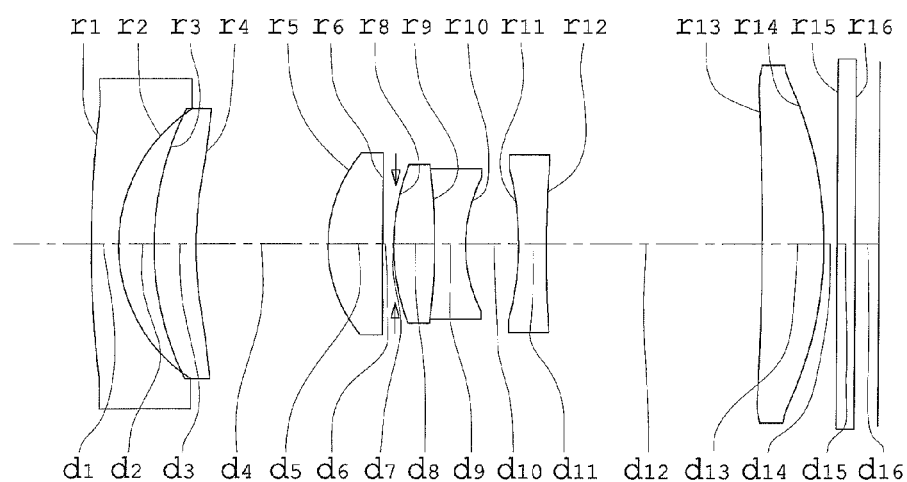
FIG. 17B shows the configuration of lenses in the middle position.
Figure 17C:
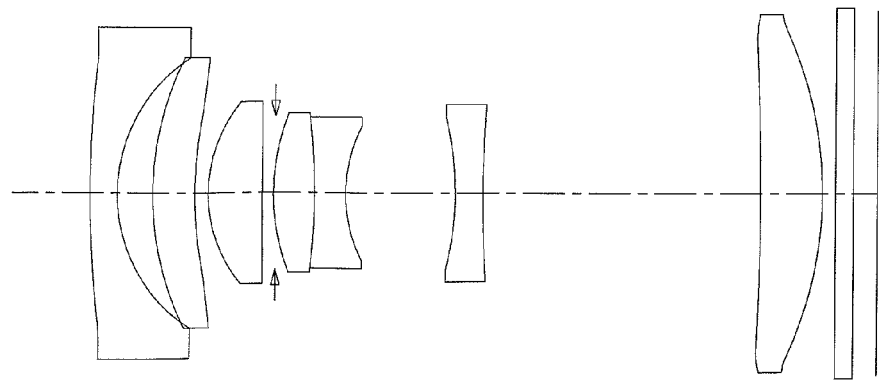
FIG. 17C shows the configuration of lenses in the telephoto end position.
Figure 20A:
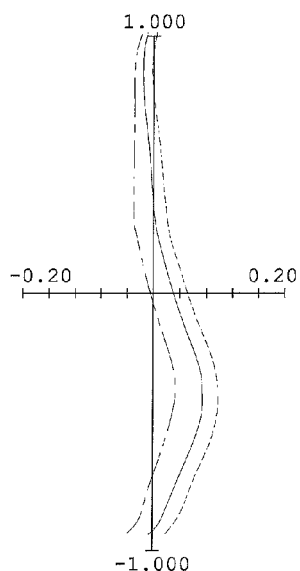
FIG. 20A shows a state in focusing at infinity in the wide angle end position.
Figure 20B:
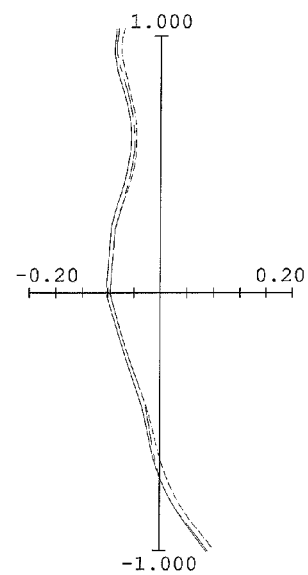
FIG. 20B shows a state in focusing at infinity in the middle position.
Figure 20C:
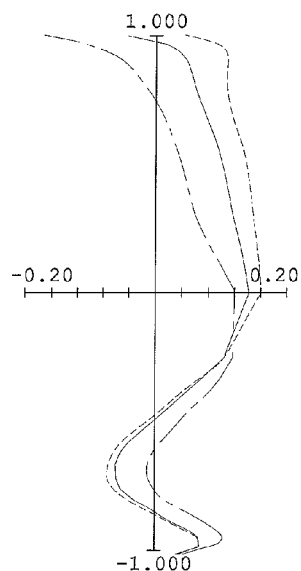
FIG. 20C shows a state in focusing at infinity in the telephoto end position.
Figure 20D:
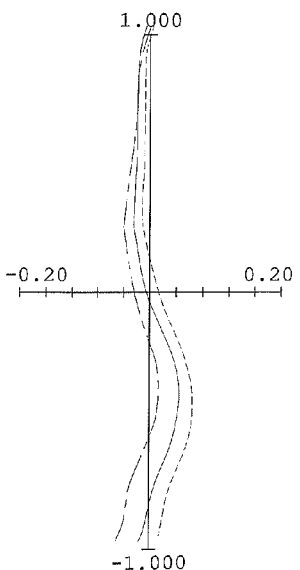
FIG. 20D shows a state in focusing at close range in the wide angle end position.
Figure 20E:
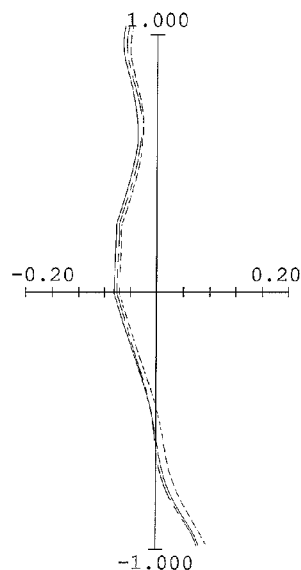
FIG. 20E shows a state in focusing at close range in the middle position.
Figure 20F:
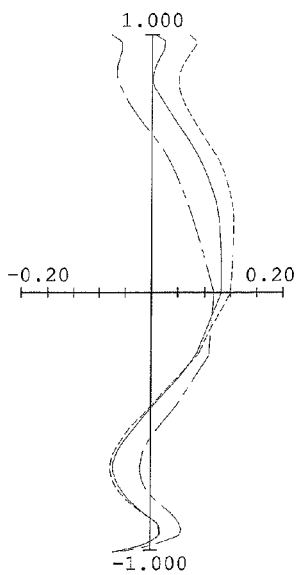
FIG. 20F shows a state in focusing at close range in the telephoto end position.
Figure 21A:
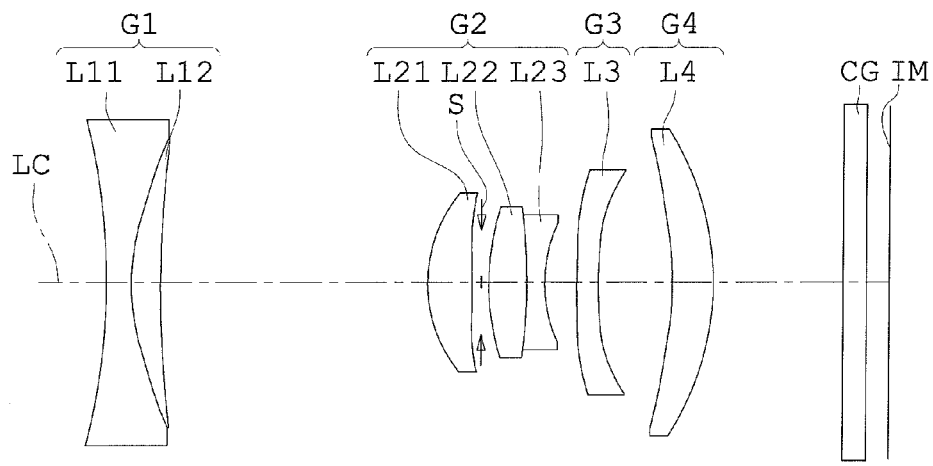
FIG. 21A shows the configuration of lenses in the wide angle end position.
Figure 21B:
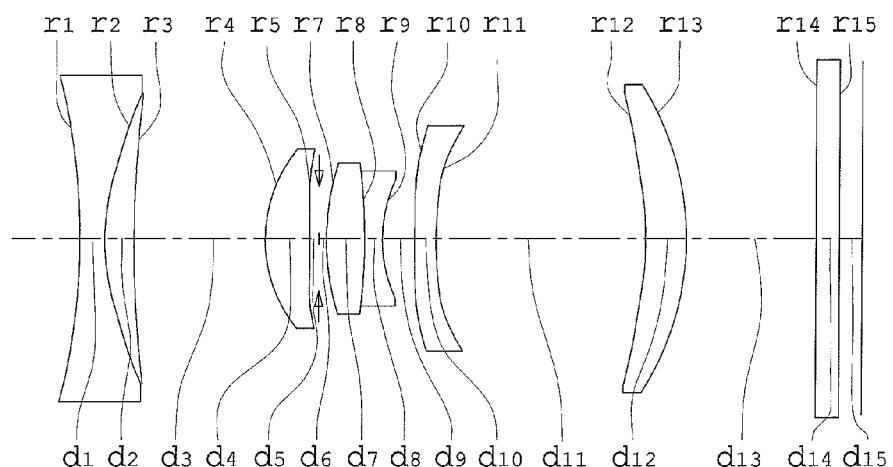
FIG. 21B shows the configuration of lenses in the middle position.
Figure 21C:
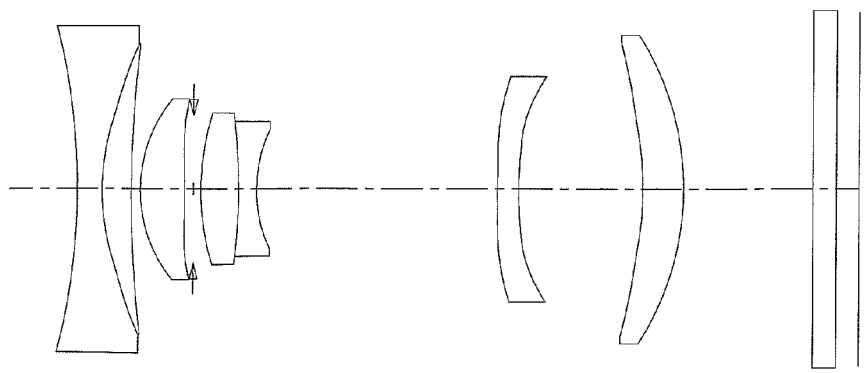
FIG. 21C shows the configuration of lenses in the telephoto end position.
Figure 25A:
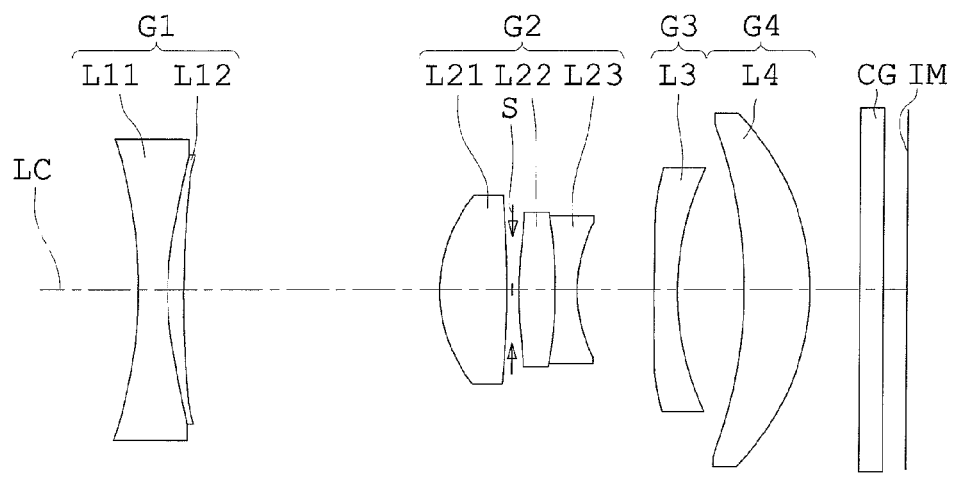
FIG. 25A shows the configuration of lenses in the wide angle end position.
Figure 25B:
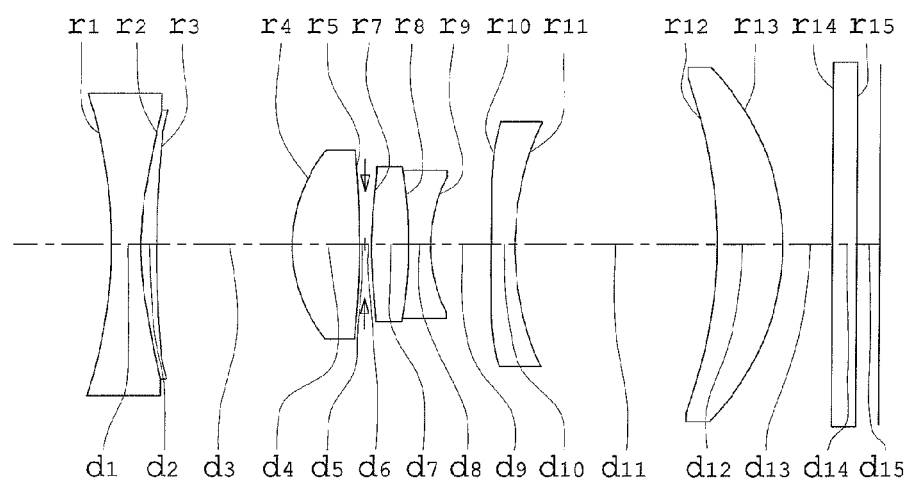
FIG. 25B shows the configuration of lenses in the middle position.
Figure 25C:
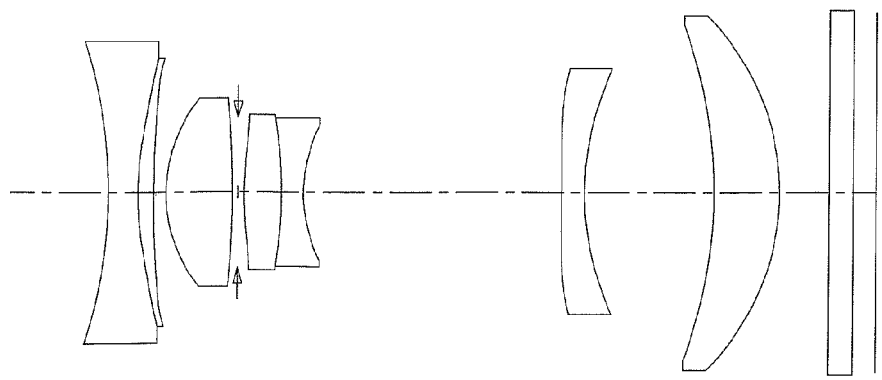
FIG. 25C shows the configuration of lenses in the telephoto end position.
Figure 27A:
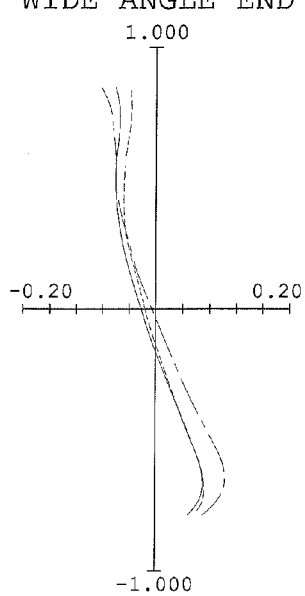
FIG. 27A shows a state in focusing at infinity in the wide angle end position.
Figure 27B:
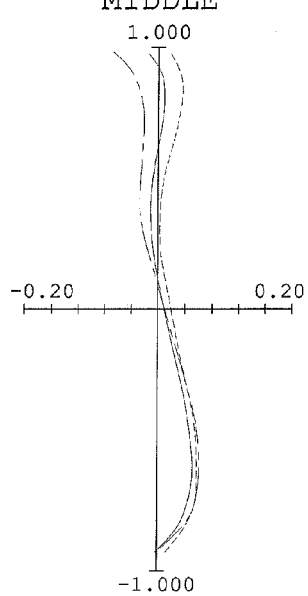
FIG. 27B shows a state in focusing at infinity in the middle position.
Figure 27C:
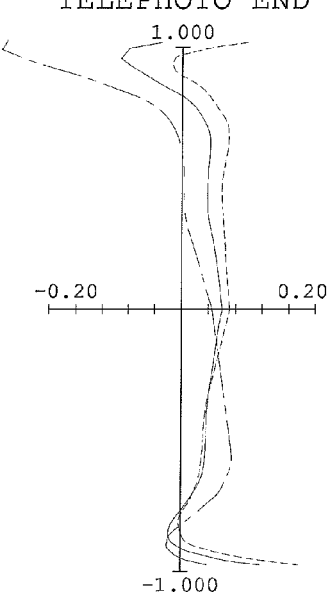
FIG. 27C shows a state in focusing at infinity in the telephoto end position.
Figure 28A:
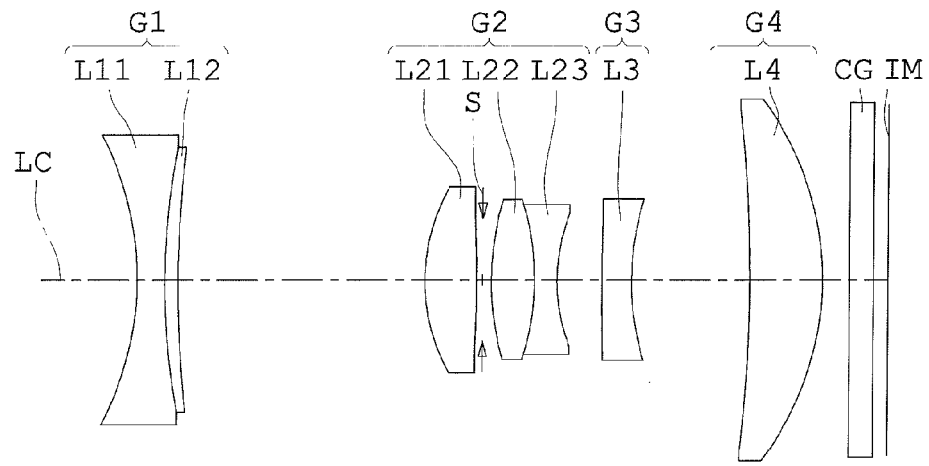
FIG. 28A shows the configuration of lenses in the wide angle end position.
Figure 28B:
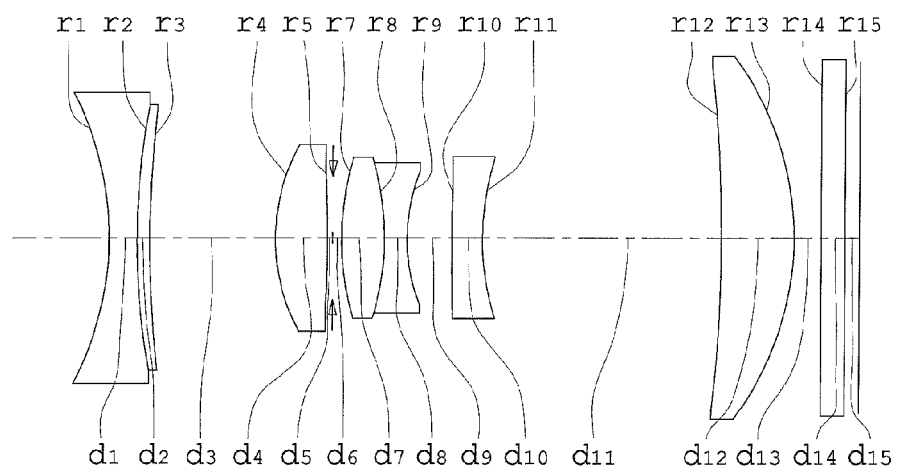
FIG. 28B shows the configuration of lenses in the middle position.
Figure 28C:
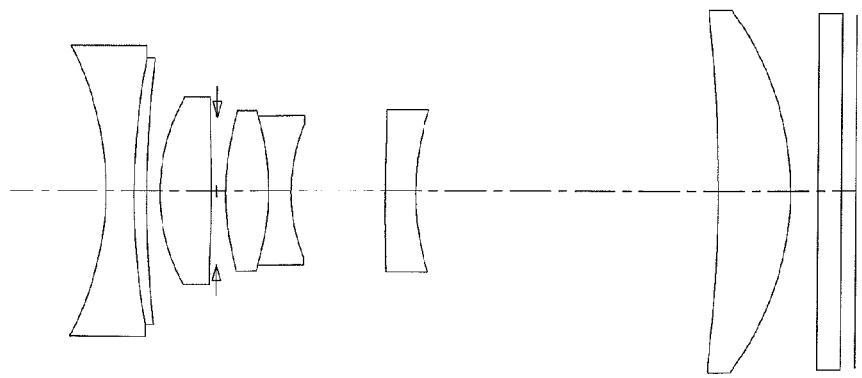
FIG. 28C shows the configuration of lenses in the telephoto end position.
Figure 30A:
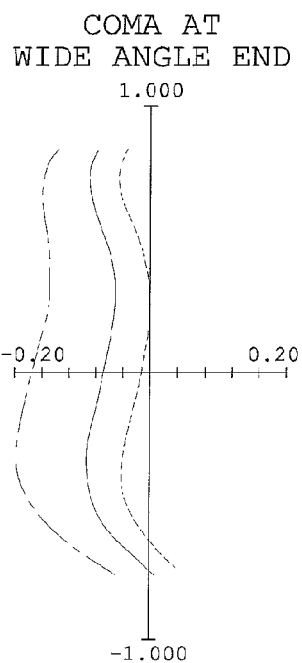
FIG. 30A shows a state in focusing at infinity in the wide angle end position.
Figure 30B:
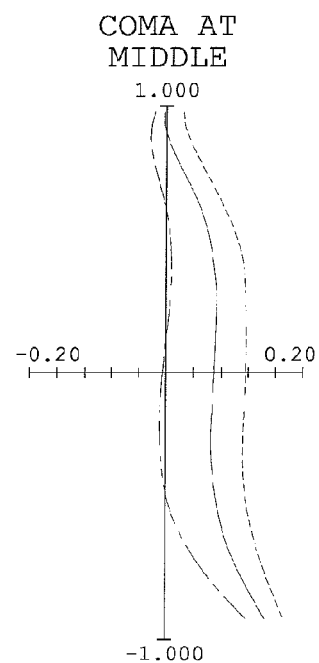
FIG. 30B shows a state in focusing at infinity in the middle position.
Figure 30C:
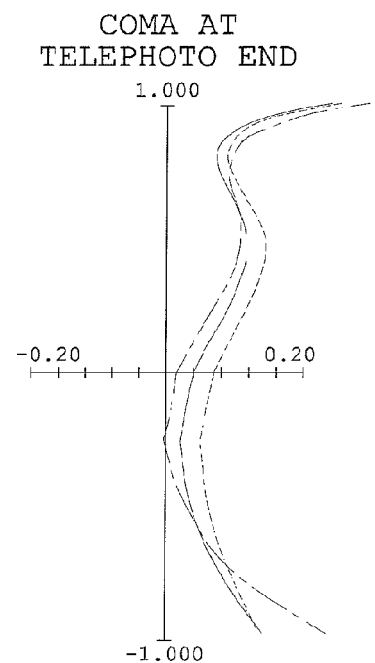
FIG. 30C shows a state in focusing at infinity in the telephoto end position.
Figure 31A:
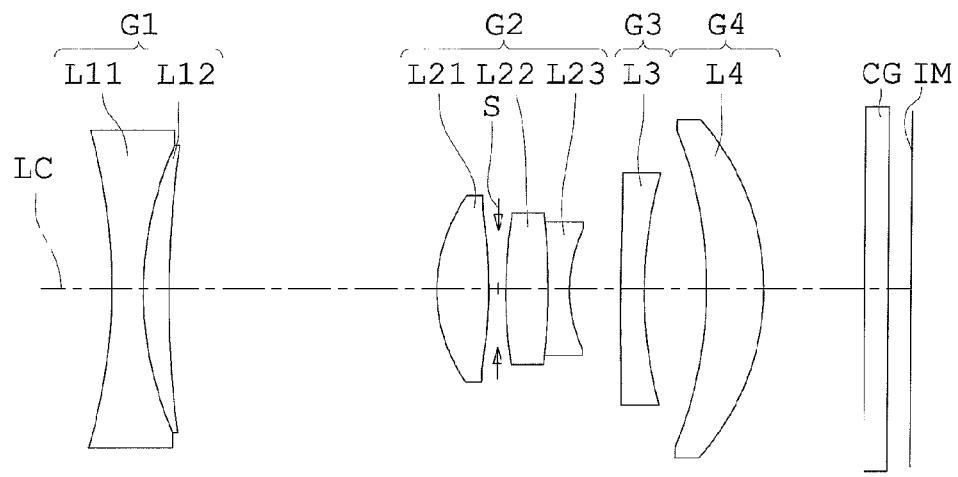
FIG. 31A shows the configuration of lenses in the wide angle end position.
Figure 31B:
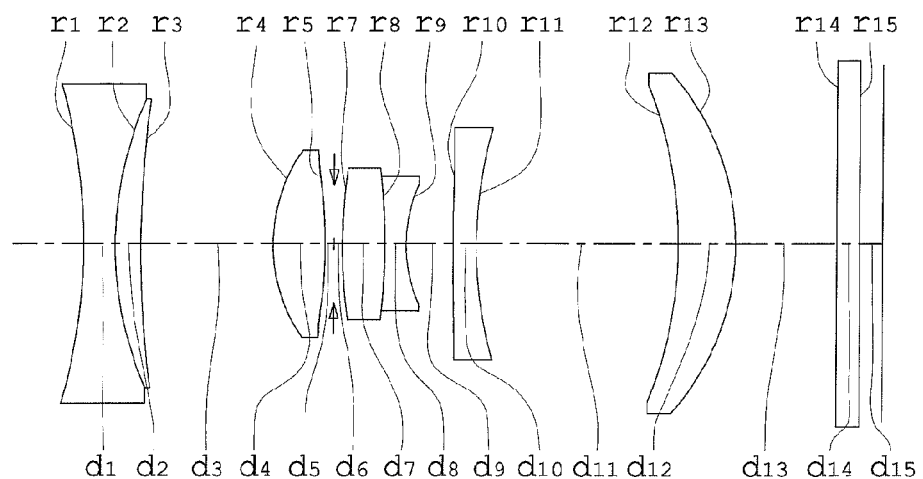
FIG. 31B shows the configuration of lenses in the middle position.
Figure 31C:
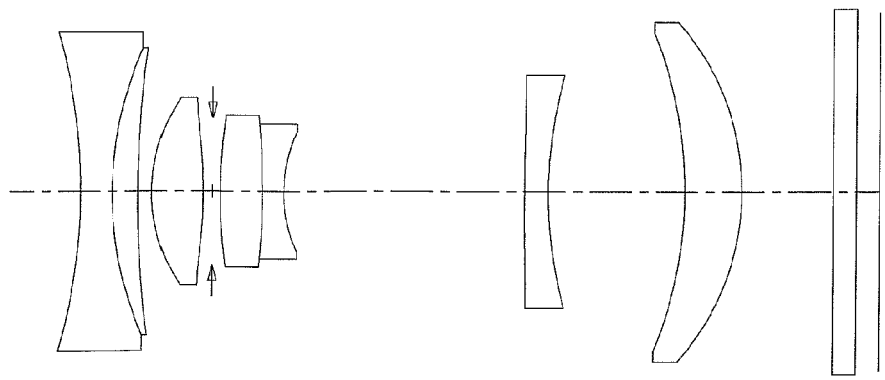
FIG. 31C shows the configuration of lenses in the telephoto end position.
Figure 33A:
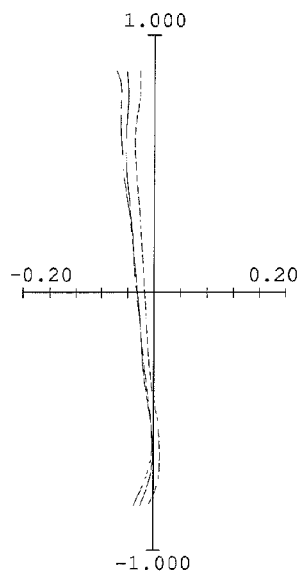
FIG. 33A shows a state in focusing at infinity in the wide angle end position.
Figure 33B:
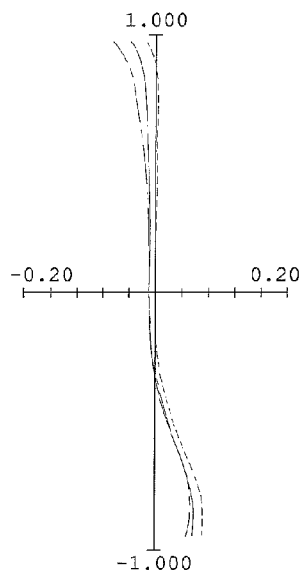
FIG. 33B shows a state in focusing at infinity in the middle position.
Figure 33C:
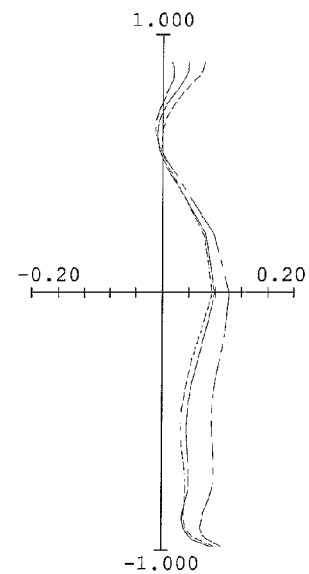
FIG. 33C shows a state in focusing at infinity in the telephoto end position.
Figure 34A:
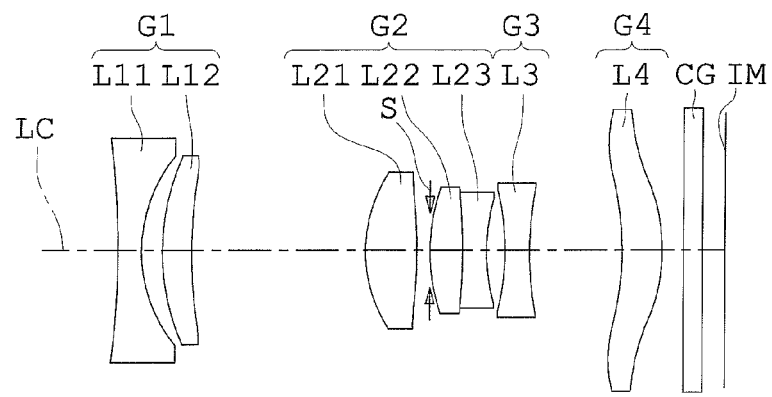
FIG. 34A shows the configuration of lenses in the wide angle end position.
Figure 34B:
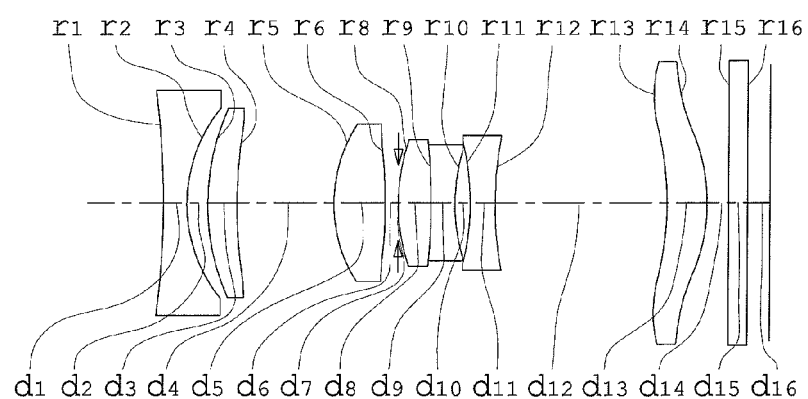
FIG. 34B shows the configuration of lenses in the middle position.
Figure 34C:
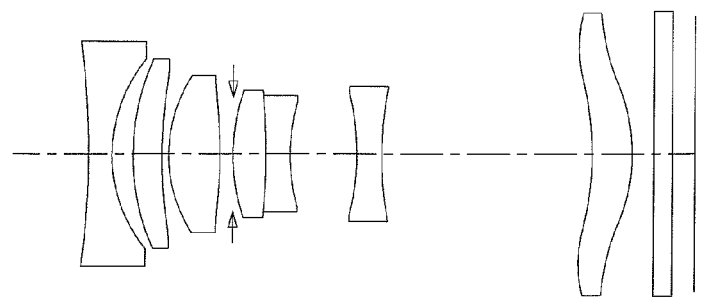
FIG. 34C shows the configuration of lenses in the telephoto end position.
Figure 36A:
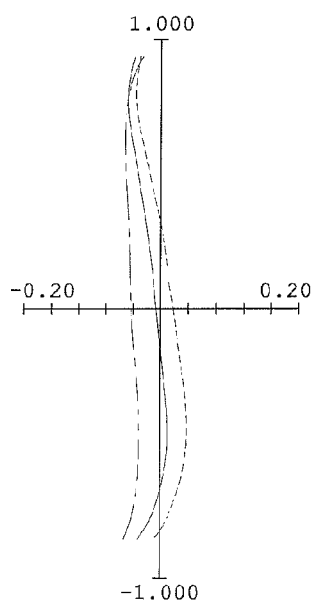
FIG. 36A shows a state in focusing at infinity in the wide angle end position.
Figure 36B:
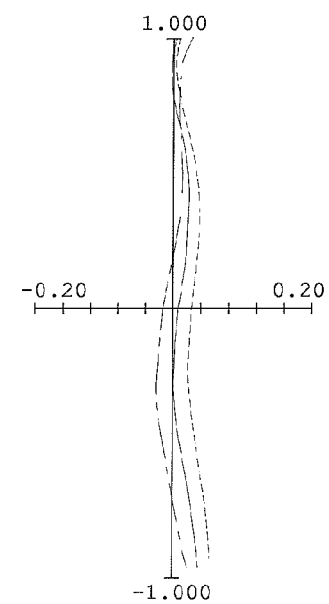
FIG. 36B shows a state in focusing at infinity in the middle position.
Figure 36C:
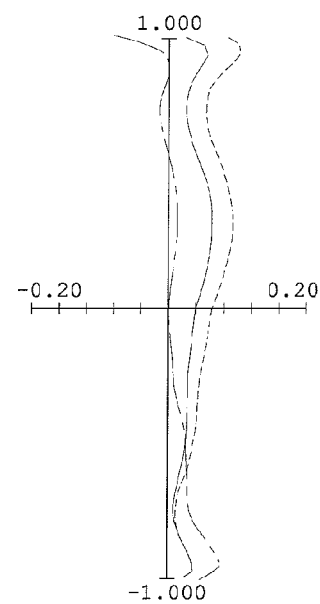
FIG. 36C shows a state in focusing at infinity in the telephoto end position.
Figure 37A:
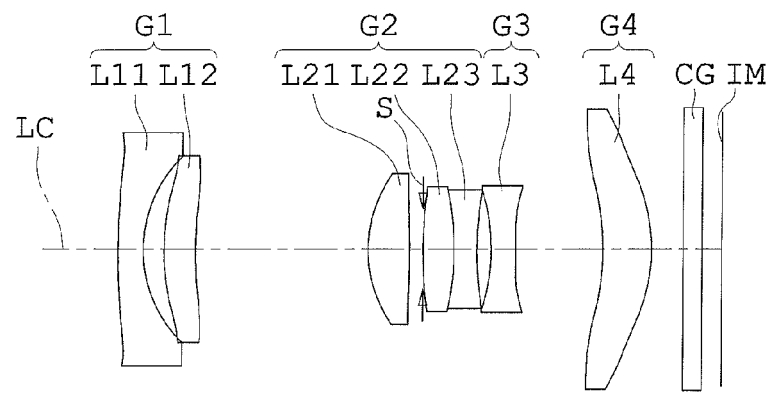
FIG. 37A shows the configuration of lenses in the wide angle end position.
Figure 37B:
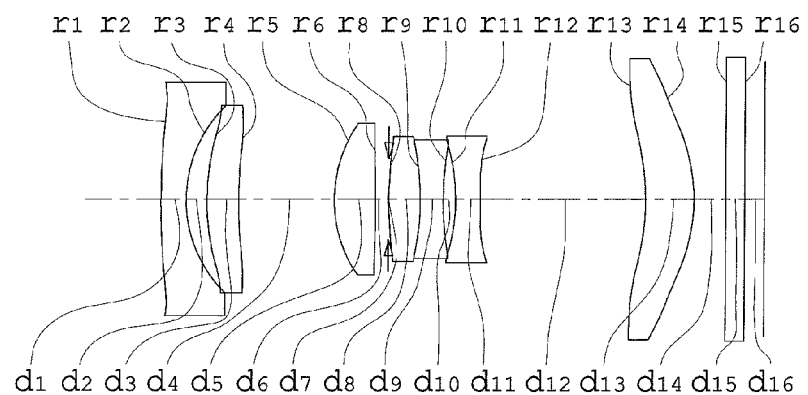
FIG. 37B shows the configuration of lenses in the middle position.
Figure 37C:
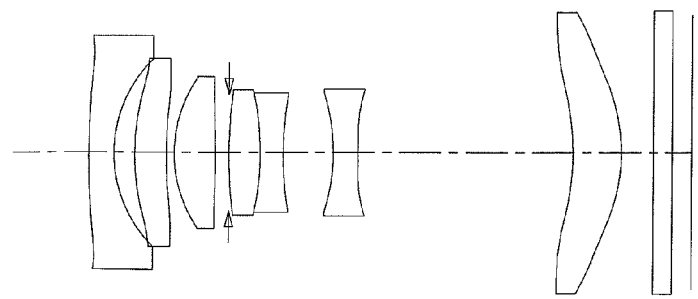
FIG. 37C shows the configuration of lenses in the telephoto end position.
Figure 39A:
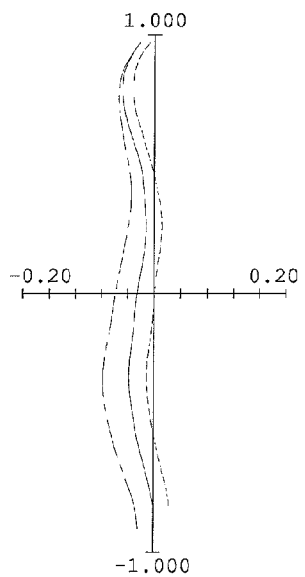
FIG. 39A shows a state in focusing at infinity in the wide angle end position.
Figure 39B:
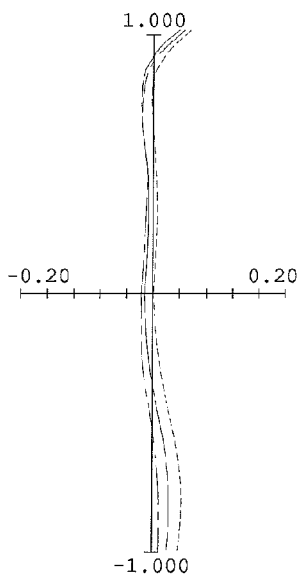
FIG. 39B shows a state in focusing at infinity in the middle position.
Figure 39C:
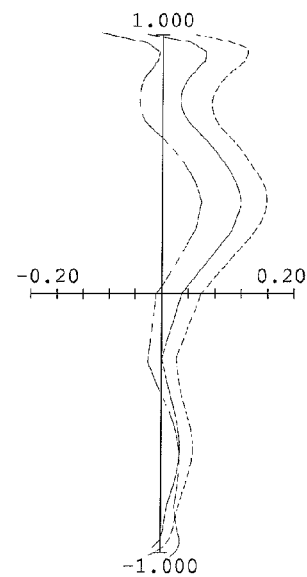
FIG. 39C shows a state in focusing at infinity in the telephoto end position.
Figure 40A:
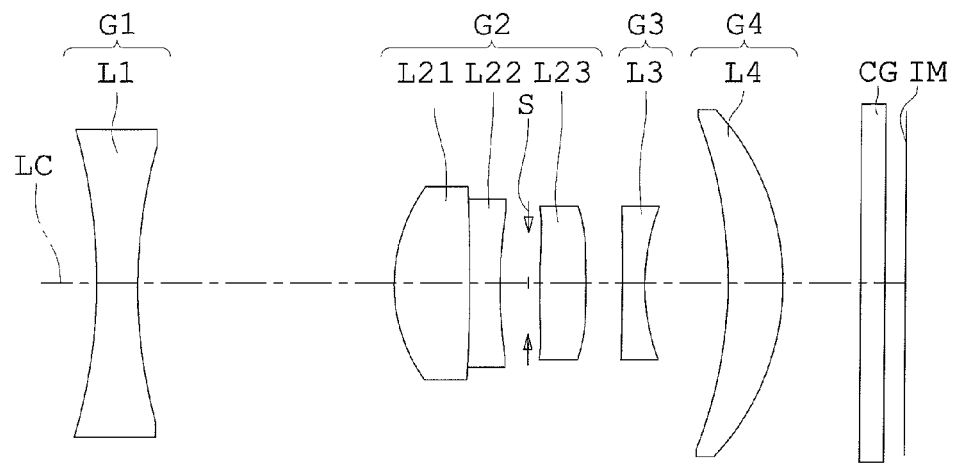
FIG. 40A shows the configuration of lenses in the wide angle end position.
Figure 40B:
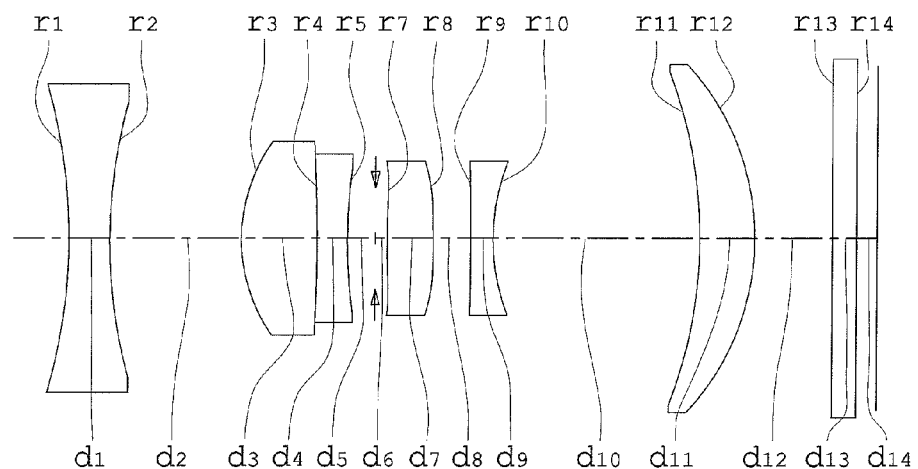
FIG. 40B shows the configuration of lenses in the middle position.
Figure 40C:
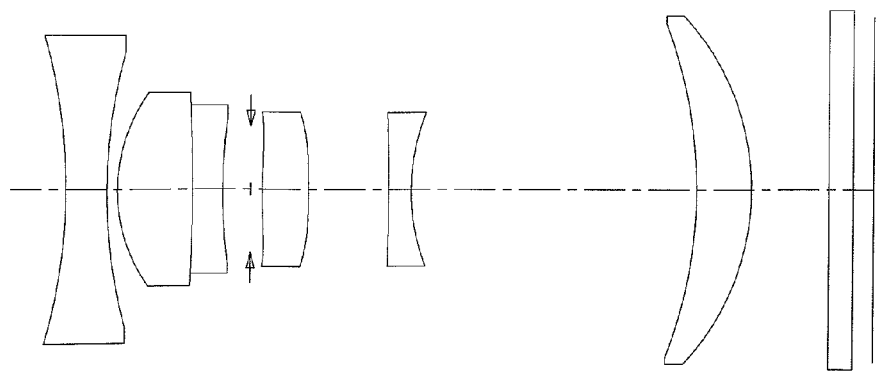
FIG. 40C shows the configuration of lenses in the telephoto end position.

The sectional view of the variable power optical system of the embodiment 1 is shown in FIG. 1, the sectional view of the variable power optical system of the embodiment 2 is shown in FIG. 5, the sectional view of the variable power optical system of the embodiment 3 is shown in FIG. 9, the sectional view of the variable power optical system of the embodiment 4 is shown in FIG. 13, the sectional view of the variable power optical system of the embodiment 5 is shown in FIG. 17, the sectional view of the variable power optical system of the embodiment 6 is shown in FIG. 21, the sectional view of the variable power optical system of the embodiment 7 is shown in FIG. 25, the sectional view of the variable power optical system of the embodiment 8 is shown in FIG. 28, the sectional view of the variable power optical system of the embodiment 9 is shown in FIG. 31, the sectional view of the variable power optical system of the embodiment 10 is shown in FIG. 34, the sectional view of the variable power optical system of the embodiment 11 is shown in FIG. 37, and the sectional view of the variable power optical system of the embodiment 12 is shown in FIG. 40.

In the embodiment 1, the image height (IH) is 2.9 mm, and the pixel pitch of the imaging sensor is 1.4 μm. In the embodiment 10, the image height (IH) is 2.25 mm, and the pixel pitch of the imaging sensor is 1.1 μm, in the below explanation. However, the image height and the pixel pitch in each of the below-described embodiments are not limited to these numerical values. For example, the pixel pitch of the imaging sensor may be 2.00 μm, 1.75 μm, 1.40 μm, or 1.1 μm. The diameter of the aperture stop in the telephoto end position is larger than that of the aperture stop in the wide angle end position. As a result, it is possible to prevent the deterioration of the performance due to the diffraction limit, in the telephoto end position. However, the aperture diameter may be unchangeable if there is no practical problem.

Embodiment 1

The optical constitution of the variable power optical system of the present embodiment is explained using FIG. 1. The total length of the variable power optical system of the present embodiment is about 13 mm. The variable power optical system of the present embodiment includes, in order from the object side, a first lens group G1 with negative refractive power, a second lens group G2 with positive refractive power, a third lens group G3 with negative refractive power, and a fourth lens group G4 with positive refractive power, these lens groups being located on the optical axis Lc.

The first lens group G1 is composed of a negative meniscus lens L11 the convex surface of which faces toward the object side and a positive meniscus lens L12 the convex surface of which faces toward the object side, in that order from the object side. And, the first lens group G1 as a whole has negative refractive power.

The second lens group G2 includes a first lens element with positive refractive power, a second lens element, and a third lens element, in that order from the object side. The first and second lens elements have convex shapes on the object side, respectively. Specifically, the second lens group is composed of a biconvex positive lens L21 which becomes the first lens element, an aperture stop S, a biconvex positive lens L22 which becomes the second lens element, and a biconcave negative lens L23 which becomes the third lens element and is joined to the biconvex positive lens L22, in that order from the object side. And, the second lens group G2 has positive refractive power as a whole and has a main magnification change function.

The third lens group G3 is composed of one biconcave negative lens L3. Besides, the biconcave negative lens L3 may be replaced with a negative meniscus lens the convex surface of which faces toward the object side or with a negative meniscus lens the concave surface of which faces toward the object side.

The fourth lens group G4 is composed of one positive meniscus lens L4 the convex surface of which faces toward the image side.

In changing magnification from the wide angle end position to the telephoto end position, the first lens group G1 and the fourth lens group G4 keep still, and the second lens group G2 and the third lens group G3 move toward the object side. In changing from an object point at infinity to a close object point to focus the optical system on the close object point, both of the second and third lens groups G2 and G3 may be moved.

Embodiment 2

The optical constitution of the variable power optical system of the present embodiment is explained using FIG. 5. The total length of the variable power optical system of the present embodiment is about 13 mm.

The variable power optical system of the present embodiment includes, in order from the object side, a first lens group G1 with negative refractive power, a second lens group G2 with positive refractive power, a third lens group G3 with negative refractive power, and a fourth lens group G4 with positive refractive power, these lens group being located on the optical axis Lc.

The first lens group G1 is composed of a negative meniscus lens L11 the convex surface of which faces toward the object side and a positive meniscus lens L12 the convex surface of which faces toward the object side, in that order from the object side. And, the first lens group G1 as a whole has negative refractive power.

The second lens group G2 includes a first lens element with positive refractive power, a second lens element, and a third lens element, in that order from the object side. The first and second lens elements have convex shapes on the object side, respectively. Specifically, the second lens group G2 is composed of a biconvex positive lens L21 which becomes the first lens element, an aperture stop S, a biconvex positive lens L22 which becomes the second lens element, and a biconcave negative lens L23 which becomes the third lens element and is joined to the biconvex positive lens L22, in that order from the object side. And, the second lens group G2 has positive refractive power as a whole and has a main magnification change function.

The third lens group G3 is composed of one negative meniscus lens L3 the concave surface of which faces toward the object side. Besides, the negative meniscus lens element L3 the concave surface of which faces toward the object side may be replaced with a negative meniscus lens the convex surface of which faces toward the object side or with a biconcave negative lens.

The fourth lens group G4 is composed of one positive meniscus lens L4 the convex surface of which faces toward the image side.

In changing magnification from the wide angle end position to the telephoto end position, the first lens group G1 and the fourth lens group G4 keep still, and the second lens group G2 and the third lens group G3 move toward the object side. In changing from an object point at infinity to a close object point to focus the optical system on the close object point, both of the second and third lens groups G2 and G3 may be moved.

It is possible to correct variation in field curvature well in focusing on an object, by moving the both lens groups.

Embodiment 3

The optical constitution of the variable power optical system of the present embodiment is explained using FIG. 9. The total length of the variable power optical system of the present embodiment is about 16 mm.

The variable power optical system of the present embodiment includes, in order from the object side, a first lens group G1 with negative refractive power, a second lens group G2 with positive refractive power, a third lens group G3 with positive refractive power, and a fourth lens group G4 with positive refractive power, these lens groups being located on the optical axis Lc.

The first lens group G1 is composed of one biconcave negative lens L1.

The second lens group G2 is composed of one positive meniscus lens L2 the convex surface of which faces toward the object side.

The third lens group G3 includes a first lens element with positive refractive power, a second lens element, and a third lens element, in that order from the object side. The second lens element has a convex shape on the object side. Specifically, the second lens group G3 is composed of an aperture stop S, a biconvex positive lens L31 which becomes the first lens element, a negative meniscus lens L32 which becomes the second lens element and the convex surface of which faces toward the object side, and a negative meniscus lens L33 which becomes the third lens element and the convex surface of which faces toward the object side, in that order from the object side. And, the third lens group G3 as a whole has positive refractive power.

The fourth lens group G4 is composed of one biconvex positive lens L4.

In changing magnification from the wide angle end position to the telephoto end position, the first lens group G1 and the fourth lens group G4 keep still, and the second lens group G2 and the third lens group G3 move toward the object side.

In changing from an object point at infinity to a close object point to focus the optical system on the close object point, both of the second and third lens groups G2 and G3 may be moved.

It is possible to correct variation in field curvature well in focusing on an object, by moving the both lens groups.

Embodiment 4

The optical constitution of the variable power optical system of the present embodiment is explained using FIG. 13. The total length of the variable power optical system of the present embodiment is about 13 mm.

The variable power optical system of the present embodiment includes, in order from the object side, a first lens group G1 with negative refractive power, a second lens group G2 with positive refractive power, a third lens group G3 with negative refractive power, and a fourth lens group G4 with positive refractive power, these lens groups being located on the optical axis Lc.

The first lens group G1 is composed of a negative meniscus lens L11 the convex surface of which faces toward the object side and a positive meniscus lens L12 the convex surface of which faces toward the object side, in that order from the object side. And, the first lens group G1 as a whole has negative refractive power.

The second lens group G2 includes a first lens element with positive refractive power, a second lens element, and a third lens element, in that order from the object side. The first and second lens elements have convex shapes on the object side, respectively. Specifically, the second lens group G2 is composed of a biconvex positive lens L21 which becomes the first lens element, an aperture stop S, a biconvex positive lens L22 which becomes the second lens element, and a biconcave negative lens L23 which becomes the third lens element and is joined to the biconvex positive lens L22, in that order from the object side. And, the second lens group G2 has positive refractive power as a whole and has a main magnification change function.

The third lens group G3 is composed of one biconcave negative lens L3. Besides, the biconcave negative lens L3 may be replaced with a negative meniscus lens the convex surface of which faces toward the object side or with a negative meniscus lens the concave surface of which faces toward the object side.

The fourth lens group G4 is composed of one positive meniscus lens L4 the convex surface of which faces toward the image side.

In changing magnification from the wide angle end position to the telephoto end position, the first lens group G1 and the fourth lens group G4 keep still, and the second lens group G2 and the third lens group G3 move toward the object side.

In changing from an object point at infinity to a close object point to focus the optical system on the close object point, both of the second and third lens groups G2 and G3 may be moved.

Embodiment 5

The optical constitution of the variable power optical system of the present embodiment is explained using FIG. 17. The total length of the variable power optical system of the present embodiment is about 13 mm.

The variable power optical system of the present embodiment includes, in order from the object side, a first lens group G1 with negative refractive power, a second lens group G2 with positive refractive power, a third lens group G3 with negative refractive power, and a fourth lens group G4 with positive refractive power, these lens groups being located on the optical axis Lc.

The first lens group G1 is composed of a negative meniscus lens L11 the convex surface of which faces toward the object side and a positive meniscus lens L12 the convex surface of which faces toward the object side, in that order from the object side. And, the first lens group G1 as a whole has negative refractive power.

The second lens group G2 includes a first lens element with positive refractive power, a second lens element, and a third lens element, in that order from the object side. The first and second lens elements have convex shapes on the object side, respectively. Specifically, the second lens group is composed of a biconvex positive lens L21 which becomes the first lens element, an aperture stop S, a biconvex positive lens L22 which becomes the second lens element, and a biconcave negative lens L23 which becomes the third lens element and is joined to the biconvex positive lens L22, in that order from the object side. And, the second lens group G2 has positive refractive power as a whole and has a main magnification change function.

The third lens group G3 is composed of one biconcave negative lens L3. Besides, the biconcave negative lens L3 may be replaced with a negative meniscus lens the convex surface of which faces toward the object side or with a negative meniscus lens the concave surface of which faces toward the object side.

The fourth lens group G4 is composed of one positive meniscus lens L4 the convex surface of which faces toward the image side.

In changing magnification from the wide angle end position to the telephoto end position, the first lens group G1 and the fourth lens group G4 keep still, and the second lens group G2 and the third lens group G3 move toward the object side.

In changing from an object point at infinity to a close object point to focus the optical system on the close object point, both of the second and third lens groups G2 and G3 may be moved.

Embodiment 6

The optical constitution of the variable power optical system of the present embodiment is explained using FIG. 21. The total length of the variable power optical system of the present embodiment is about 13.5 mm.

The variable power optical system of the present embodiment includes, in order from the object side, a first lens group G1 with negative refractive power, a second lens group G2 with positive refractive power, a third lens group G3 with negative refractive power, and a fourth lens group G4 with positive refractive power, these lens group being located on the optical axis Lc.

The first lens group G1 is composed of a biconcave negative lens L11 and a positive meniscus lens L12 which is jointed to the biconcave negative lens L11 and the convex surface of which faces toward the object side, in that order from the object side. And, the first lens group G1 as a whole has negative refractive power. When the L12 is made of energy curable resin, it is possible to make the first lens group G1 thin, so that it is possible to sufficiently secure an amount of movement of the second lens group G2 in changing magnification. As a result, it is possible to shorten the total length of the optical system while good performance of the optical system is being maintained.

The second lens group G2 includes a first lens element with positive refractive power, a second lens element, and a third lens element, in that order from the object side. The first and second lens elements have convex shapes on the object side, respectively. Specifically, the second lens group G2 is composed of a biconvex positive lens L21 which becomes the first lens element, an aperture stop S, a biconvex positive lens L22 which becomes the second lens element, and a biconcave negative lens L23 which becomes the third lens element and is joined to the biconvex positive lens L22, in that order from the object side. And, the second lens group G2 as a whole has positive refractive power.

The third lens group G3 is composed of one biconcave negative lens L3. Besides, the biconcave negative lens element L3 may be replaced with a negative meniscus lens the convex surface of which faces toward the object side or with a negative meniscus lens the concave surface of which faces toward the object side.

The fourth lens group G4 is composed of one positive meniscus lens L4 the convex surface of which faces toward the image side.

In changing magnification from the wide angle end position to the telephoto end position, the first lens group G1 and the fourth lens group G4 keep still, the second lens group G2 moves toward the object side, and the third lens group G3 moves to the position nearest to the object side in the middle of the optical system.

In changing from an object point at infinity to a close object point to focus the optical system on the close object point, both of the second and third lens groups G2 and G3 may be moved.

Embodiment 7

The optical constitution of the variable power optical system of the present embodiment is explained using FIG. 25. The total length of the variable power optical system of the present embodiment is about 13 mm.

The variable power optical system of the present embodiment includes, in order from the object side, a first lens group G1 with negative refractive power, a second lens group G2 with positive refractive power, a third lens group G3 with negative refractive power, and a fourth lens group G4 with positive refractive power, these lens groups being located on the optical axis Lc.

The first lens group G1 is composed of a biconcave negative lens L11 and a positive meniscus lens L12 which is jointed to the biconcave negative lens L11 and the convex surface of which faces toward the object side, in that order from the object side. And, the first lens group G1 as a whole has negative refractive power.

When the L12 is made of energy curable resin, it is possible to make the first lens group G1 thin, so that it is possible to sufficiently secure an amount of movement of the second lens group G2 in changing magnification. As a result, it is possible to shorten the total length of the optical system while good performance of the optical system is being maintained.

The second lens group G2 includes a first lens element with positive refractive power, a second lens element, and a third lens element, in that order from the object side. The first and second lens elements have convex shapes on the object side, respectively. Specifically, the second lens group G2 is composed of a biconvex positive lens L2 which becomes the first lens element, an aperture stop S, the biconvex positive lens L22 which becomes the second lens element, a biconcave negative lens L23 which becomes the third lens element and is jointed to the biconvex positive lens L22, in that order from the object side. And, the second lens group G2 has positive refractive power as a whole and has a main magnification change function.

The third lens group G3 is composed of one biconcave negative lens L3. Besides, the biconcave negative lens L3 may be replaced with a negative meniscus lens the convex surface of which faces toward the object side or with a negative meniscus lens the concave surface of which faces toward the object side.

The fourth lens group G4 is composed of one positive meniscus lens L4 the convex surface of which faces toward the image side.

In changing magnification from the wide angle end position to the telephoto end position, the first lens group G1 and the fourth lens group G4 keep still, and the second lens group G2 moves toward the object side, and the third lens group G3 moves to the position nearest to the object side in the middle of the optical system.

In changing from an object point at infinity to a close object point to focus the optical system on the close object point, both of the second and third lens groups G2 and G3 may be moved.

Embodiment 8

The optical constitution of the variable power optical system of the present embodiment is explained using FIG. 28. The total length of the variable power optical system of the present embodiment is about 13 mm.

The variable power optical system of the present embodiment includes, in order from the object side, a first lens group G1 with negative refractive power, a second lens group G2 with positive refractive power, a third lens group G3 with negative refractive power, and a fourth lens group G4 with positive refractive power, these lens groups being located on the optical axis Lc.

The first lens group G1 is composed of a biconcave negative lens L11 and a positive meniscus lens L12 which is jointed to the biconcave negative lens L11 and the convex surface of which faces toward the object side, in that order from the object side. And, the first lens group G1 as a whole has negative refractive power.

When the L12 is made of energy curable resin, it is possible to make the first lens group G1 thin, so that it is possible to sufficiently secure an amount of movement of the second lens group G2 in changing magnification. As a result, it is possible to shorten the total length of the optical system while good performance of the optical system is being maintained.

The second lens group G2 includes a first lens element with positive refractive power, a second lens element, and a third lens element, in that order from the object side. The first and second lens elements have convex shapes on the object side, respectively. Specifically, the second lens group G2 is composed of a biconvex positive lens L21 which becomes the first lens element, an aperture stop S, a biconvex positive lens L22 which becomes the second lens element, and a biconcave negative lens L23 which becomes the third lens element and is joined to the biconvex positive lens L22, in that order from the object side. And, the second lens group G2 has positive refractive power as a whole and has a main magnification change function.

The third lens group G3 is composed of one negative meniscus lens L3 the convex surface of which faces toward the object sides. Besides, the negative meniscus lens L3 the convex surface of which faces toward the object side may be replaced with a negative meniscus lens the concave surface of which faces toward the object side or with a biconcave negative lens.

The fourth lens group G4 is composed of one positive meniscus lens L4 the convex surface of which faces toward the image side.

In changing magnification from the wide angle end position to the telephoto end position, the first lens group G1 and the fourth lens group G4 keep still, and the second lens group G2 and the third lens group G3 move toward the object side.

Embodiment 9

The optical constitution of the variable power optical system of the present embodiment is explained using FIG. 31. The total length of the variable power optical system of the present embodiment is about 13.5 mm.

The variable power optical system of the present embodiment includes, in order from the object side, a first lens group G1 with negative refractive power, a second lens group G2 with positive refractive power, a third lens group G3 with negative refractive power, and a fourth lens group G4 with positive refractive power, these lens groups being located on the optical axis Lc.

The first lens group G1 is composed of a biconcave negative lens L11 and a positive meniscus lens L12 which is jointed to the biconcave negative lens L11 and the convex surface of which faces toward the object side, in that order from the object side. And, the first lens group G1 as a whole has negative refractive power.

When the L12 is made of energy curable resin, it is possible to make the first lens group G1 thin, so that it is possible to sufficiently secure an amount of movement of the second lens group G2 in changing magnification. As a result, it is possible to shorten the total length of the optical system while good performance of the optical system is being maintained.

The second lens group G2 includes a first lens element with positive refractive power, a second lens element, and a third lens element, in that order from the object side. The first and second lens elements have convex shapes on the object side, respectively. Specifically, the second lens group is composed of a biconvex positive lens L21 which becomes the first lens element, an aperture stop S, a biconvex positive lens L22 which becomes the second lens element, and a biconcave negative lens L23 which becomes the third lens element and is joined to the biconvex positive lens L22, in that order from the object side. And, the second lens group G2 has positive refractive power as a whole and has a main magnification change function.

The third lens group G3 is composed of one biconcave negative lens L3. Besides, the biconcave negative lens L3 may be replaced with a negative meniscus lens the convex surface of which faces toward the object side or with a negative meniscus lens the concave surface of which faces toward the object side.

The fourth lens group G4 is composed of one positive meniscus lens L4 the convex surface of which faces toward the image side.

In changing magnification from the wide angle end position to the telephoto end position, the first lens group G1 keeps still, the second lens group G2 moves toward the object side, the third lens group G3 moves to the position nearest to the object side in the middle of the optical system, and the fourth lens group G4 moves toward the image side.

Embodiment 10

The optical constitution of the variable power optical system of the present embodiment is explained using FIG. 34. The total length of the variable power optical system of the present embodiment is about 10 mm.

The variable power optical system of the present embodiment includes, in order from the object side, a first lens group G1 with negative refractive power, a second lens group G2 with positive refractive power, a third lens group G3 with negative refractive power, and a fourth lens group G4 with positive refractive power, these lens group being located on the optical axis Lc.

The first lens group G1 is composed of a biconcave negative lens L11 and a positive meniscus lens L12 the convex surface of which faces toward the object side, in that order from the object side. And, the first lens group G1 as a whole has negative refractive power.

The second lens group G2 includes a first lens element with positive refractive power, a second lens element, and a third lens element, in that order from the object side. The first and second lens elements have convex shapes on the object side, respectively. Specifically, the second lens group G2 is composed of a biconvex positive lens L21 which becomes the first lens element, an aperture stop S, a biconvex positive lens L22 which becomes the second lens element, and a biconcave negative lens L23 which becomes the third lens element and is joined to the biconvex positive lens L22, in that order from the object side. And, the second lens group G2 has positive refractive power as a whole and has a main magnification change function.

The third lens group G3 is composed of one biconcave negative lens L3. Besides, the biconcave negative lens element L3 may be replaced with a negative meniscus lens the convex surface of which faces toward the object side or with a negative meniscus lens the concave surface of which faces toward the object side.

The fourth lens group G4 is composed of one positive meniscus lens L4 the convex surface of which faces toward the image side.

In changing magnification from the wide angle end position to the telephoto end position, the first lens group G1 and the fourth lens group G4 keep still, and the second lens group G2 and the third lens group G3 move toward the object side. In changing from an object point at infinity to a close object point to focus the optical system on the close object point, both of the second and third lens groups G2 and G3 may be moved.

Embodiment 11

The optical constitution of the variable power optical system of the present embodiment is explained using FIG. 37 The total length of the variable power optical system of the present embodiment is about 10 mm.

The variable power optical system of the present embodiment includes, in order from the object side, a first lens group G1 with negative refractive power, a second lens group G2 with positive refractive power, a third lens group G3 with negative refractive power, and a fourth lens group G4 with positive refractive power, these lens groups being located on the optical axis Lc.

The first lens group G1 is composed of a negative meniscus lens L11 the convex surface of which faces toward the object side and a positive meniscus lens L12 the convex surface of which faces toward the object side, in that order from the object side. And, the first lens group G1 as a whole has negative refractive power.

The second lens group G2 includes a first lens element with positive refractive power, a second lens element, and a third lens element, in that order from the object side. The first and second lens elements have convex shapes on the object side, respectively. Specifically, the second lens group G2 is composed of a biconvex positive lens L21 which becomes the first lens element, an aperture stop S, a biconvex positive lens L22 which becomes the second lens element, and a biconcave negative lens L23 which becomes the third lens element and is jointed to the biconvex positive lens L22, in that order from the object side. And, the third lens group G2 has positive refractive power as a whole and has a main magnification change function.

The third lens group G3 is composed of one negative meniscus lens L3 the concave surface of which faces toward the object side. Besides, the negative meniscus lens L3 the concave surface of which faces toward the object side may be replaced with a negative meniscus lens the convex surface of which faces toward the object side or with a biconcave negative lens.

The fourth lens group G4 is composed of one positive meniscus lens L4 the convex surface of which faces toward the image side.

In changing magnification from the wide angle end position to the telephoto end position, the first lens group G1 and the fourth lens group G4 keep still, and the second lens group G2 and the third lens group G3 move toward the object side.

In changing from an object point at infinity to a close object point to focus the optical system on the close object point, both of the second and third lens groups G2 and G3 may be moved.

Embodiment 12

The optical constitution of the variable power optical system of the present embodiment is explained using FIG. 40. The total length of the variable power optical system of the present embodiment is about 14 mm.

The variable power optical system of the present embodiment includes, in order from the object side, a first lens group G1 with negative refractive power, a second lens group G2 with positive refractive power, a third lens group G3 with negative refractive power, and a fourth lens group G4 with positive refractive power, these lens groups being located on the optical axis Lc.

The first lens group G1 is composed of one biconcave negative lens L1.

The second lens group G2 is composed of a first lens element with positive refractive power, a second lens element, and a third lens element, in that order from the object side. The first lens element has a convex shape on the object side. Specifically, the second lens group G2 is composed of a biconvex positive lens L21 which becomes the first lens element, a biconcave negative lens L22 which becomes the second lens element and is joined to the biconvex positive lens L21, an aperture stop S, and a biconvex positive lens L23 which becomes the third lens element, in that order from the object side. And, the second lens group G2 has positive refractive power as a whole and has a main magnification change function.

The third lens group G3 is composed of one negative meniscus lens L3 the convex surface of which faces toward the object side. Besides, the negative meniscus lens L3 the convex surface of which faces toward the object side may be replaced with a negative meniscus lens the concave surface of which faces toward the object side or with a biconcave negative lens.

The fourth lens group G4 is composed of one positive meniscus lens L4 the convex surface of which faces toward the image side.

In changing magnification from the wide angle end position to the telephoto end position, the first lens group G1 and the fourth lens group G4 keep still, and the second lens group G2 and the third lens group G3 move toward the object side.

Next, in each of the embodiments 1 to 12, the numerical data of the optical members constituting each of the variable power optical systems will be given. The embodiment 1 corresponds to a numerical embodiment 1. The embodiment 2 corresponds to a numerical embodiment 2. The embodiment 3 corresponds to a numerical embodiment 3. The embodiment 4 corresponds to a numerical embodiment 4. The embodiment 5 corresponds to a numerical embodiment 5. The embodiment 6 corresponds to a numerical embodiment 6. The embodiment 7 corresponds to a numerical embodiment 7. The embodiment 8 corresponds to a numerical embodiment 8. The embodiment 9 corresponds to a numerical embodiment 9. The embodiment 10 corresponds to a numerical embodiment 10. The embodiment 11 corresponds to a numerical embodiment 11. The embodiment 12 corresponds to a numerical embodiment 12.

Besides, in the numerical data and the drawings, r denotes the radius of curvature of each of lens surfaces, d denotes the thickness of each of lenses or air spacing between lenses, nd denotes the refractive index of each of lenses with respect to the d line (587.56 nm), vd denotes the Abbe's number of each of lenses with respect to the d line (587.56 nm), and * (asterisk) expresses aspherical surface. A unit of length is mm in the numerical data.

Also, when z is taken as a coordinate in the direction along the optical axis, y is taken as a coordinate in the direction perpendicular to the optical axis, K denotes a conic constant, and A4, A6, A8, and A10 denote an aspherical coefficient, the shapes of aspherical surfaces are expressed by the following formula (I):

$$z=(y^2/r)/[1+\{1-(1+K)(y/r)^2\}^{1/2}]+A4y^4+A6y^6+A8y^8+A10y^{10} \quad (I)$$

Also, e denotes a power of ten. Besides, these symbols for these various values are also common to the following numerical data of the embodiments.

Besides, BF denotes the distance from the last surface in lenses to a paraxial image plane in the form of air equivalent amount, and lens total length denotes a value obtained by adding the distance between the first surface and the last surface in lenses to BF. On the other hand, BF# denotes the distance from the last surface in lenses to an image plane in the form of air equivalent amount, and lens total length# denotes a value obtained by adding the distance between the first surface and the last surface in lenses to BF#.

Numerical Embodiment 1

Surface data
Unit: mm

| Surface No. | r | d | nd | vd | Effective diameter |
|---|---|---|---|---|---|
| Object plane | ∞ | ∞ | | | |
| 1* | 29.7496 | 0.5421 | 1.90270 | 31.00 | 2.690 |
| 2* | 2.6180 | 0.5723 | | | 2.165 |
| 3* | 3.5600 | 0.7172 | 2.10223 | 16.77 | 2.185 |
| 4* | 5.6420 | D4 | | | 2.097 |
| 5* | 2.1763 | 0.9187 | 1.59201 | 67.02 | 1.427 |
| 6* | −44.5379 | 0.2000 | | | 1.318 |
| 7 (Stop) | ∞ | 0.0000 | | | (Variable) |
| 8* | 5.9838 | 0.6894 | 1.85135 | 40.10 | 1.207 |
| 9 | −6.5431 | 0.5215 | 1.82114 | 24.06 | 1.137 |
| 10* | 5.0933 | D10 | | | 1.011 |
| 11* | −4.9399 | 0.4461 | 1.77377 | 47.17 | 1.198 |
| 12* | 53.6530 | D12 | | | 1.427 |
| 13* | −14.4249 | 0.8801 | 1.82114 | 24.06 | 2.808 |
| 14* | −5.0670 | 0.2353 | | | 2.868 |
| 15 | ∞ | 0.3000 | 1.51633 | 64.14 | 2.929 |
| 16 | ∞ | 0.4000 | | | 2.947 |
| Image plane | ∞ | | | | |

Aspherical surface data

The first surface

K = −224.489, A4 = 6.10008e−03, A6 = −1.22957e−03,
A8 = 5.75218e−05
The second surface K = 0.086, A4 = −6.58139e−03, A6 = 3.39688e−03,
A8 = −7.32903e−04
The third surface K = −6.605, A4 = −3.67877e−03, A6 = 1.95938e−03,
A8 = −8.93682e−05
The fourth surface K = −21.342, A4 = −4.83678e−03, A6 = 6.39538e−04,
A8 = 5.70942e−05
The fifth surface K = −0.989, A4 = 2.50732e−03, A6 = 7.21049e−04,
A8 = 3.61962e−04

Numerical Embodiment 1

The sixth surface

K = −791.631, A4 = −1.12792e−02, A6 = 8.93540e−03,
A8 = −1.87646e−03

The eighth surface

K = 4.845, A4 = −9.49342e−04, A6 = 9.01956e−03,
A8 = −2.80204e−03

The tenth surface

K = −32.788, A4 = 6.96684e−02, A6 = −4.68501e−03,
A8 = 9.73012e−03

The eleventh surface

K = −3.112, A4 = 3.30281e−03, A6 = −6.05974e−03,
A8 = −4.24602e−03

The twelfth surface

K = −40363.004, A4 = 2.29435e−02, A6 = −1.24625e−02,
A8 = 9.19254e−04

The thirteenth surface

K = −1.394, A4 = 4.97914e−03, A6 = −1.14929e−03,
A8 = 9.38867e−05

The fourteenth surface

K = −2.722, A4 = 1.16889e−02, A6 = −2.73333e−03,
A8 = 1.79573e−04

Various data
Zoom ratio: 2.850

| | Wide angle end | Middle | Tele- photo end | Wide angle end | Middle | Tele- photo end |
|---|---|---|---|---|---|---|
| | | | | (focusing on a close range) | | |
| Focal length | 3.754 | 6.025 | 10.699 | | | |
| F No. | 3.200 | 4.369 | 5.200 | | | |
| Angle of view 2ω | 82.828 | 51.090 | 29.527 | | | |
| Image height | 2.900 | 2.900 | 2.900 | | | |
| BF | 0.833 | 0.833 | 0.833 | | | |
| Lens total length | 12.898 | 12.898 | 12.898 | | | |
| (Distance from an object point) | ∞ | ∞ | ∞ | 100.00 | 500.00 | 800.00 |
| D4 | 3.941 | 2.207 | 0.200 | 3.225 | 2.257 | 0.483 |
| D10 | 1.025 | 0.863 | 1.714 | 0.969 | 0.883 | 1.519 |
| D12 | 1.611 | 3.507 | 4.664 | 2.384 | 3.438 | 4.575 |
| Stop diameter | 0.987 | 0.987 | 1.215 | | | |
| (Entrance pupil position) | 3.159 | 2.655 | 1.791 | | | |
| (Exit pupil position) | −6.368 | −14.458 | −35.576 | | | |
| (The position of the front side principle point) | 4.966 | 6.304 | 9.349 | | | |
| (The position of the rear side principle point) | −3.317 | −5.641 | −10.271 | | | |

| Lens | The first surface of lens | Focal length of lens |
|---|---|---|
| L11 | 1 | −3.210 |
| L12 | 3 | 7.413 |
| L21 | 5 | 3.531 |
| L22 | 8 | 3.767 |
| L23 | 9 | −3.419 |
| L3 | 11 | −5.827 |
| L4 | 13 | 9.125 |

Zoom lens group data

| Group | The first surface of lens group | Focal length of lens group | Composition length of lens group | The position of the front side principle point | The position of the rear side principle point |
|---|---|---|---|---|---|
| G1 | 1 | −5.731 | 1.832 | 0.276 | −0.873 |
| G2 | 5 | 3.191 | 2.330 | −0.304 | −1.515 |
| G3 | 11 | −5.827 | 0.446 | 0.021 | −0.230 |
| G4 | 13 | 9.125 | 0.880 | 0.715 | 0.251 |

Magnification of lens group

| | Wide angle end | Middle | Tele- photo end | Wide angle end | Middle | Tele- photo end |
|---|---|---|---|---|---|---|
| | | | | (focusing on a close range) | | |
| G1 | 0.000 | 0.000 | 0.000 | 0.054 | 0.011 | 0.007 |
| G2 | −0.453 | −0.600 | −0.964 | −0.530 | −0.602 | −0.898 |
| G3 | 1.553 | 1.868 | 2.075 | 1.689 | 1.859 | 2.063 |
| G4 | 0.932 | 0.938 | 0.933 | 0.930 | 0.936 | 0.931 |

Numerical embodiment 2

Surface data
Unit: mm

| Surface No. | r | d | nd | vd | Effective diameter |
|---|---|---|---|---|---|
| Object plane | ∞ | ∞ | | | |
| 1* | 31.1191 | 0.5500 | 1.85135 | 40.10 | 2.825 |
| 2* | 2.5330 | 0.5132 | | | 2.187 |
| 3* | 3.1051 | 0.8424 | 1.82114 | 24.06 | 2.203 |
| 4* | 5.5712 | D4 | | | 2.110 |
| 5* | 2.0868 | 1.0720 | 1.59201 | 67.02 | 1.438 |
| 6* | −181.2845 | 0.2000 | | | 1.296 |
| 7 (Stop) | ∞ | 0.0000 | | | (Variable) |
| 8* | 5.2934 | 0.6793 | 1.85135 | 40.10 | 1.161 |
| 9 | −9.4008 | 0.4687 | 1.82114 | 24.06 | 1.086 |
| 10* | 4.3096 | D10 | | | 0.980 |
| 11* | −4.5361 | 0.4000 | 1.77377 | 47.17 | 1.185 |
| 12* | −4863.2721 | D12 | | | 1.405 |
| 13* | −15.0779 | 0.8960 | 1.82114 | 24.06 | 2.787 |
| 14* | −4.9623 | 0.2027 | | | 2.854 |
| 15 | ∞ | 0.3000 | 1.51633 | 64.14 | 2.920 |
| 16 | ∞ | 0.4000 | | | 2.953 |
| Image plane | ∞ | | | | |

Aspherical surface data

The first surface

K = 9.975, A4 = 5.45942e−03, A6 = −1.17913e−03, A8 = 6.14112e−05

The second surface

K = 0.028, A4 = −5.92450e−03, A6 = 3.54360e−03, A8 = −7.18809e−04

The third surface

K = −4.944, A4 = −2.93256e−03, A6 = 2.56724e−03,
A8 = −1.52620e−04

The fourth surface

K = −16.419, A4 = −5.87501e−03, A6 = 9.32666e−04,
A8 = 4.10944e−05

The fifth surface

K = −0.869, A4 = 3.97321e−03, A6 = 4.46620e−04, A8 = 3.23707e−04

Numerical embodiment 2

The sixth surface

K = −9645.985, A4 = −2.36383e−02, A6 = 1.14055e−02, A8 = −2.04346e−03

The eighth surface

K = −2.017, A4 = −1.25319e−02, A6 = 1.04830e−02, A8 = −2.75134e−03

The tenth surface

K = −37.283, A4 = 8.97816e−03, A6 = −2.64567e−02, A8 = 2.13844e−02

The eleventh surface

K = −3.217, A4 = 3.81585e−03, A6 = −1.49213e−02, A8 = 1.03508e−03

The twelfth surface

K = −14369395.106, A4 = 1.43170e−02, A6 = −1.10677e−02, A8 = 1.12467e−03

The thirteenth surface

K = −1.990, A4 = 5.00050e−03, A6 = −1.15848e−03, A8 = 9.16097e−05

The fourteenth surface

K = −2.578, A4 = 1.16150e−02, A6 = −2.73641e−03, A8 = 1.80048e−04

Various data
Zoom ratio: 2.850

| | Wide angle end | Middle | Telephoto end | Wide angle end | Middle | Telephoto end |
|---|---|---|---|---|---|---|
| | | | | (focusing on a close range) | | |
| Focal length | 3.754 | 6.021 | 10.699 | | | |
| F No. | 3.200 | 4.384 | 5.200 | | | |
| Angle of view 2ω | 82.691 | 50.978 | 29.424 | | | |
| Image height | 2.900 | 2.900 | 2.900 | | | |
| BF | 0.801 | 0.801 | 0.801 | | | |
| Lens total length | 12.898 | 12.898 | 12.898 | | | |
| (Distance from an object point) | ∞ | ∞ | ∞ | 100.00 | 500.00 | 800.00 |
| D4 | 3.931 | 2.208 | 0.200 | 3.736 | 2.222 | 0.266 |
| D10 | 0.964 | 0.788 | 1.612 | 0.981 | 0.811 | 1.598 |
| D12 | 1.581 | 3.480 | 4.663 | 1.759 | 3.443 | 4.612 |
| Stop diameter | 0.944 | 0.944 | 1.173 | | | |
| (Entrance pupil position) | 3.288 | 2.795 | 1.956 | | | |
| (Exit pupil position) | −6.289 | −14.879 | −41.689 | | | |
| (The position of the front side principle point) | 5.061 | 6.495 | 9.958 | | | |
| (The position of the rear side principle point) | −3.330 | −5.679 | −10.344 | | | |

| Lens | The first surface of lens | Focal length of lens |
|---|---|---|
| L11 | 1 | −3.268 |
| L12 | 3 | 7.403 |
| L21 | 5 | 3.492 |
| L22 | 8 | 4.064 |
| L23 | 9 | −3.544 |
| L3 | 11 | −5.868 |
| L4 | 13 | 8.662 |

Zoom lens group data

| Group | The first surface of lens group | Focal length of lens group | Composition length of lens group | The position of the front side principle point | The position of the rear side principle point |
|---|---|---|---|---|---|
| G1 | 1 | −5.825 | 1.906 | 0.340 | −0.873 |
| G2 | 5 | 3.180 | 2.420 | −0.387 | −1.600 |
| G3 | 11 | −5.868 | 0.400 | −0.000 | −0.226 |
| G4 | 13 | 8.662 | 0.896 | 0.705 | 0.232 |

Magnification of lens group

| | Wide angle end | Middle | Telephoto end | Wide angle end | Middle | Telephoto end |
|---|---|---|---|---|---|---|
| | | | | (focusing on a close range) | | |
| G1 | 0.000 | 0.000 | 0.000 | 0.055 | 0.012 | 0.007 |
| G2 | −0.450 | −0.596 | −0.954 | −0.486 | −0.601 | −0.948 |
| G3 | 1.536 | 1.844 | 2.048 | 1.576 | 1.842 | 2.043 |
| G4 | 0.932 | 0.941 | 0.940 | 0.926 | 0.939 | 0.938 |

Numerical embodiment 3

Surface data
Unit: mm

| Surface No. | r | d | nd | vd | Effective diameter |
|---|---|---|---|---|---|
| Object plane | ∞ | ∞ | | | |
| 1* | −51.6608 | 0.5500 | 1.53071 | 55.67 | 3.911 |
| 2* | 3.8768 | D2 | | | 2.973 |
| 3* | 4.5535 | 0.7634 | 1.63493 | 23.89 | 2.471 |
| 4* | 8.1682 | D4 | | | 2.332 |
| 5 (Stop) | ∞ | 0.0000 | | | (Variable) |
| 6* | 2.2847 | 1.2110 | 1.53071 | 55.67 | 1.442 |
| 7* | −4.8589 | 0.2000 | | | 1.407 |
| 8* | 27.5864 | 0.5000 | 1.63493 | 23.89 | 1.317 |
| 9* | 1.9602 | 0.5251 | | | 1.202 |
| 10* | 1.9235 | 0.7100 | 1.53071 | 55.67 | 1.500 |
| 11* | 1.9019 | D11 | | | 1.610 |
| 12* | 13.5849 | 1.5632 | 1.63493 | 23.89 | 2.944 |
| 13* | −23.9264 | 1.2468 | | | 2.814 |
| 14 | ∞ | 0.4000 | 1.51633 | 64.14 | 2.946 |
| 15 | ∞ | 0.4000 | | | 2.973 |
| Image plane | ∞ | | | | |

Aspherical surface data

The first surface

K = 5.000, A4 = −2.36892e−03, A6 = 2.28612e−04, A8 = −5.01395e−06

The second surface

K = −5.000, A4 = 6.35893e−03, A6 = −6.43852e−04, A8 = 6.13916e−05

The third surface

K = −4.992, A4 = 2.91448e−03, A6 = −7.05027e−04, A8 = 8.65670e−05

The fourth surface

K = −1.084, A4 = −3.57126e−03, A6 = −4.87021e−05, A8 = 6.46356e−05

The sixth surface

K = −1.312, A4 = 5.44552e−03, A6 = 3.11419e−03, A8 = −8.98067e−04

Numerical embodiment 3

The seventh surface

K = −4.146, A4 = 2.83431e−02, A6 = −1.00090e−02, A8 = 6.33877e−04
The eighth surface K = 0.000, A4 = 2.55526e−02, A6 = −8.57471e−03
The ninth surface K = −3.832, A4 = 3.21058e−02, A6 = 7.16734e−03, A8 = 7.08642e−04
The tenth surface K = −3.755, A4 = −1.67129e−02, A6 = −5.64958e−03,
A8 = 3.28290e−03
The eleventh surface K = −1.122, A4 = −4.68131e−02, A6 = 2.86083e−03, A8 = 8.24444e−04
The twelfth surface K = 0.756, A4 = −3.58875e−03, A6 = 7.72697e−04, A8 = −1.41169e−05
The thirteenth surface K = −5.000, A4 = −5.33300e−03, A6 = 7.14335e−04, A8 = 2.85829e−05

Various data
Zoom ratio: 2.862

|  | Wide angle end | Middle | Telephoto end | Wide angle end | Middle | Telephoto end |
|---|---|---|---|---|---|---|
|  |  |  |  | (focusing on a close range) | | |
| Focal length | 4.156 | 6.693 | 11.893 | | | |
| F No. | 3.200 | 4.396 | 5.200 | | | |
| Angle of view 2ω | 77.136 | 47.218 | 26.480 | | | |
| Image height | 2.900 | 2.900 | 2.900 | | | |
| BF | 1.911 | 1.911 | 1.911 | | | |
| Lens total length | 15.864 | 15.864 | 15.864 | | | |
| (Distance from an object point) | ∞ | ∞ | ∞ | 100.00 | 500.00 | 800.00 |
| D2 | 3.202 | 0.703 | 0.327 | 2.875 | 0.774 | 0.401 |
| D4 | 3.820 | 3.980 | 0.909 | 3.675 | 3.824 | 0.787 |
| D11 | 0.909 | 3.247 | 6.694 | 1.381 | 3.333 | 6.742 |
| Stop diameter | 1.080 | 1.080 | 1.292 | | | |
| (Entrance pupil position) | 4.327 | 3.912 | 1.855 | | | |
| (Exit pupil position) | −4.270 | −9.011 | −23.780 | | | |
| (The position of the front side principle point) | 5.704 | 6.491 | 8.219 | | | |
| (The position of the rear side principle point) | −3.721 | −6.324 | −11.604 | | | |

| Lens | The first surface of lens | Focal length of lens |
|---|---|---|
| L1 | 1 | −6.772 |
| L2 | 3 | 14.977 |
| L31 | 6 | 3.111 |
| L32 | 8 | −3.349 |
| L33 | 10 | 30.688 |
| L4 | 12 | 13.872 |

Zoom lens group data

| Group | The first surface of lens group | Focal length of lens group | Composition length of lens group | The position of the front side principle point | The position of the rear side principle point |
|---|---|---|---|---|---|
| G1 | 1 | −6.772 | 0.550 | 0.333 | −0.025 |
| G2 | 3 | 14.977 | 0.763 | −0.544 | −0.975 |
| G3 | 5 | 6.085 | 3.146 | −2.433 | −3.367 |
| G4 | 12 | 13.872 | 1.563 | 0.352 | −0.620 |

Magnification of lens group

|  | Wide angle end | Middle | Telephoto end | Wide angle end | Middle | Telephoto end |
|---|---|---|---|---|---|---|
|  |  |  |  | (focusing on a close range) | | |
| G1 | 0.000 | 0.000 | 0.000 | 0.063 | 0.013 | 0.008 |
| G2 | 2.712 | 1.867 | 1.784 | 2.386 | 1.863 | 1.787 |
| G3 | −0.278 | −0.646 | −1.193 | −0.360 | −0.661 | −1.208 |
| G4 | 0.815 | 0.820 | 0.826 | 0.814 | 0.819 | 0.823 |

Numerical embodiment 4

Surface data
Unit: mm

| Surface No. | r | d | nd | vd | Effective diameter |
|---|---|---|---|---|---|
| Object plane | ∞ | ∞ | | | |
| 1* | 24.9824 | 0.4982 | 1.90270 | 31.00 | 2.680 |
| 2* | 2.6593 | 0.5867 | | | 2.159 |
| 3* | 3.7965 | 0.6883 | 2.10223 | 16.77 | 2.159 |
| 4* | 5.9430 | D4 | | | 2.120 |
| 5* | 2.1596 | 0.9525 | 1.59201 | 67.02 | 1.435 |
| 6* | −48.6138 | 0.2000 | | | 1.322 |
| 7 (Stop) | ∞ | 0.0000 | | | (Variable) |
| 8* | 6.5103 | 0.6801 | 1.85135 | 40.10 | 1.201 |
| 9 | −7.3491 | 0.5708 | 1.82114 | 24.06 | 1.134 |
| 10* | 5.5872 | D10 | | | 1.015 |
| 11* | −4.6844 | 0.4504 | 1.77377 | 47.17 | 1.212 |
| 12* | 100.7637 | D12 | | | 1.437 |
| 13* | −13.7627 | 0.8839 | 1.90270 | 31.00 | 2.801 |
| 14* | −5.1236 | 0.2065 | | | 2.866 |
| 15 | ∞ | 0.3000 | 1.51633 | 64.14 | 2.928 |
| 16 | ∞ | 0.4000 | | | 2.946 |
| Image plane | ∞ | | | | |

Aspherical surface data

The first surface

K = −397.963, A4 = 6.59381e−03, A6 = −1.17236e−03,
A8 = 5.02427e−05
The second surface K = 0.088, A4 = −6.56207e−03, A6 = 3.84046e−03, A8 = −7.40701e−04
The third surface K = −7.634, A4 = −3.69106e−03, A6 = 1.79132e−03,
A8 = −1.86618e−04
The fourth surface K = −23.212, A4 = −5.62260e−03, A6 = 5.95203e−04,
A8 = −6.89594e−05
The fifth surface K = −0.956, A4 = 2.77532e−03, A6 = 7.11842e−04, A8 = 9.68824e−05

Numerical embodiment 4

The sixth surface

K = 218.608, A4 = −1.28903e−02, A6 = 7.79247e−03, A8 = −1.56315e−03
The eighth surface K = 0.801, A4 = −2.76409e−03, A6 = 7.97038e−03, A8 = −2.01303e−03
The tenth surface K = −38.926, A4 = 6.44034e−02, A6 = −6.22281e−03, A8 = 1.13101e−02
The eleventh surface K = −3.245, A4 = 4.36822e−03, A6 = −5.62552e−03, A8 = −2.76127e−03
The twelfth surface K = −575054.125, A4 = 1.94775e−02, A6 = −8.94047e−03, A8 = 3.15805e−04
The thirteenth surface K = −0.780, A4 = 4.95196e−03, A6 = −1.14942e−03, A8 = 9.43150e−05
The fourteenth surface K = −2.819, A4 = 1.17394e−02, A6 = −2.72948e−03, A8 = 1.79738e−04

Various data
Zoom ratio: 2.849

|  | Wide angle end | Middle | Telephoto end | Wide angle end | Middle | Telephoto end (focusing on a close range) |
|---|---|---|---|---|---|---|
| Focal length | 3.754 | 6.019 | 10.695 | | | |
| F No. | 3.200 | 4.367 | 5.200 | | | |
| Angle of view 2ω | 82.905 | 51.227 | 29.493 | | | |
| Image height | 2.900 | 2.900 | 2.900 | | | |
| BF | 0.804 | 0.804 | 0.804 | | | |
| Lens total length | 12.898 | 12.898 | 12.898 | | | |
| (Distance from an object point) | ∞ | ∞ | ∞ | 100.00 | 500.00 | 800.00 |
| D4 | 3.931 | 2.207 | 0.200 | 3.137 | 2.256 | 0.534 |
| D10 | 1.026 | 0.876 | 1.749 | 0.968 | 0.895 | 1.511 |
| D12 | 1.626 | 3.500 | 4.633 | 2.478 | 3.432 | 4.537 |
| Stop diameter | 0.983 | 0.983 | 1.210 | | | |
| (Entrance pupil position) | 3.137 | 2.642 | 1.790 | | | |
| (Exit pupil position) | −6.729 | −16.061 | −45.914 | | | |
| (The position of the front side principle point) | 5.032 | 6.511 | 10.036 | | | |
| (The position of the rear side principle point) | −3.308 | −5.634 | −10.298 | | | |

| Lens | The first surface of lens | Focal length of lens |
|---|---|---|
| L11 | 1 | −3.332 |
| L12 | 3 | 8.164 |
| L21 | 5 | 3.517 |
| L22 | 8 | 4.149 |
| L23 | 9 | −3.790 |
| L3 | 11 | −5.774 |
| L4 | 13 | 8.624 |

Zoom lens group data

| Group | The first surface of lens group | Focal length of lens group | Composition length of lens group | The position of the front side principle point | The position of the rear side principle point |
|---|---|---|---|---|---|
| G1 | 1 | −5.700 | 1.773 | 0.255 | −0.878 |
| G2 | 5 | 3.194 | 2.403 | −0.286 | −1.548 |
| G3 | 11 | −5.774 | 0.450 | 0.011 | −0.242 |
| G4 | 13 | 8.624 | 0.884 | 0.706 | 0.263 |

Magnification of lens group

|  | Wide angle end | Middle | Telephoto end | Wide angle end | Middle | Telephoto end (focusing on a close range) |
|---|---|---|---|---|---|---|
| G1 | 0.000 | 0.000 | 0.000 | 0.054 | 0.011 | 0.007 |
| G2 | −0.454 | −0.602 | −0.969 | −0.539 | −0.604 | −0.889 |
| G3 | 1.555 | 1.867 | 2.066 | 1.705 | 1.859 | 2.055 |
| G4 | 0.932 | 0.939 | 0.937 | 0.930 | 0.937 | 0.934 |

Numerical embodiment 5

Surface data
Unit: mm

| Surface No. | r | d | nd | vd | Effective diameter |
|---|---|---|---|---|---|
| Object plane | ∞ | ∞ | | | |
| 1* | 32.5181 | 0.4000 | 1.90270 | 31.00 | 2.662 |
| 2* | 2.6859 | 0.5841 | | | 2.171 |
| 3* | 3.9263 | 0.7023 | 2.10223 | 16.77 | 2.172 |
| 4* | 6.3251 | D4 | | | 2.123 |
| 5* | 2.3656 | 0.8877 | 1.59201 | 67.02 | 1.442 |
| 6* | −19.9615 | 0.2000 | | | 1.349 |
| 7 (Stop) | ∞ | 0.0000 | | | (Variable) |
| 8* | 5.6753 | 0.6799 | 1.85135 | 40.10 | 1.257 |
| 9 | −8.0095 | 0.5194 | 1.82114 | 24.06 | 1.184 |
| 10* | 5.2122 | D10 | | | 1.039 |
| 11* | −4.7550 | 0.4439 | 1.77377 | 47.17 | 1.186 |
| 12* | 241.8954 | D12 | | | 1.373 |
| 13* | −17.7526 | 1.0020 | 1.58347 | 30.25 | 2.836 |
| 14* | −5.0153 | 0.2387 | | | 2.891 |
| 15 | ∞ | 0.3000 | 1.51633 | 64.14 | 2.940 |
| 16 | ∞ | 0.4000 | | | 2.952 |
| Image plane | ∞ | | | | |

Aspherical surface data

The first surface

K = −204.602, A4 = 6.38593e−03, A6 = −1.31082e−03, A8 = 6.42265e−05
The second surface K = 0.140, A4 = −4.48908e−03, A6 = 3.35561e−03, A8 = −7.34479e−04
The third surface K = −8.010, A4 = −3.58577e−03, A6 = 2.02086e−03, A8 = −1.85601e−04
The fourth surface K = −27.131, A4 = −5.26129e−03, A6 = 7.06800e−04, A8 = −5.83212e−05

Numerical embodiment 5

The fifth surface

K = −1.224, A4 = −2.34964e−04, A6 = 1.88499e−08, A8 = 3.10798e−04
The sixth surface K = −178.856, A4 = −8.86247e−03, A6 = 7.81377e−03,
A8 = −1.53400e−03
The eighth surface K = 6.120, A4 = 6.42116e−03, A6 = 8.89900e−03, A8 = −2.09052e−03
The tenth surface K = −38.050, A4 = 7.18749e−02, A6 = −5.04696e−03,
A8 = 1.13516e−02
The eleventh surface K = −3.616, A4 = 4.31319e−03, A6 = −1.04263e−03,
A8 = −3.53360e−03
The twelfth surface K = −1640587.993, A4 = 1.96904e−02, A6 = −4.81382e−03,
A8 = −6.24215e−04
The thirteenth surface K = −5.864, A4 = 5.12076e−03, A6 = −1.13861e−03, A8 = 9.49549e−05
The fourteenth surface K = −2.353, A4 = 1.15022e−02, A6 = −2.74683e−03, A8 = 1.78418e−04

Various data
Zoom ratio: 2.850

|  | Wide angle end | Middle | Telephoto end | Wide angle end | Middle | Telephoto end (focusing on a close range) |
|---|---|---|---|---|---|---|
| Focal length | 3.754 | 6.038 | 10.699 | | | |
| F No. | 3.200 | 4.349 | 5.200 | | | |
| Angle of view 2ω | 82.899 | 51.642 | 29.898 | | | |
| Image height | 2.900 | 2.900 | 2.900 | | | |
| BF | 0.837 | 0.837 | 0.837 | | | |
| Lens total length | 12.898 | 12.898 | 12.898 | | | |
| (Distance from an object point) | ∞ | ∞ | ∞ | 100.00 | 500.00 | 800.00 |
| D4 | 3.975 | 2.194 | 0.200 | 3.198 | 2.281 | 0.556 |
| D10 | 1.006 | 0.888 | 1.793 | 0.960 | 0.900 | 1.528 |
| D12 | 1.661 | 3.560 | 4.649 | 2.484 | 3.461 | 4.557 |
| Stop diameter | 1.033 | 1.033 | 1.255 | | | |
| (Entrance pupil position) | 3.012 | 2.510 | 1.668 | | | |
| (Exit pupil position) | −5.919 | −11.530 | −20.540 | | | |
| (The position of the front side principle point) | 4.693 | 5.589 | 7.011 | | | |
| (The position of the rear side principle point) | −3.312 | −5.686 | −10.305 | | | |

| Lens | The first surface of lens | Focal length of lens |
|---|---|---|
| L11 | 1 | −3.264 |
| L12 | 3 | 8.143 |
| L21 | 5 | 3.626 |
| L22 | 8 | 3.993 |
| L23 | 9 | −3.778 |
| L3 | 11 | −6.022 |
| L4 | 13 | 11.643 |

Zoom lens group data

| Group | The first surface of lens group | Focal length of lens group | Composition length of lens group | The position of the front side principle point | The position of the rear side principle point |
|---|---|---|---|---|---|
| G1 | 1 | −5.552 | 1.686 | 0.169 | −0.919 |
| G2 | 5 | 3.194 | 2.287 | −0.238 | −1.451 |
| G3 | 11 | −6.022 | 0.444 | 0.005 | −0.245 |
| G4 | 13 | 11.643 | 1.002 | 0.857 | 0.242 |

Magnification of lens group

| | Wide angle end | Middle | Telephoto end | Wide angle end | Middle | Telephoto end (focusing on a lose range) |
|---|---|---|---|---|---|---|
| G1 | 0.000 | 0.000 | 0.000 | 0.053 | 0.011 | 0.007 |
| G2 | −0.455 | −0.610 | −0.986 | −0.537 | −0.607 | −0.898 |
| G3 | 1.571 | 1.870 | 2.058 | 1.707 | 1.857 | 2.046 |
| G4 | 0.945 | 0.953 | 0.949 | 0.945 | 0.951 | 0.948 |

Numerical embodiment 6

Surface data
Unit: mm

| Surface No. | r | d | nd | vd | Effective diameter |
|---|---|---|---|---|---|
| Object plane | ∞ | ∞ | | | |
| 1* | −20.7452 | 0.4261 | 1.76802 | 49.24 | 2.660 |
| 2* | 3.1798 | 0.5199 | 1.63387 | 23.38 | 2.348 |
| 3* | 11.5413 | D3 | | | 2.338 |
| 4* | 2.5653 | 0.7836 | 1.69350 | 53.21 | 1.425 |
| 5* | −9.5581 | 0.1627 | | | 1.304 |
| 6 (Stop) | ∞ | 0.1056 | | | (Variable) |
| 7* | 6.3829 | 0.6523 | 1.77377 | 47.17 | 1.173 |
| 8 | −16.9084 | 0.3267 | 1.84666 | 23.78 | 1.048 |
| 9* | 2.6017 | D9 | | | 0.900 |
| 10* | −1663.5639 | 0.3688 | 1.58913 | 61.14 | 1.798 |
| 11* | 9.0733 | D11 | | | 1.796 |
| 12* | −6.3464 | 0.7403 | 1.82114 | 24.06 | 2.400 |
| 13* | −4.0025 | 2.2296 | | | 2.510 |
| 14 | ∞ | 0.3796 | 1.51633 | 64.14 | 2.909 |
| 15 | ∞ | 0.4000 | | | 2.942 |
| Image plane | ∞ | | | | |

Aspherical surface data

The first surface

K = −375.930, A4 = −1.15480e−02, A6 = 2.04009e−03,
A8 = −2.03463e−04, A10 = 9.13064e−06
The second surface K = −4.767
The third surface K = 19.716, A4 = −8.39462e−03, A6 = 8.74090e−04,
A8 = −3.16644e−05, A10 = −9.08607e−06

Numerical embodiment 6

The fourth surface

K = −5.335, A4 = 3.95944e−02, A6 = −2.26682e−04, A8 = 1.21738e−03, A10 = −2.20735e−05
The fifth surface K = −1.433, A4 = 5.93078e−02, A6 = −5.72481e−03, A8 = −1.00605e−05, A10 = −4.23420e−04
The seventh surface K = 0.827, A4 = 7.27634e−02, A6 = −2.04547e−02, A8 = 2.74787e−03, A10 = −2.76359e−03
The ninth surface K = 3.493, A4 = 2.51814e−02, A6 = −9.44244e−04, A8 = −9.17287e−03, A10 = −9.81182e−03
The tenth surface K = 0.000, A4 = 2.01378e−02, A6 = 2.42834e−03, A8 = −6.61110e−04, A10 = −3.37042e−05
The eleventh surface K = 1.229, A4 = 2.32836e−02, A6 = 1.19434e−03, A8 = −5.32506e−05, A10 = −1.30308e−04
The twelfth surface K = −0.983, A4 = 3.30959e−03, A6 = 1.23354e−04
The thirteenth surface K = −1.651, A4 = −8.10707e−05, A6 = −7.42911e−05, A8 = 1.46926e−05

Various data
Zoom ratio: 2.849

|  | Wide angle end | Middle | Telephoto end | Wide angle end | Middle | Telephoto end (focusing on a close range) |
|---|---|---|---|---|---|---|
| Focal length | 4.521 | 7.640 | 12.880 | | | |
| F No. | 3.757 | 4.702 | 5.248 | | | |
| Angle of view 2ω | 70.567 | 43.949 | 24.572 | | | |
| Image height | 2.900 | 2.900 | 2.900 | | | |
| BF | 2.880 | 2.880 | 2.880 | | | |
| Lens total length | 13.374 | 13.371 | 13.371 | | | |
| (Distance from an object point) | ∞ | ∞ | ∞ | 100.00 | 500.00 | 800.00 |
| D3 | 4.604 | 2.224 | 0.151 | 3.959 | 2.507 | 0.265 |
| D9 | 0.557 | 0.550 | 4.157 | 0.781 | 0.549 | 4.037 |
| D11 | 1.247 | 3.631 | 2.097 | 1.665 | 3.348 | 2.102 |
| Stop diameter | 0.900 | 1.000 | 1.250 | | | |
| (Entrance pupil position) | 3.479 | 2.544 | 1.301 | | | |
| (Exit pupil position) | −4.272 | −11.074 | −15.850 | | | |
| (The position of the front side principle point) | 5.143 | 6.001 | 5.324 | | | |
| (The position of the rear side principle point) | −4.121 | −7.240 | −12.480 | | | |

| Lens | The first surface of lens | Focal length of lens |
|---|---|---|
| L11 | 1 | −3.562 |
| L12 | 2 | 6.761 |
| L21 | 4 | 2.996 |
| L22 | 7 | 6.063 |
| L23 | 8 | −2.643 |
| L3 | 10 | −15.316 |
| L4 | 12 | 11.553 |

Zoom lens group data

| Group | The first surface of lens group | Focal length of lens group | Composition length of lens group | The position of the front side principle point | The position of the rear side principle point |
|---|---|---|---|---|---|
| G1 | 1 | −7.332 | 0.946 | 0.301 | −0.251 |
| G2 | 4 | 4.054 | 2.031 | −1.113 | −1.816 |
| G3 | 10 | −15.316 | 0.369 | 0.231 | −0.001 |
| G4 | 12 | 11.553 | 3.349 | 0.963 | −1.872 |

Magnification of lens group

|  | Wide angle end | Middle | Telephoto end | Wide angle end | Middle | Telephoto end (focusing on a close range) |
|---|---|---|---|---|---|---|
| G1 | 0.000 | 0.000 | 0.000 | 0.068 | 0.014 | 0.009 |
| G2 | −0.578 | −0.874 | −1.579 | −0.690 | −0.842 | −1.551 |
| G3 | 1.329 | 1.485 | 1.385 | 1.356 | 1.466 | 1.385 |
| G4 | 0.803 | 0.803 | 0.803 | 0.803 | 0.803 | 0.803 |

Numerical embodiment 7

Surface data
Unit: mm

| Surface No. | r | d | nd | vd | Effective diameter |
|---|---|---|---|---|---|
| Object plane | ∞ | ∞ | | | |
| 1* | −11.1356 | 0.4975 | 1.76802 | 49.24 | 2.436 |
| 2* | 4.3635 | 0.2782 | 1.68086 | 20.03 | 2.161 |
| 3* | 13.0403 | D3 | | | 2.143 |
| 4* | 2.4354 | 1.1497 | 1.69350 | 53.21 | 1.500 |
| 5* | −10.2972 | 0.0965 | | | 1.338 |
| 6 (Stop) | ∞ | 0.1122 | | | (Variable) |
| 7* | 6.9467 | 0.6344 | 1.76802 | 49.24 | 1.209 |
| 8 | −10.0264 | 0.3871 | 1.84666 | 23.78 | 1.142 |
| 9* | 2.7369 | D9 | | | 1.053 |
| 10* | −1593.9529 | 0.4096 | 1.58913 | 61.14 | 1.938 |
| 11* | 7.2355 | D11 | | | 1.949 |
| 12* | −7.0449 | 1.0575 | 1.92286 | 20.88 | 2.686 |
| 13* | −3.9192 | 0.8750 | | | 2.866 |
| 14 | ∞ | 0.3796 | 1.51633 | 64.14 | 2.965 |
| 15 | ∞ | 0.4000 | | | 2.977 |
| Image plane | ∞ | | | | |

Aspherical surface data

The first surface

K = −43.263, A4 = −1.24712e−02, A6 = 1.73364e−03, A8 = −6.78483e−05
The second surface K = −13.143
The third surface K = 11.728, A4 = −8.61588e−03, A6 = 1.31833e−03, A8 = 3.44649e−05

Numerical embodiment 7

The fourth surface

K = −1.810, A4 = 1.47470e−02, A6 = 1.63827e−03, A8 = 1.52183e−04
The fifth surface K = 10.732, A4 = 1.76981e−02, A6 = −3.95829e−03, A8 = 3.18646e−04
The seventh surface K = −0.652, A4 = 6.62402e−03, A6 = −8.64488e−03,
A8 = −8.05063e−04
The ninth surface K = 3.404, A4 = −4.48263e−03, A6 = −5.81944e−03,
A8 = −5.86170e−03
The tenth surface K = 0.000, A4 = 6.85162e−03, A6 = 5.94218e−04
The eleventh surface K = 1.002, A4 = 8.32696e−03, A6 = 6.31067e−04, A8 = −4.05088e−05
The twelfth surface K = −4.931
The thirteenth surface K = −3.651, A4 = −2.91002e−03, A6 = −8.23036e−05,
A8 = −3.97711e−07

Various data
Zoom ratio: 2.846

|  | Wide angle end | Middle | Telephoto end |
|---|---|---|---|
| Focal length | 4.526 | 7.640 | 12.878 |
| F No. | 3.590 | 5.050 | 5.131 |
| Angle of view 2ω | 72.782 | 43.815 | 24.659 |
| Image height | 2.900 | 2.900 | 2.900 |
| BF | 1.525 | 1.525 | 1.525 |
| Lens total length | 12.867 | 12.873 | 12.875 |
| Distance from an object point | ∞ | ∞ | ∞ |
| D3 | 4.309 | 2.213 | 0.196 |
| D9 | 1.296 | 1.055 | 4.311 |
| D11 | 1.114 | 3.457 | 2.220 |
| Stop diameter | 0.900 | 0.900 | 1.250 |
| Entrance pupil position | 3.292 | 2.510 | 1.389 |
| Exit pupil position | −7.123 | −23.689 | −42.013 |
| The position of the front side principle point | 5.450 | 7.835 | 10.458 |
| The position of the rear side principle point | −4.122 | −7.242 | −12.481 |

| Lens | The first surface of lens | Focal length of lens |
|---|---|---|
| L11 | 1 | −4.026 |
| L12 | 2 | 9.508 |
| L21 | 4 | 2.949 |
| L22 | 7 | 5.431 |
| L23 | 8 | −2.505 |
| L3 | 10 | −12.225 |
| L4 | 12 | 8.235 |

Zoom lens group data

| Group | The first surface of lens group | Focal length of lens group | Composition length of lens group | The position of the front side principle point | The position of the rear side principle point |
|---|---|---|---|---|---|
| G1 | 1 | −6.977 | 0.776 | 0.202 | −0.239 |
| G2 | 4 | 3.819 | 2.380 | −1.106 | −1.918 |
| G3 | 10 | −12.225 | 0.410 | 0.257 | −0.001 |
| G4 | 12 | 8.235 | 2.312 | 1.066 | −0.532 |

Magnification of lens group

|  | Wide angle end | Middle | Telephoto end |
|---|---|---|---|
| G1 | 0.000 | 0.000 | 0.000 |
| G2 | −0.579 | −0.848 | −1.536 |
| G3 | 1.265 | 1.456 | 1.355 |
| G4 | 0.886 | 0.887 | 0.887 |

Numerical embodiment 8

Surface data
Unit: mm

| Surface No. | r | d | nd | vd | Effective diameter |
|---|---|---|---|---|---|
| Object plane | ∞ | ∞ |  |  |  |
| 1* | −5.6531 | 0.5000 | 1.58913 | 61.14 | 2.376 |
| 2 | 9.8000 | 0.2500 | 1.63494 | 23.22 | 2.159 |
| 3* | 16.8078 | D3 |  |  | 2.137 |
| 4* | 2.9908 | 0.9110 | 1.85135 | 40.10 | 1.500 |
| 5* | −31.7144 | 0.1000 |  |  | 1.355 |
| 6 (Stop) | ∞ | 0.1518 |  |  | (Variable) |
| 7* | 6.6515 | 0.7500 | 1.76802 | 49.24 | 1.268 |
| 8 | −4.5000 | 0.4000 | 1.84666 | 23.78 | 1.185 |
| 9* | 4.8113 | D9 |  |  | 1.058 |
| 10 | 44.8931 | 0.5000 | 1.81474 | 37.03 | 1.181 |
| 11* | 3.8464 | D11 |  |  | 1.268 |
| 12 | −32.1035 | 1.3000 | 1.82114 | 24.06 | 2.886 |
| 13* | −4.0000 | 0.4217 |  |  | 3.000 |
| 14 | ∞ | 0.3796 | 1.51633 | 64.14 | 2.961 |
| 15 | ∞ | 0.2900 |  |  | 2.957 |
| Image plane | ∞ |  |  |  |  |

Aspherical surface data

The first surface

K = −1.000, A4 = −3.19351e−03, A6 = 2.63420e−04, A8 = 1.16363e−05
The third surface K = −1.000, A4 = −2.77149e−03, A6 = 2.14794e−04, A8 = 5.18982e−05
The fourth surface K = −1.000, A4 = 1.88539e−03, A6 = 3.55638e−04
The fifth surface K = −1.000, A4 = 5.68662e−03, A6 = −7.24378e−04
The seventh surface K = 0.000, A4 = 1.78188e−02, A6 = −8.88828e−04
The ninth surface K = 11.588, A4 = 2.35797e−02, A6 = −1.00377e−04, A8 = 1.61425e−04
The eleventh surface K = 0.000, A4 = −1.32598e−03, A6 = 2.94203e−04, A8 = −3.40185e−04
The thirteenth surface K = −1.000, A4 = 5.47362e−03, A6 = −6.78501e−04, A8 = 2.75097e−05

Various data
Zoom ratio: 2.821

|  | Wide angle end | Middle | Telephoto end |
|---|---|---|---|
| Focal length | 4.570 | 7.640 | 12.890 |
| F No. | 3.137 | 4.383 | 5.181 |
| Angle of view 2ω | 72.832 | 41.710 | 24.978 |
| Image height | 2.900 | 2.900 | 2.900 |
| BF | 0.962 | 0.962 | 0.962 |

-continued

Numerical embodiment 8

| | | | |
|---|---|---|---|
| Lens total length | 12.871 | 12.871 | 12.871 |
| Distance from an object point | ∞ | ∞ | ∞ |
| D3 | 4.231 | 2.167 | 0.172 |
| D9 | 0.758 | 0.721 | 1.542 |
| D11 | 2.057 | 4.157 | 5.332 |
| Stop diameter | 1.100 | 1.100 | 1.300 |
| Entrance pupil position | 3.165 | 2.343 | 1.167 |
| Exit pupil position | −17.126 | 44.144 | 18.147 |
| The position of the front side principle point | 6.580 | 11.335 | 23.725 |
| The position of the rear side principle point | −4.280 | −7.350 | −12.600 |

| Lens | The first surface of lens | Focal length of lens |
|---|---|---|
| L11 | 1 | −6.013 |
| L12 | 2 | 36.513 |
| L21 | 4 | 3.249 |
| L22 | 7 | 3.600 |
| L23 | 8 | −2.693 |
| L3 | 10 | −5.192 |
| L4 | 12 | 5.451 |

Zoom lens group data

| Group | The first surface of lens group | Focal length of lens group | Composition length of lens group | The position of the front side principle point | The position of the rear side principle point |
|---|---|---|---|---|---|
| G1 | 1 | −7.196 | 0.750 | 0.116 | −0.345 |
| G2 | 4 | 3.400 | 2.313 | −0.522 | −1.599 |
| G3 | 10 | −5.192 | 0.500 | 0.303 | 0.026 |
| G4 | 12 | 5.451 | 2.101 | 0.799 | −0.573 |

Magnification of lens group

| | Wide angle end | Middle | Telephoto end |
|---|---|---|---|
| G1 | 0.000 | 0.000 | 0.000 |
| G2 | −0.433 | −0.588 | −0.897 |
| G3 | 1.742 | 2.147 | 2.373 |
| G4 | 0.842 | 0.842 | 0.842 |

Numerical embodiment 9

Surface data
Unit: mm

| Surface No. | r | d | nd | vd | Effective diameter |
|---|---|---|---|---|---|
| Object plane | ∞ | ∞ | | | |
| 1* | −19.3192 | 0.4988 | 1.76802 | 49.24 | 2.583 |
| 2* | 3.7522 | 0.4683 | 1.63387 | 23.38 | 2.307 |
| 3* | 11.3663 | D3 | | | 2.287 |
| 4* | 2.6413 | 0.8593 | 1.69350 | 53.21 | 1.473 |
| 5* | −9.2555 | 0.1569 | | | 1.381 |
| 6 (Stop) | ∞ | 0.1202 | | | (Variable) |
| 7* | 6.3775 | 0.6959 | 1.76802 | 49.24 | 1.175 |
| 8 | −17.7460 | 0.4046 | 1.84666 | 23.78 | 1.035 |
| 9* | 2.5760 | D9 | | | 0.900 |
| 10* | −2150.7307 | 0.4011 | 1.58913 | 61.14 | 1.778 |
| 11* | 8.3413 | D11 | | | 1.857 |
| 12* | −7.5498 | 0.9821 | 1.82114 | 24.06 | 2.555 |
| 13* | −4.0253 | D13 | | | 2.724 |
| 14 | ∞ | 0.3796 | 1.51633 | 64.14 | 2.944 |
| 15 | ∞ | 0.4000 | | | 2.966 |
| Image plane | ∞ | | | | |

Numerical embodiment 9

Aspherical surface data

The first surface

K = −55.536, A4 = −9.05980e−03, A6 = 1.14637e−03,
A8 = −5.51750e−05
The second surface K = −5.943
The third surface K = 3.375, A4 = −8.51272e−03, A6 = 1.43185e−03, A8 = −6.70214e−05
The fourth surface K = −2.992, A4 = 1.71186e−02, A6 = −1.00737e−03, A8 = 4.64173e−04
The fifth surface K = −0.989, A4 = 8.39214e−03, A6 = −8.19252e−04, A8 = 2.03175e−04
The seventh surface K = 0.788, A4 = 5.33856e−03, A6 = −1.80989e−03, A8 = −4.20069e−04
The ninth surface K = 1.499, A4 = 6.20768e−03, A6 = −5.64490e−04, A8 = −1.23795e−04
The tenth surface K = 958794.047, A4 = 1.75804e−03, A6 = 1.99109e−03,
A8 = −4.76253e−04
The eleventh surface K = −0.095, A4 = 3.52958e−03, A6 = 1.43329e−03, A8 = −3.48716e−04
The twelfth surface K = −0.216
The thirteenth surface K = −0.637, A4 = 4.61435e−04, A6 = −1.26973e−04,
A8 = −1.09864e−06

Various data
Zoom ratio: 2.838

| | Wide angle end | Middle | Telephoto end |
|---|---|---|---|
| Focal length | 4.538 | 7.640 | 12.880 |
| F No. | 3.339 | 4.651 | 5.209 |
| Angle of view 2ω | 72.624 | 42.356 | 24.646 |
| Image height | 2.900 | 2.900 | 2.900 |
| BF | 2.364 | 2.306 | 2.176 |
| Lens total length | 13.369 | 13.374 | 13.368 |
| Distance from an object point | ∞ | ∞ | ∞ |
| D3 | 4.526 | 2.251 | 0.195 |
| D9 | 0.863 | 0.766 | 4.061 |
| D11 | 1.028 | 3.465 | 2.347 |
| D13 | 1.714 | 1.655 | 1.526 |
| Stop diameter | 1.000 | 1.000 | 1.250 |
| Entrance pupil position | 3.512 | 2.608 | 1.385 |
| Exit pupil position | −5.255 | −15.770 | −27.703 |
| The position of the front side principle point | 5.348 | 7.018 | 8.713 |
| The position of the rear side principle point | −4.136 | −7.241 | −12.480 |

| Lens | The first surface of lens | Focal length of lens |
|---|---|---|
| L11 | 1 | −4.053 |
| L12 | 2 | 8.631 |
| L21 | 4 | 3.053 |
| L22 | 7 | 6.186 |
| L23 | 8 | −2.633 |
| L3 | 10 | −14.103 |
| L4 | 12 | 9.329 |

Numerical embodiment 9

Zoom lens group data

| Group | The first surface of lens group | Focal length of lens group | Composition length of lens group | The position of the front side principle point | The position of the rear side principle point |
|---|---|---|---|---|---|
| G1 | 1 | −7.490 | 0.967 | 0.314 | −0.247 |
| G2 | 4 | 4.036 | 2.237 | −1.225 | −1.943 |
| G3 | 10 | −14.103 | 0.401 | 0.251 | −0.001 |
| G4 | 12 | 9.329 | 0.982 | 1.026 | 0.547 |

Magnification of lens group

| | Wide angle end | Middle | Telephoto end |
|---|---|---|---|
| G1 | 0.000 | 0.000 | 0.000 |
| G2 | −0.576 | −0.854 | −1.511 |
| G3 | 1.306 | 1.472 | 1.379 |
| G4 | 0.805 | 0.812 | 0.825 |
| G5 | 1.000 | 1.000 | 1.000 |

Numerical embodiment 10

Surface data
Unit: mm

| Surface No. | r | d | nd | vd | Effective diameter |
|---|---|---|---|---|---|
| Object plane | ∞ | ∞ | | | |
| 1* | −23.8081 | 0.4000 | 1.90270 | 31.00 | 1.764 |
| 2* | 2.2994 | 0.3419 | | | 1.467 |
| 3* | 2.8941 | 0.4964 | 2.10223 | 16.77 | 1.475 |
| 4* | 5.3026 | D4 | | | 1.420 |
| 5* | 2.1625 | 0.8676 | 1.76802 | 49.24 | 1.201 |
| 6* | −6.2445 | 0.1994 | | | 1.091 |
| 7 (Stop) | ∞ | 0.0000 | | | (Variable) |
| 8* | 6.5304 | 0.5563 | 1.49700 | 81.54 | 0.943 |
| 9 | −11.0440 | 0.4000 | 2.10223 | 16.77 | 0.864 |
| 10* | 6.7381 | D10 | | | 0.803 |
| 11* | −4.9986 | 0.4000 | 1.53071 | 55.67 | 0.915 |
| 12* | 6.1075 | D12 | | | 1.016 |
| 13* | −4.3703 | 0.6790 | 2.10223 | 16.77 | 2.225 |
| 14* | −2.6586 | 0.3758 | | | 2.242 |
| 15 | ∞ | 0.3000 | 1.51633 | 64.14 | 2.270 |
| 16 | ∞ | 0.3500 | | | 2.276 |
| Image plane | ∞ | | | | |

Aspherical surface data

The first surface

K = −10.000, A4 = 4.48967e−03, A6 = −2.58325e−03, A8 = 2.70892e−04
The second surface K = 0.528, A4 = −1.10216e−02, A6 = 6.00177e−03, A8 = −3.60751e−03
The third surface K = −1.683, A4 = −1.62024e−02, A6 = 1.06888e−02, A8 = −2.57278e−03
The fourth surface K = −10.000, A4 = −1.24411e−02, A6 = 6.03283e−03, A8 = −1.54408e−03
The fifth surface K = −0.330, A4 = −6.66268e−03, A6 = −7.36472e−04, A8 = 2.13320e−03
The sixth surface K = 3.642, A4 = 2.02813e−02, A6 = 5.86325e−03, A8 = −1.69631e−03
The eighth surface K = −7.584, A4 = 6.35851e−02, A6 = 3.93734e−02, A8 = −1.23472e−02
The tenth surface K = −10.000, A4 = 5.93583e−02, A6 = 2.28767e−02, A8 = 3.08419e−02
The eleventh surface K = −9.807, A4 = 2.12775e−02, A6 = −4.53840e−02, A8 = −2.43365e−03
The twelfth surface K = −0.858, A4 = 5.63611e−02, A6 = −5.02019e−02, A8 = 8.82711e−03
The thirteenth surface K = 1.905, A4 = 1.75077e−02, A6 = 1.42222e−03
The fourteenth surface K = 0.102, A4 = 2.50940e−02, A6 = −3.51630e−04, A8 = 3.23344e−04

Various data
Zoom ratio: 2.800

| | Wide angle end | Middle | Telephoto end |
|---|---|---|---|
| Focal length | 2.912 | 4.629 | 8.154 |
| F No. | 3.500 | 4.729 | 4.800 |
| Angle of view 2ω | 84.169 | 52.256 | 29.967 |
| Image height | 2.250 | 2.250 | 2.250 |
| BF# | 0.924 | 0.924 | 0.924 |
| Lens total length# | 9.998 | 9.998 | 9.998 |
| Distance from an object point | ∞ | ∞ | ∞ |
| D4 | 2.912 | 1.582 | 0.100 |
| D10 | 0.297 | 0.260 | 1.135 |
| D12 | 1.525 | 2.891 | 3.499 |
| Stop diameter | 0.651 | 0.651 | 0.954 |
| Entrance pupil position | 2.300 | 1.927 | 1.315 |
| Exit pupil position | −7.694 | −35.857 | 54.178 |
| The position of the front side principle point | 4.231 | 5.973 | 10.717 |
| The position of the rear side principle point | −2.532 | −4.291 | −7.820 |

| Lens | The first surface of lens | Focal length of lens |
|---|---|---|
| L11 | 1 | −2.306 |
| L12 | 3 | 5.217 |
| L21 | 5 | 2.190 |
| L22 | 8 | 8.345 |
| L23 | 9 | −3.752 |
| L3 | 11 | −5.116 |
| L4 | 13 | 5.098 |

Zoom lens group data

| Group | The first surface of lens group | Focal length of lens group | Composition length of lens group | The position of the front side principle point | The position of the rear side principle point |
|---|---|---|---|---|---|
| G1 | 1 | −4.287 | 1.238 | 0.105 | −0.663 |
| G2 | 5 | 2.446 | 2.023 | −0.336 | −1.340 |
| G3 | 11 | −5.116 | 0.400 | 0.116 | −0.142 |
| G4 | 13 | 5.098 | 0.679 | 0.683 | 0.415 |

Magnification of lens group

| | Wide angle end | Middle | Telephoto end |
|---|---|---|---|
| G1 | 0.000 | 0.000 | 0.000 |
| G2 | −0.482 | −0.652 | −1.079 |

-continued

Numerical embodiment 10

|  |  |  |  |
|---|---|---|---|
| G3 | 1.577 | 1.834 | 1.952 |
| G4 | 0.894 | 0.903 | 0.903 |

Numerical embodiment 11

Surface data
Unit: mm

| Surface No. | r | d | nd | vd | Effective diameter |
|---|---|---|---|---|---|
| Object plane | ∞ | ∞ | | | |
| 1* | 10.1679 | 0.4000 | 1.77377 | 47.17 | 1.804 |
| 2* | 1.8406 | 0.3689 | | | 1.449 |
| 3* | 2.4091 | 0.5290 | 1.70000 | 15.00 | 1.449 |
| 4* | 3.3582 | D4 | | | 1.400 |
| 5* | 2.0501 | 0.7343 | 1.76802 | 49.24 | 1.149 |
| 6* | −27.4479 | 0.1994 | | | 1.049 |
| 7 (Stop) | ∞ | 0.0000 | | | (Variable) |
| 8* | 4.4431 | 0.5434 | 1.49700 | 81.54 | 0.931 |
| 9 | −4.9922 | 0.4000 | 1.70000 | 15.00 | 0.888 |
| 10* | 27.3397 | D10 | | | 0.846 |
| 11* | −2.0238 | 0.4000 | 1.53071 | 55.67 | 0.868 |
| 12* | −24.7934 | D12 | | | 0.946 |
| 13* | −4.1717 | 0.8192 | 1.70000 | 15.00 | 2.139 |
| 14* | −2.5605 | 0.5342 | | | 2.223 |
| 15 | ∞ | 0.3000 | 1.51633 | 64.14 | 2.258 |
| 16 | ∞ | 0.3500 | | | 2.263 |
| Image plane | ∞ | | | | |

Aspherical surface data

The first surface

K = −2.968, A4 = 1.54293e−02, A6 = −8.65844e−03, A8 = 8.28284e−04
The second surface K = 0.002, A4 = 8.96390e−03, A6 = −1.08004e−03, A8 = −5.17338e−03
The third surface K = −0.982, A4 = −4.16429e−02, A6 = 1.42120e−03
The fourth surface K = −4.286, A4 = −4.16742e−02, A6 = −2.66315e−03,
A8 = 1.91253e−03
The fifth surface K = −0.227, A4 = 1.02517e−03, A6 = 8.62020e−04, A8 = 2.01632e−03
The sixth surface K = −9.886, A4 = −7.92533e−03, A6 = 1.68283e−02,
A8 = −4.56115e−03
The eighth surface K = −3.826, A4 = −2.05536e−02, A6 = 3.91404e−02,
A8 = −1.54510e−02
The tenth surface K = −9.474, A4 = 4.13517e−02, A6 = 1.51235e−02, A8 = 2.94491e−02
The eleventh surface K = −9.859, A4 = 6.25595e−02, A6 = −1.76258e−02,
A8 = −5.16373e−02
The twelfth surface K = −10.000, A4 = 2.13359e−01, A6 = −9.44745e−02,
A8 = 9.69920e−04
The thirteenth surface K = 2.062, A4 = 1.88493e−02, A6 = 1.42105e−03

-continued

Numerical embodiment 11

The fourteenth surface

K = 0.080, A4 = 2.24501e−02, A6 = −5.53882e−04, A8 = 3.18452e−04

Various data
Zoom ratio: 2.795

|  | Wide angle end | Middle | Telephoto end |
|---|---|---|---|
| Focal length | 2.917 | 4.633 | 8.154 |
| F No. | 3.500 | 4.662 | 4.800 |
| Angle of view 2ω | 84.108 | 52.711 | 30.750 |
| Image height | 2.250 | 2.250 | 2.250 |
| BF# | 1.082 | 1.082 | 1.082 |
| Lens total length# | 9.998 | 9.998 | 9.998 |
| Distance from an object point | ∞ | ∞ | ∞ |
| D4 | 2.873 | 1.548 | 0.100 |
| D10 | 0.240 | 0.227 | 0.840 |
| D12 | 1.408 | 2.746 | 3.581 |
| Stop diameter | 0.665 | 0.665 | 0.937 |
| Entrance pupil position | 2.457 | 2.069 | 1.428 |
| Exit pupil position | −5.371 | −11.293 | −24.106 |
| The position of the front side principle point | 4.062 | 4.966 | 6.940 |
| The position of the rear side principle point | −2.533 | −4.299 | −7.825 |

| Lens | The first surface of lens | Focal length of lens |
|---|---|---|
| L11 | 1 | −2.967 |
| L12 | 3 | 9.905 |
| L21 | 5 | 2.511 |
| L22 | 8 | 4.822 |
| L23 | 9 | −6.000 |
| L3 | 11 | −4.178 |
| L4 | 13 | 7.831 |

Zoom lens group data

| Group | The first surface of lens group | Focal length of lens group | Composition length of lens group | The position of the front side principle point | The position of the rear side principle point |
|---|---|---|---|---|---|
| G1 | 1 | −4.046 | 1.298 | 0.414 | −0.453 |
| G2 | 5 | 2.234 | 1.877 | 0.026 | −1.159 |
| G3 | 11 | −4.178 | 0.400 | −0.023 | −0.286 |
| G4 | 13 | 7.831 | 0.819 | 1.032 | 0.633 |

Magnification of lens group

|  | Wide angle end | Middle | Telephoto end |
|---|---|---|---|
| G1 | 0.000 | 0.000 | 0.000 |
| G2 | −0.433 | −0.582 | −0.935 |
| G3 | 1.776 | 2.083 | 2.281 |
| G4 | 0.938 | 0.945 | 0.945 |

Numerical embodiment 12

Surface data
Unit: mm

| Surface No. | r | d | nd | vd | Effective diameter |
|---|---|---|---|---|---|
| Object plane | ∞ | ∞ | | | |
| 1* | −20.6604 | 0.6681 | 1.69350 | 53.21 | 2.556 |
| 2* | 6.2554 | D2 | | | 2.275 |
| 3* | 2.8735 | 1.2776 | 1.77377 | 47.17 | 1.550 |

Numerical embodiment 12

| | | | | | |
|---|---|---|---|---|---|
| 4 | −41.3684 | 0.5180 | 1.79491 | 25.63 | 1.357 |
| 5* | 10.6571 | 0.5000 | | | 1.208 |
| 6 (Stop) | ∞ | 0.1965 | | | (Variable) |
| 7* | 7.5874 | 0.8263 | 1.76802 | 49.24 | 1.136 |
| 8* | −21.6754 | D8 | | | 1.217 |
| 9* | 279.5342 | 0.3790 | 1.82114 | 24.06 | 1.225 |
| 10* | 3.4792 | D10 | | | 1.229 |
| 11* | −7.1348 | 0.9360 | 1.79491 | 25.63 | 2.746 |
| 12* | −3.7927 | 1.3721 | | | 2.868 |
| 13 | ∞ | 0.4000 | 1.51633 | 64.14 | 2.972 |
| 14 | ∞ | 0.4000 | | | 2.983 |
| Image plane | ∞ | | | | |

Aspherical surface data

The first surface $K = -28.194, A4 = -9.53942e-03, A6 = 1.14164e-03, A8 = -5.01129e-05$ The second surface $K = -0.224, A4 = -9.75476e-03, A6 = 1.35826e-03, A8 = -4.78131e-05$ The third surface $K = 0.624, A4 = -1.58057e-03, A6 = -1.23052e-04, A8 = 7.62687e-06$ The fifth surface $K = 44.632, A4 = 5.76135e-04, A6 = 1.26800e-03, A8 = -7.09871e-05$ The seventh surface $K = -1.283, A4 = -2.54498e-02, A6 = -2.93083e-03, A8 = -1.21006e-03$ The eighth surface $K = 44.767, A4 = -2.16942e-02, A6 = -2.05558e-03, A8 = -1.25759e-05$ The ninth surface $K = -560206.977$ The tenth surface $K = -0.582, A4 = 7.46329e-03, A6 = 1.55863e-03, A8 = -8.04564e-04$ The eleventh surface $K = -4.214$ The twelfth surface $K = -0.006, A4 = 4.15000e-03, A6 = -2.49039e-05, A8 = -2.17406e-05, A10 = 2.21954e-06$

Numerical embodiment 12

Various data
Zoom ratio: 2.816

| | Wide angle end | Middle | Telephoto end |
|---|---|---|---|
| Focal length | 4.574 | 7.639 | 12.879 |
| F No. | 3.228 | 3.726 | 5.123 |
| Angle of view 2ω | 70.712 | 41.233 | 24.715 |
| Image height | 2.900 | 2.900 | 2.900 |
| BF | 2.036 | 2.036 | 2.036 |
| Lens total length | 13.864 | 13.864 | 13.864 |
| Distance from an object point | ∞ | ∞ | ∞ |
| D2 | 4.476 | 2.312 | 0.201 |
| D8 | 0.611 | 0.650 | 1.363 |
| D10 | 1.439 | 3.564 | 4.963 |
| Stop diameter | 0.900 | 1.100 | 1.100 |
| Entrance pupil position | 3.777 | 3.155 | 2.278 |
| Exit pupil position | −5.287 | −14.748 | −40.735 |
| The position of the front side principle point | 5.494 | 7.317 | 11.279 |
| The position of the rear side principle point | −4.174 | −7.239 | −12.479 |

| Lens | The first surface of lens | Focal length of lens |
|---|---|---|
| L1 | 1 | −6.854 |
| L21 | 3 | 3.517 |
| L22 | 4 | −10.614 |
| L23 | 7 | 7.409 |
| L3 | 9 | −4.293 |
| L4 | 11 | 9.062 |

Zoom lens group data

| Group | The first surface of lens group | Focal length of lens group | Composition length of lens group | The position of the front side principle point | The position of the rear side principle point |
|---|---|---|---|---|---|
| G1 | 1 | −6.854 | 0.668 | 0.300 | −0.091 |
| G2 | 3 | 3.459 | 3.318 | 0.621 | −1.898 |
| G3 | 9 | −4.293 | 0.379 | 0.211 | 0.003 |
| G4 | 11 | 9.062 | 2.708 | 0.990 | −1.109 |

Magnification of lens group

| | Wide angle end | Middle | Telephoto end |
|---|---|---|---|
| G1 | 0.000 | 0.000 | 0.000 |
| G2 | −0.403 | −0.539 | −0.803 |
| G3 | 1.987 | 2.482 | 2.808 |
| G4 | 0.833 | 0.833 | 0.833 |

Next, parameter values which the embodiment 1 (the numeral embodiment 1) to the embodiment 12 (the numeral embodiment 12) have in the conditions (1) to (22) are given. Parameter values which the embodiments 1 to 12 have in the respective conditions

| | Condition (1) | Condition (2) | Condition (3) | Condition (4) | Condition (5) | Condition (6) |
|---|---|---|---|---|---|---|
| Embodiment 1 | 24.06 | 0.08 | 0.90 | 0.50 | 0.48 | 1.98 |
| Embodiment 2 | 24.06 | 0.10 | 0.92 | 0.50 | 0.50 | 2.01 |
| Embodiment 3 | 23.89 | 0.87 | 0.96 | 0.87 | −3.63 | 2.34 |
| Embodiment 4 | 31.00 | 0.08 | 0.90 | 0.50 | 0.46 | 1.97 |
| Embodiment 5 | 30.25 | 0.04 | 0.88 | 0.50 | 0.56 | 1.91 |
| Embodiment 6 | 24.06 | 0.42 | 0.96 | 0.53 | 0.23 | 2.53 |
| Embodiment 7 | 20.88 | 0.43 | 0.91 | 0.50 | 0.29 | 2.41 |
| Embodiment 8 | 24.06 | 0.16 | 0.94 | 0.44 | 0.78 | 2.48 |
| Embodiment 9 | 24.06 | 0.42 | 0.98 | 0.53 | 0.30 | 2.58 |
| Embodiment 10 | 16.77 | −0.02 | 0.88 | 0.50 | 0.24 | 1.91 |

-continued

| | | | | | | |
|---|---|---|---|---|---|---|
| Embodiment 11 | 15.00 | −0.72 | 0.83 | 0.46 | 0.24 | 1.80 |
| Embodiment 12 | 25.63 | 0.31 | 0.89 | 0.45 | 0.31 | 2.36 |

| | Condition (7) | Condition (8) | Condition (9) | Condition (10) | Condition (11) |
|---|---|---|---|---|---|
| Embodiment 1 | 1.10 | 24.06 | 2.47 | 42.96 | 0.50 |
| Embodiment 2 | 1.10 | 24.06 | 2.46 | 42.96 | 0.50 |
| Embodiment 3 | 2.10 | 23.89 | — | — | 0.87 |
| Embodiment 4 | 1.10 | 31.00 | 2.29 | 42.96 | 0.50 |
| Embodiment 5 | 1.10 | 30.25 | 2.34 | 42.96 | 0.50 |
| Embodiment 6 | 1.40 | 24.06 | 2.30 | 29.43 | 0.53 |
| Embodiment 7 | 1.32 | 20.88 | 2.55 | 29.43 | 0.50 |
| Embodiment 8 | 1.17 | 24.06 | 2.70 | 25.46 | 0.44 |
| Embodiment 9 | 1.39 | 24.06 | 2.29 | 29.43 | 0.53 |
| Embodiment 10 | 1.09 | 16.77 | 2.69 | 64.77 | 0.50 |
| Embodiment 11 | 0.99 | 15.00 | 3.00 | 66.54 | 0.46 |
| Embodiment 12 | 1.19 | 25.63 | 2.67 | 23.61 | 0.45 |

| | Condition (12) | Condition (13) | Condition (14) |
|---|---|---|---|
| Embodiment 1 | 0.48 | 0.21 | 1.10 |
| Embodiment 2 | 0.50 | 0.21 | 1.10 |
| Embodiment 3 | −3.63 | — | 2.10 |
| Embodiment 4 | 0.46 | −0.13 | 1.10 |
| Embodiment 5 | 0.56 | −0.08 | 1.10 |
| Embodiment 6 | 0.23 | −0.09 | 1.40 |
| Embodiment 7 | 0.29 | 0.13 | 1.32 |
| Embodiment 8 | 0.78 | 0.05 | 1.17 |
| Embodiment 9 | 0.30 | −0.10 | 1.39 |
| Embodiment 10 | 0.24 | 0.61 | 1.09 |
| Embodiment 11 | 0.24 | 0.81 | 0.99 |
| Embodiment 12 | 0.31 | −0.02 | 1.19 |

| | Condition (15) | | Condition (16) | | | | |
|---|---|---|---|---|---|---|---|
| | L11 | L12 | L11 | L12 | Condition (17) | Condition (18) | Condition (19) |
| Embodiment 1 | 1.901 | 2.102 | 31.00 | 16.77 | 14.23 | 0.09 | −0.152 |
| Embodiment 2 | 1.851 | 1.821 | 40.10 | 24.06 | 16.04 | 0.08 | −0.101 |
| Embodiment 10 | 1.903 | 2.102 | 31.00 | 16.77 | 14.23 | 0.07 | −0.115 |

| | Condition (20) | Condition (21) | Condition (22) |
|---|---|---|---|
| Embodiment 1 | −0.43 | 0.84 | 24.06 |
| Embodiment 2 | −0.44 | 0.85 | 24.06 |
| Embodiment 10 | −0.44 | 1.21 | 16.77 |

The variable power optical systems according to the embodiments of the present invention as described above can be used for image pickup apparatuses, such as digital camera and video camera, in which shooting is performed by forming on an imaging sensor like CCD an object image that is formed by the variable power optical systems. A concrete example for the image pickup apparatuses is given below.

Figure 43:
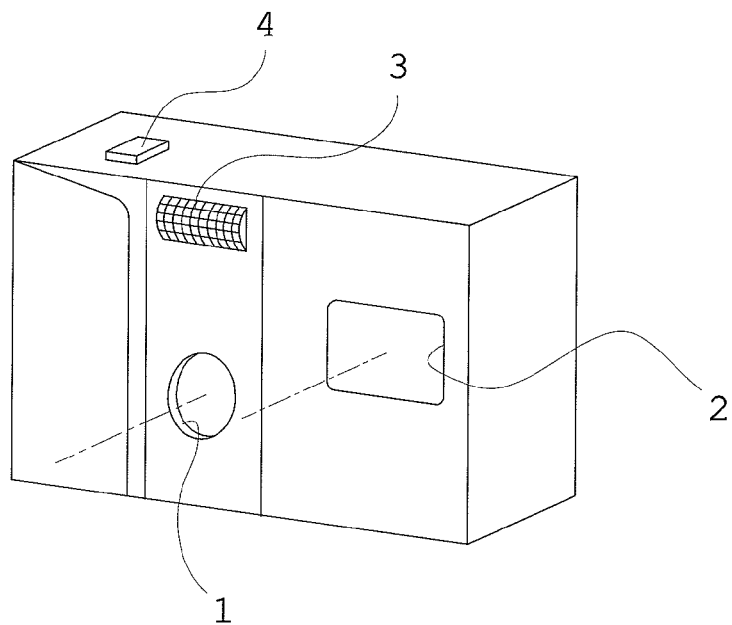
FIG. 43 is a front perspective view showing the appearance of a digital camera into which a variable power optical system of one of the embodiments according to the present invention is incorporated.
Figure 44:
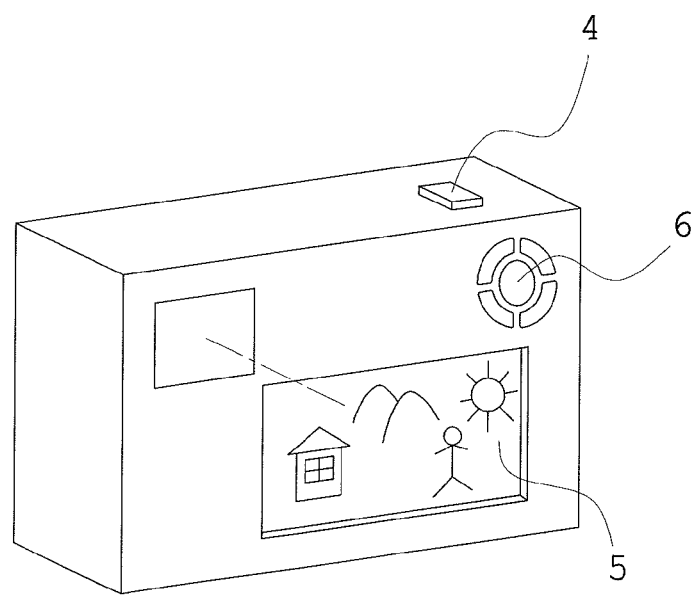
FIG. 44 is a rear perspective view showing the appearance of the digital camera which is shown in FIG. 43.
Figure 45:
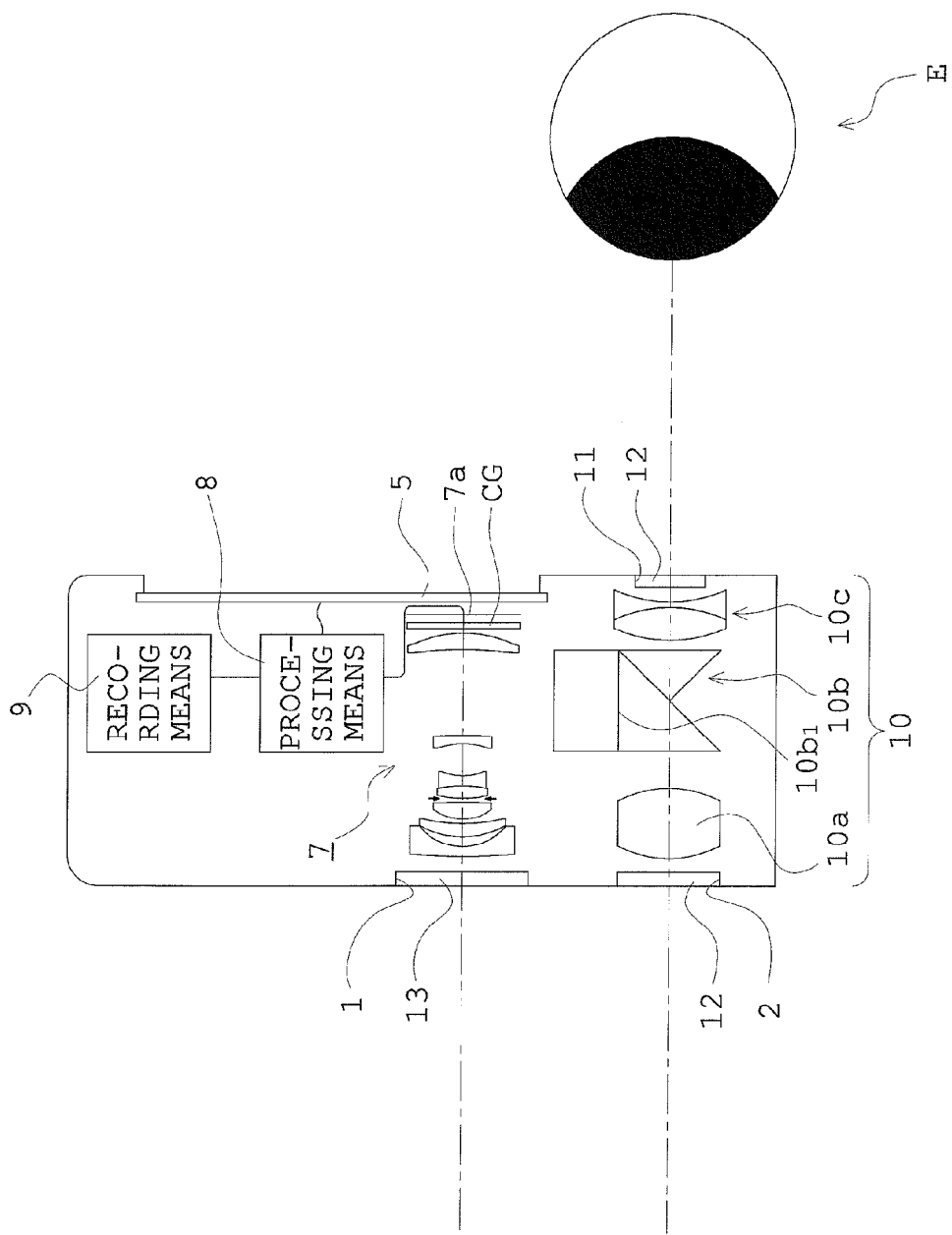
FIG. 45 is a perspective view schematically showing the constitution of the digital camera which is shown in FIG. 43.

FIGS. 43, 44, and 45 are conceptual views showing the constitution of a digital camera including a variable power optical system of one of the embodiments of the present invention, FIG. 43 is a front perspective view showing the appearance of a digital camera, FIG. 44 is a rear perspective view showing the appearance of the digital camera which is shown in FIG. 43, and FIG. 45 is a perspective view schematically showing the constitution of the digital camera.

The digital camera is provided with an opening section 1 for shooting, a finder opening section 2, and a flash-firing section 3 on the front side of the digital camera. Also, the digital camera is provided with a shutter button 4 on the top of the digital camera. Also, the digital camera is provided with a liquid crystal display monitor 5 and an information input section 6 on the rear side of the digital camera. In addition, the digital camera is provided with a variable power optical system 7 that is formed in the same manner as in the embodiment 1, 12, or 23 for example, a processing means 8, a recording means 9, and a finder optical system 10 inside the digital camera. Also, cover members 12 are arranged in the finder opening section 2 and in an opening section 11, the opening section 11 being located on the exit side of the finder optical system 10 and being provided on the rear side of the digital camera. In addition, a cover member 13 is also arranged in the opening section 1 for shooting.

When the shutter button 4 which is arranged on the top of the digital camera is pressed, shooting is performed through the variable power optical system 7 in response to the pressing of the shutter button 4. An object image is formed on the image forming plane of a CCD 7a that is a solid-state imaging sensor, through the variable power optical system 7 and the cover glass CG. The image information on the object image which is formed on the image forming plane of the CCD 7a is recorded on the recording means 9 through the processing means 8. Also, recorded image information can be taken through the processing means 8, and the image information can be also displayed as an electronic image on the liquid crystal display monitor 5 which is provided on the rear side of the camera.

Also, the finder optical system 10 is composed of a finder objective optical system 10a, an erecting prism 10b, and an eyepiece optical system 10c. Light from an object which enters through the finder opening section 2 is led to the erecting prism 10b that is a member for erecting an image, by the finder objective optical system 10a, and an object image is formed as an erect image in the view finder frame $10b_1$, and, afterward, the object image is led to an eye E of an observer by the eyepiece optical system 10c.

Digital cameras which are formed in such a manner secure good performances while it is possible to achieve downsizing of the digital cameras, because the variable power optical system 7 has a high magnification ratio and is small.

What is claimed is:

1. A variable power optical system comprising, in order from the object side, a first lens group with negative refractive power, a second lens group with positive refractive power, a third lens group with negative refractive power, and a fourth lens group with positive refractive power, wherein the second lens group comprises at least one positive lens and a negative lens, the fourth lens group comprises a positive lens, and the variable power optical system satisfies the following conditions:

$$10 \leq Vd4g \leq 45$$

$$2.2 \leq |\alpha/f1| + (\alpha/f2) - 0.026 \times Vd4g \leq 5.0$$

$$10 \leq Vd\max - Vd\min \leq 80$$

where $\alpha = (FLw \times FLt)^{1/2}$, FLw denotes the focal length of the whole of the variable power optical system in the wide angle end position, FLt denotes the focal length of the whole of the variable power optical system in the telephoto end position, f1 denotes the focal length of the first lens group, f2 denotes the focal length of the second lens group, Vd4g denotes the Abbe' Number of the positive lens of the fourth lens group with respect to the d line, Vdmax denotes the Abbe's Number of a glass material having the lowest dispersion characteristic of those of glass materials which are used for lenses of the second lens group, with respect to the d line, and Vdmin denotes the Abbe's Number of a glass material having the highest dispersion characteristic of those of glass materials which are used for lenses of the second lens group, with respect to the d line.

2. A variable power optical system according to claim 1, wherein the following condition is satisfied:

$$0.45 \leq |f1|/(FLw \times FLt)^{1/2} \leq 1.60$$

where f1 denotes the focal length of the first lens group, FLw denotes the focal length of the whole of the variable power optical system in the wide angle end position, and FLt denotes the focal length of the whole of the variable power optical system in the telephoto end position.

3. A variable power optical system according to claim 1, wherein the following condition is satisfied:

$$0.30 \leq f2/(FLw \times FLt)^{1/2} \leq 1.10$$

where f2 denotes the focal length of the second lens group, FLw denotes the focal length of the whole of the variable power optical system in the wide angle end position, and FLt denotes the focal length of the whole of the variable power optical system in the telephoto end position.

4. A variable power optical system according to claim 1, wherein the second lens group comprises a first lens element with positive refractive power, a second lens element, and a third lens element in that order from the object side, the first lens element has a convex shape on the object side, and the following condition is satisfied:

$$-1.0 < (R2a - R2b)/(R2a + R2b) < 1.0$$

where R2a denotes the radius of curvature of the object-side surface of the second lens element, and R2b denotes the radius of curvature of the image-side surface of the third lens element.

5. A variable power optical system according to claim 1, wherein the positive lens in the fourth lens group has a concave shape on the object side, and the following condition is satisfied:

$$0 < (R4a - R4b)/(R4a + R4b) < 1.0$$

where R4a denotes the radius of curvature of the object-side surface of the positive lens in the fourth lens group, and R4b denotes the radius of curvature of the image-side surface of the positive lens in the fourth lens group.

6. An image pickup apparatus comprising the variable power optical systems according to claim 1 and an imaging sensor.

7. An image pickup apparatus according to claim 6, wherein the image pickup apparatus comprises a variable power optical system forming an optical image of an object, and an imaging sensor, the imaging sensor transforms the optical image formed by the variable power optical system into electrical image signals, the variable power optical system comprises, in order from the object side, a first lens group with negative refractive power, a second lens group with positive refractive power, a third lens group with negative refractive power, and a fourth lens group with positive refractive power, the second lens group includes at least one positive lens and a negative lens, the fourth lens group includes a positive lens, and the following conditions are satisfied:

$$10 \leq Vd4g \leq 45$$

$$0.27 \leq |IH/f1| + (IH/f2) - 0.05 \times Vd4g \leq 3.0$$

$$10 \leq Vd\max - Vd\min \leq 80$$

where IH denotes the image height of the imaging sensor, f1 denotes the focal length of the first lens group, f2 denotes the focal length of the second lens group, Vd4g denotes the Abbe' Number of the positive lens of the fourth lens group with respect to the d line, Vdmax denotes the Abbe's Number of a glass material having the lowest dispersion characteristic of those of glass materials which are used for lenses of the second lens group, with respect to the d line, and Vdmin denotes the Abbe's Number of a glass material having the highest dispersion characteristic of those of glass materials which are used for lenses of the second lens group, with respect to the d line.

8. An image pickup apparatus according to claim 6, wherein the following condition is satisfied:

$$1.0 \leq |f1|/IH \leq 2.8$$

where f1 denotes the focal length of the first lens group, and IH denotes the image height of the imaging sensor.

9. An image pickup apparatus according to claim 6, wherein the following condition is satisfied:

$$0.2 \leq |f2|/IH \leq 1.8$$

where f2 denotes the focal length of the second lens group, and IH denotes the image height of the imaging sensor.

10. An image pickup apparatus according to claim 6, wherein the second lens group comprises a first lens element with positive refractive power, a second lens element, and a third lens element in that order from the object side, the first lens element has a convex shape on the object side, and the following condition is satisfied:

$$-1.0 < (R2a - R2b)/(R2a + R2b) < 1.0$$

where R2a denotes the radius of curvature of the object-side surface of the second lens element, and R2b denotes the radius of curvature of the image-side surface of the third lens element.

11. An image pickup apparatus according to claim 6, wherein the positive lens in the fourth lens group has a concave shape on the object side, and the following condition is satisfied:

$$0 < (R4a - R4b)/(R4a + R4b) < 1.0$$

where R4a denotes the radius of curvature of the object-side surface of the positive lens in the fourth lens group, and R4b denotes the radius of curvature of the image-side surface of the positive lens in the fourth lens group.

12. A variable power optical system according to claim 1, wherein the first lens group is made to keep still in changing magnification, the positive lens in the fourth lens group has a concave shape on the object side, and the following condition is satisfied:

$$0 < (R4a - R4b)/(R4a + R4b) < 1.0$$

where R4a denotes the radius of curvature of the object-side surface of the positive lens in the fourth lens group, and R4b denotes the radius of curvature of the image-side surface of the positive lens in the fourth lens group.

13. A variable power optical system according to claim 12, wherein the fourth lens group is made to keep still in changing magnification.

* * * * *

UNITED STATES PATENT AND TRADEMARK OFFICE
CERTIFICATE OF CORRECTION

| | |
|---|---|
| PATENT NO. | : 8,564,888 B2 |
| APPLICATION NO. | : 13/418430 |
| DATED | : October 22, 2013 |
| INVENTOR(S) | : Keigo Matsuo et al. |

It is certified that error appears in the above-identified patent and that said Letters Patent is hereby corrected as shown below:

In the Claims at Claim 7, line 18, (column 66, line 37), change "0.27" to "-0.27".

Signed and Sealed this
Eleventh Day of February, 2014

Michelle K. Lee
*Deputy Director of the United States Patent and Trademark Office*